(12) United States Patent
Telfer et al.

(10) Patent No.: US 10,678,111 B2
(45) Date of Patent: Jun. 9, 2020

(54) COLORED ELECTROPHORETIC DISPLAYS

(71) Applicant: E INK CORPORATION, Billerica, MA (US)

(72) Inventors: Stephen J. Telfer, Arlington, MA (US); Stephen Bull, Windham, NH (US); Jennifer M. Morrison, Watertown, MA (US); Luke M. Slominski, Melrose, MA (US); David Darrell Miller, Wakefield, MA (US); Olga Vladimirova Barykina-Tassa, Boston, MA (US); Christopher L. Hoogeboom, Burlington, MA (US); Ana L. Lattes, Newton, MA (US); Lee Yezek, Watertown, MA (US); Brandon MacDonald, Arlington, MA (US); Kosta Ladavac, Somerville, MA (US); Craig A. Herb, Medford, MA (US)

(73) Assignee: E Ink Corporation, Billerica, MA (US)

( * ) Notice: Subject to any disclaimer, the term of this patent is extended or adjusted under 35 U.S.C. 154(b) by 189 days.

(21) Appl. No.: 15/854,124

(22) Filed: Dec. 26, 2017

(65) Prior Publication Data
US 2018/0136533 A1 May 17, 2018

Related U.S. Application Data

(63) Continuation of application No. 14/849,658, filed on Sep. 10, 2015, now Pat. No. 9,921,451.
(Continued)

(51) Int. Cl.
*G02B 25/00* (2006.01)
*G02F 1/167* (2019.01)
(Continued)

(52) U.S. Cl.
CPC .......... *G02F 1/167* (2013.01); *C09B 67/0013* (2013.01); *G09G 3/2003* (2013.01);
(Continued)

(58) Field of Classification Search
CPC ............. G02F 1/167; G02F 2001/1678; G02F 1/1675; G02F 2201/52
(Continued)

(56) References Cited

U.S. PATENT DOCUMENTS

| 4,418,346 A | 11/1983 | Batchelder |
| 5,852,196 A | 12/1998 | Hou |

(Continued)

FOREIGN PATENT DOCUMENTS

| JP | 2010044114 A | 2/2010 |
| JP | 2013250325 A | 12/2013 |
| KR | 20070074967 A | 7/2007 |

OTHER PUBLICATIONS

European Patent Office, EP Appl. No. 15839834.7, Extended European Search Report, dated Sep. 9, 2018.
(Continued)

*Primary Examiner* — Brandi N Thomas
(74) *Attorney, Agent, or Firm* — Brian D. Bean

(57) ABSTRACT

An electrophoretic medium comprises a fluid, a first, light scattering particle (typically white) and second, third and fourth particles having three subtractive primary colors (typically magenta, cyan and yellow); at least two of these colored particles being non-light scattering. The first and second particles bear polymer coatings such that the electric field required to separate an aggregate formed by the third and the fourth particles is greater than that required to separate an aggregate formed from any other two types of
(Continued)

particles. Methods for driving the medium to produce white, black, magenta, cyan, yellow, red, green and blue colors are also described.

11 Claims, 21 Drawing Sheets

Related U.S. Application Data

(60) Provisional application No. 62/048,591, filed on Sep. 10, 2014, provisional application No. 62/169,221, filed on Jun. 1, 2015, provisional application No. 62/169,710, filed on Jun. 2, 2015.

(51) Int. Cl.
*G09G 3/34* (2006.01)
*G09G 3/20* (2006.01)
*C09B 67/08* (2006.01)
*G02F 1/1675* (2019.01)

(52) U.S. Cl.
CPC ..... *G09G 3/344* (2013.01); *G02F 2001/1678* (2013.01); *G09G 2300/0452* (2013.01); *G09G 2310/068* (2013.01)

(58) Field of Classification Search
USPC ........ 359/237, 242, 265–267, 290–292, 295, 359/296, 298
See application file for complete search history.

(56) References Cited

U.S. PATENT DOCUMENTS

| | | |
|---|---|---|
| 5,872,552 A | 2/1999 | Gordon, II |
| 5,930,026 A | 7/1999 | Jacobson |
| 6,017,584 A | 1/2000 | Albert |
| 6,081,285 A | 6/2000 | Wen |
| 6,130,774 A | 10/2000 | Albert |
| 6,144,361 A | 11/2000 | Gordon, II |
| 6,172,798 B1 | 1/2001 | Albert |
| 6,184,856 B1 | 2/2001 | Gordon, II |
| 6,225,971 B1 | 5/2001 | Gordon, II |
| 6,241,921 B1 | 6/2001 | Jacobson |
| 6,271,823 B1 | 8/2001 | Gordon, II |
| 6,445,489 B1 | 9/2002 | Jacobson |
| 6,504,524 B1 | 1/2003 | Gates |
| 6,512,354 B2 | 1/2003 | Jacobson |
| 6,531,997 B1 | 3/2003 | Gates |
| 6,538,801 B2 | 3/2003 | Jacobson |
| 6,664,944 B1 | 12/2003 | Albert |
| 6,672,921 B1 | 1/2004 | Liang |
| 6,727,873 B2 | 4/2004 | Gordon, II |
| 6,753,999 B2 | 6/2004 | Zehner |
| 6,788,449 B2 | 9/2004 | Liang |
| 6,822,782 B2 | 11/2004 | Honeyman |
| 6,825,970 B2 | 11/2004 | Goenaga |
| 6,864,875 B2 | 3/2005 | Drzaic |
| 6,866,760 B2 | 3/2005 | Paolini, Jr. |
| 6,900,851 B2 | 5/2005 | Morrison |
| 6,922,276 B2 | 7/2005 | Zhang |
| 6,950,220 B2 | 9/2005 | Abramson et al. |
| 6,982,178 B2 | 1/2006 | LeCain et al. |
| 6,995,550 B2 | 2/2006 | Jacobson |
| 7,002,728 B2 | 2/2006 | Pullen |
| 7,012,600 B2 | 3/2006 | Zehner |
| 7,012,735 B2 | 3/2006 | Honeyman |
| 7,023,420 B2 | 4/2006 | Comiskey |
| 7,034,783 B2 | 4/2006 | Gates |
| 7,075,502 B1 | 7/2006 | Drzaic |
| 7,116,318 B2 | 10/2006 | Amundson |
| 7,116,466 B2 | 10/2006 | Whitesides |
| 7,119,772 B2 | 10/2006 | Amundson |
| 7,167,155 B1 | 1/2007 | Albert |
| 7,170,670 B2 | 1/2007 | Webber |
| 7,176,880 B2 | 2/2007 | Amundson et al. |
| 7,193,625 B2 | 3/2007 | Danner |
| 7,202,847 B2 | 4/2007 | Gates |
| 7,230,750 B2 | 6/2007 | Whitesides |
| 7,236,291 B2 | 6/2007 | Kaga et al. |
| 7,259,744 B2 | 8/2007 | Arango |
| 7,304,787 B2 | 12/2007 | Whitesides |
| 7,312,784 B2 | 12/2007 | Baucom |
| 7,312,794 B2 | 12/2007 | Zehner |
| 7,321,459 B2 | 1/2008 | Masuda |
| 7,327,511 B2 | 2/2008 | Whitesides |
| 7,339,715 B2 | 3/2008 | Webber |
| 7,349,147 B2 | 3/2008 | Chopra |
| 7,397,597 B2 | 7/2008 | Verschueren et al. |
| 7,411,719 B2 | 8/2008 | Paolini, Jr. |
| 7,420,549 B2 | 9/2008 | Jacobson |
| 7,453,445 B2 | 11/2008 | Amundson |
| 7,492,339 B2 | 2/2009 | Amundson |
| 7,499,211 B2 | 3/2009 | Suwabe |
| 7,528,822 B2 | 5/2009 | Amundson |
| 7,535,624 B2 | 5/2009 | Amundson et al. |
| 7,545,358 B2 | 6/2009 | Gates |
| 7,561,324 B2 | 7/2009 | Duthaler et al. |
| 7,583,251 B2 | 9/2009 | Arango |
| 7,602,374 B2 | 10/2009 | Zehner |
| 7,612,760 B2 | 11/2009 | Kawai |
| 7,667,684 B2 | 2/2010 | Jacobson |
| 7,679,599 B2 | 3/2010 | Kawai |
| 7,679,814 B2 | 3/2010 | Paolini, Jr. |
| 7,688,297 B2 | 3/2010 | Zehner |
| 7,729,039 B2 | 6/2010 | LeCain et al. |
| 7,733,311 B2 | 6/2010 | Amundson |
| 7,733,335 B2 | 6/2010 | Zehner |
| 7,787,169 B2 | 8/2010 | Abramson et al. |
| 7,791,789 B2 | 9/2010 | Albert |
| 7,839,564 B2 | 11/2010 | Whitesides et al. |
| 7,848,009 B2 | 12/2010 | Machida |
| 7,885,457 B2 | 2/2011 | Hirano |
| 7,910,175 B2 | 3/2011 | Webber |
| 7,952,557 B2 | 5/2011 | Amundson |
| 7,952,790 B2 | 5/2011 | Honeyman |
| 7,956,841 B2 | 6/2011 | Albert |
| 7,999,787 B2 | 8/2011 | Amundson |
| 8,009,348 B2 | 8/2011 | Zehner |
| 8,023,176 B2 | 9/2011 | Akashi |
| 8,031,392 B2 | 10/2011 | Hiji |
| 8,040,594 B2 | 10/2011 | Paolini, Jr. |
| 8,054,526 B2 | 11/2011 | Bouchard |
| 8,077,141 B2 | 12/2011 | Duthaler |
| 8,098,418 B2 | 1/2012 | Paolini, Jr. |
| 8,125,501 B2 | 2/2012 | Amundson |
| 8,139,050 B2 | 3/2012 | Jacobson |
| 8,174,490 B2 | 5/2012 | Whitesides |
| 8,174,491 B2 | 5/2012 | Machida |
| 8,213,076 B2 | 7/2012 | Albert |
| 8,262,883 B2 | 9/2012 | Muller et al. |
| 8,289,250 B2 | 10/2012 | Zehner |
| 8,300,006 B2 | 10/2012 | Zhou |
| 8,305,341 B2 | 11/2012 | Arango |
| 8,314,784 B2 | 11/2012 | Ohkami |
| 8,319,759 B2 | 11/2012 | Jacobson |
| 8,363,299 B2 | 1/2013 | Paolini, Jr. |
| 8,384,658 B2 | 2/2013 | Albert |
| 8,390,918 B2 | 3/2013 | Wilcox |
| 8,441,714 B2 | 5/2013 | Paolini, Jr. |
| 8,441,716 B2 | 5/2013 | Paolini, Jr. |
| 8,466,852 B2 | 6/2013 | Drzaic |
| 8,477,404 B2 | 7/2013 | Moriyama |
| 8,542,431 B2 | 9/2013 | Shuto |
| 8,558,783 B2 | 10/2013 | Wilcox |
| 8,558,785 B2 | 10/2013 | Zehner |
| 8,576,470 B2 | 11/2013 | Paolini, Jr. |
| 8,576,476 B2 | 11/2013 | Telfer |
| 8,582,196 B2 | 11/2013 | Walls |
| 8,587,859 B2 | 11/2013 | Kayashima |
| 8,593,721 B2 | 11/2013 | Albert |
| 8,704,754 B2 | 4/2014 | Machida |
| 8,717,664 B2 | 5/2014 | Wang |

(56) References Cited

U.S. PATENT DOCUMENTS

| | | |
|---|---|---|
| 8,730,216 B2 | 5/2014 | Mizutani |
| 8,730,559 B2 | 5/2014 | Akashi |
| 8,797,634 B2 | 8/2014 | Paolini, Jr. |
| 8,830,559 B2 | 9/2014 | Honeyman |
| 8,896,908 B2 | 11/2014 | Shuto et al. |
| 8,902,153 B2 | 12/2014 | Bouchard |
| 8,917,439 B2 | 12/2014 | Wang |
| 8,928,562 B2 | 1/2015 | Gates |
| 8,963,903 B2 | 2/2015 | Sakamoto |
| 8,964,282 B2 | 2/2015 | Wang |
| 8,982,447 B2 | 3/2015 | Shen et al. |
| 9,116,412 B2 | 8/2015 | Lin |
| 9,152,005 B2 | 10/2015 | Morikawa et al. |
| 9,170,467 B2 | 10/2015 | Whitesides |
| 9,199,441 B2 | 12/2015 | Danner |
| 9,230,492 B2 | 1/2016 | Harrington |
| 9,293,511 B2 | 3/2016 | Jacobson |
| 9,348,193 B2 | 5/2016 | Hiji |
| 9,412,314 B2 | 8/2016 | Amundson |
| 9,429,810 B2 | 8/2016 | Kaino |
| 9,494,808 B2 | 11/2016 | Farrand et al. |
| 9,501,981 B2 | 11/2016 | Lin |
| 9,672,766 B2 | 6/2017 | Sjodin |
| 9,697,778 B2 | 7/2017 | Telfer |
| 9,868,803 B2 | 1/2018 | Farrand et al. |
| 2003/0102858 A1 | 6/2003 | Jacobson |
| 2005/0253777 A1 | 11/2005 | Zehner |
| 2007/0091418 A1 | 4/2007 | Danner |
| 2007/0103427 A1 | 5/2007 | Zhou et al. |
| 2008/0024429 A1 | 1/2008 | Zehner |
| 2008/0024482 A1 | 1/2008 | Gates |
| 2008/0043318 A1 | 2/2008 | Whitesides |
| 2008/0048970 A1 | 2/2008 | Drzaic |
| 2008/0062159 A1 | 3/2008 | Roh |
| 2008/0136774 A1 | 6/2008 | Harris |
| 2008/0291129 A1 | 11/2008 | Harris |
| 2009/0122389 A1 | 5/2009 | Whitesides |
| 2009/0174651 A1 | 7/2009 | Jacobson |
| 2009/0225398 A1 | 9/2009 | Duthaler |
| 2009/0322721 A1 | 12/2009 | Zehner |
| 2010/0006441 A1 | 1/2010 | Renaud et al. |
| 2010/0020384 A1* | 1/2010 | Machida ............... G02F 1/167 359/296 |
| 2010/0060628 A1 | 3/2010 | Lenssen et al. |
| 2010/0156780 A1 | 6/2010 | Jacobson |
| 2010/0220121 A1 | 9/2010 | Zehner |
| 2010/0265561 A1 | 10/2010 | Gates et al. |
| 2011/0175939 A1 | 7/2011 | Moriyama |
| 2011/0193840 A1 | 8/2011 | Amundson |
| 2011/0193841 A1 | 8/2011 | Amundson |
| 2011/0199671 A1 | 8/2011 | Amundson |
| 2012/0293858 A1 | 11/2012 | Telfer, Jr. |
| 2012/0326957 A1 | 12/2012 | Drzaic |
| 2013/0194250 A1 | 8/2013 | Amundson |
| 2013/0222884 A1 | 8/2013 | Moriyama |
| 2013/0222886 A1 | 8/2013 | Kawahara |
| 2013/0222887 A1 | 8/2013 | Nakayama |
| 2013/0222888 A1 | 8/2013 | Urano |
| 2013/0250398 A1 | 9/2013 | Takanashi et al. |
| 2014/0009818 A1 | 1/2014 | Brochon et al. |
| 2014/0011913 A1 | 1/2014 | Du |
| 2016/0085132 A1 | 3/2016 | Telfer et al. |

OTHER PUBLICATIONS

Kitamura, T. et al., "Electrical toner movement for electronic paper-like display", Asia Display/IDW '01, pp. 1517-1520, Paper HCS1-1 (2001). Jan. 1, 2001.

Yamaguchi, Y. et al., "Toner display using insulative particles charged triboelectrically", Asia Display/IDW '01, pp. 1729-1730, Paper AMD4-4 (2001). Jan. 1, 2001.

Heikenfeld, J. et al., "A critical review of the present and future prospects for electronic paper", SID, 19(2), pp. 129-156 (2011). Dec. 31, 2011.

Korean Intellectual Property Office; PCT/US2015/049421; International Search Report and Written Opinion; dated Feb. 15, 2016. Feb. 15, 2016.

\* cited by examiner

| White | Yellow | Magenta | Cyan | Magenta | Cyan | Yellow | Cyan |
|---|---|---|---|---|---|---|---|
| Cyan | White | White | White | White | White | White | White |
| Magenta | Cyan | Cyan | Yellow | Magenta | Magenta | Magenta | Magenta |
| Yellow | Magenta | Yellow | | Yellow | | | Yellow |
| White | Yellow | Red | Magenta | Blue | Cyan | Green | Black |
| [A] | [B] | [C] | [D] | [E] | [F] | [G] | [H] |

*Fig. 1*

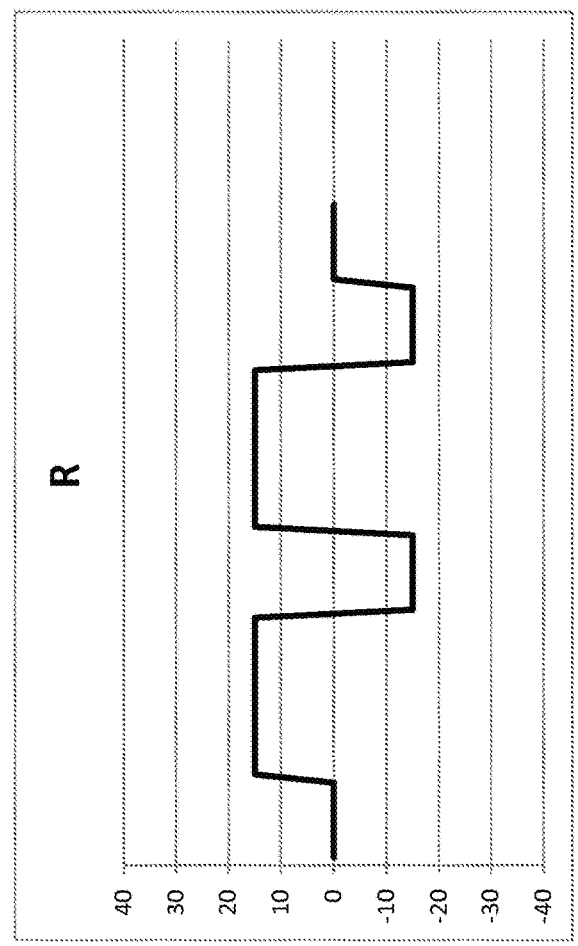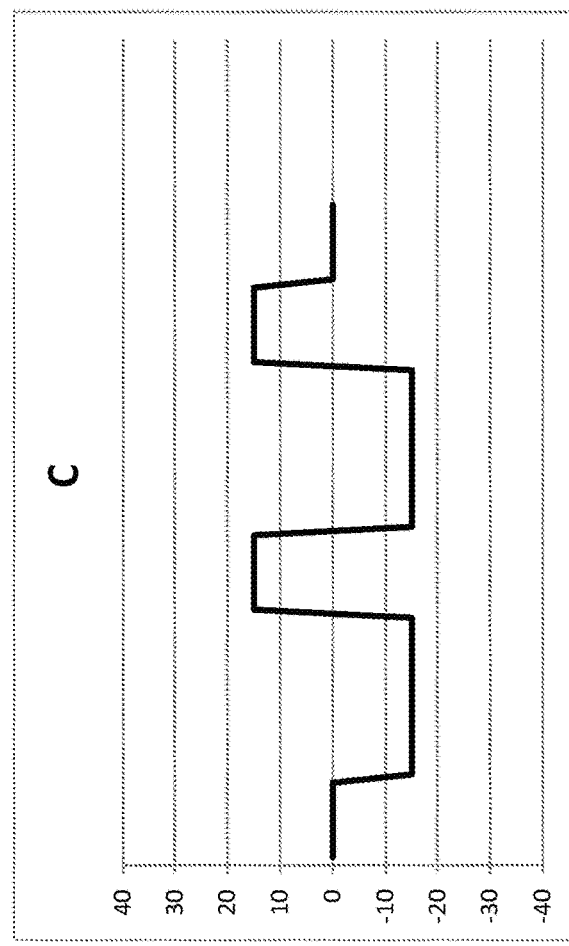

COLORED ELECTROPHORETIC DISPLAYS

This application is a continuation and claims the benefit of copending application Ser. No. 14/849,658, filed on Sep. 10, 2015, which claims the benefit of Application Ser. No. 62/048,591, filed Sep. 10, 2014; of Application Ser. No. 62/169,221, filed Jun. 1, 2015; and of Application Ser. No. 62/169,710, filed Jun. 2, 2015.

This application is related to U.S. Pat. No. 9,697,778 issued on Jul. 4, 2017, and to U.S. Pat. No. 9,501,981 issued on Nov. 22, 2016. The entire contents of these U.S. Patents and of all U.S. patents and published applications mentioned below are herein incorporated by reference.

BACKGROUND OF INVENTION

This invention relates to colored electrophoretic displays, and more specifically to electrophoretic displays capable of rendering more than two colors using a single layer of electrophoretic material comprising a plurality of colored particles.

The term color as used herein includes black and white. White particles are often of the light scattering type.

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an electrophoretic display, is used herein to refer to the integral of the applied voltage with respect to time during the period in which the display is driven.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). See also U.S. Pat, Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Films and sub-assemblies containing electro-optic materials; see for example U.S. Pat. Nos. 6,982,178 and 7,839,564;
(d) Backplanes, adhesive layers and other auxiliary layers and methods used in displays; see for example U.S. Pat. Nos. 7,116,318 and 7,535,624;
(e) Color formation and color adjustment; see for example U.S. Pat. Nos. 6,017,584; 6,664,944; 6,864,875; 7,075,502; 7,167,155; 7,667,684; 7,791,789; 7,839,564; 7,956,841; 8,040,594; 8,054,526; 8,098,418; 8,213,076; and 8,363,299; and U.S. Patent Applications Publication Nos. 2004/0263947; 2007/0223079; 2008/0023332; 2008/0043318; 2008/0048970; 2009/0004442; 2009/0225398; 2010/0103502; 2010/0156780; 2011/0164307; 2011/0195629; 2011/0310461; 2012/0008188; 2012/0019898; 2012/0075687; 2012/0081779; 2012/0134009; 2012/0182597; 2012/0212462; 2012/0157269; and 2012/0326957;

(f) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,116,466; 7,119,772; 7,193,625; 7,202,847; 7,259,744; 7,304,787; 7,312,794; 7,327,511; 7,453,445; 7,492,339; 7,528,822; 7,545,358; 7,583,251; 7,602,374; 7,612,760; 7,679,599; 7,688,297; 7,729,039; 7,733,311; 7,733,335; 7,787,169; 7,952,557; 7,956,841; 7,999,787; 8,077,141; 8,125,501; 8,139,050; 8,174,490; 8,289,250; 8,300,006; 8,305,341; 8,314,784; 8,384,658; 8,558,783; and 8,558,785; and U.S. Patent Applications Publication Nos. 2003/0102858; 2005/0122284; 2005/0253777; 2007/0091418; 2007/0103427; 2008/0024429; 2008/0024482; 2008/0136774; 2008/0291129; 2009/0174651; 2009/0179923; 2009/0195568; 2009/0322721; 2010/0220121; 2010/0265561; 2011/0193840; 2011/0193841; 2011/0199671; 2011/0285754; and 2013/0194250 (these patents and applications may hereinafter be referred to as the MEDEOD (MEthods for Driving Electro-optic Displays) applications);

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 and 8,319,759; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

The aforementioned U.S. Pat. No. 6,982,178 describes a method of assembling a solid electro-optic display (including an encapsulated electrophoretic display) which is well adapted for mass production. Essentially, this patent describes a so-called front plane laminate (FPL) which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term light-transmissive is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term light-transmissive should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or indium tin oxide (ITO), or may be a conductive polymer. Poly(ethylene terephthalate) (PET) films coated with aluminum or ITO are available commercially, for example as aluminized Mylar (Mylar is a Registered Trade Mark) from E.I. du Pont de Nemours & Company, Wilmington DE, and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called double release sheet which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called inverted front plane laminate, which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

As indicated above most simple prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

Multilayer, stacked electrophoretic displays are known in the art; see, for example, J. Heikenfeld, P. Drzaic, J-S Yeo and T. Koch, Journal of the SID, 19(2), 2011, pp. 129-156. In such displays, ambient light passes through images in each of the three subtractive primary colors, in precise analogy with conventional color printing. U.S. Pat. No. 6,727,873 describes a stacked electrophoretic display in which three layers of switchable cells are placed over a reflective background. Similar displays are known in which colored particles are moved laterally (see International Application No. WO 2008/065605) or, using a combination of vertical and lateral motion, sequestered into micropits. In both cases, each layer is provided with electrodes that serve to concentrate or disperse the colored particles on a pixel-by-pixel basis, so that each of the three layers requires a layer of thin-film transistors (TFT's) (two of the three layers of TFT's must be substantially transparent) and a light-transmissive counter-electrode. Such a complex arrangement of electrodes is costly to manufacture, and in the present state of the art it is difficult to provide an adequately transparent plane of pixel electrodes, especially as the white state of the display must be viewed through several layers of electrodes. Multi-layer displays also suffer from parallax problems as the thickness of the display stack approaches or exceeds the pixel size.

U.S. Applications Publication Nos. 2012/0008188 and 2012/0134009 describe multicolor electrophoretic displays having a single back plane comprising independently addressable pixel electrodes and a common, light-transmissive front electrode. Between the back plane and the front electrode is disposed a plurality of electrophoretic layers. Displays described in these applications are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (for example, caused by light scattering or unwanted absorption) may affect the appearance of images formed in underlying electrophoretic layers.

Attempts have been made to provide full-color electrophoretic displays using a single electrophoretic layer. For example, U.S. Patent Application Publication No. 2013/

0208338 describes a color display comprising an electrophoretic fluid which comprises one or two types of pigment particles dispersed in a clear and colorless or colored solvent, the electrophoretic fluid being sandwiched between a common electrode and a plurality of driving electrodes. The driving electrodes are kept at a certain distance in order to expose a background layer. U.S. Patent Application Publication No. 2014/0177031 describes a method for driving a display cell filled with an electrophoretic fluid comprising two types of charged particles carrying opposite charge polarities and of two contrast colors. The two types of pigment particles are dispersed in a colored solvent or in a solvent with non-charged or slightly charged colored particles dispersed therein. The method comprises driving the display cell to display the color of the solvent or the color of the non-charged or slightly charged colored particles by applying a driving voltage which is about 1 to about 20% of the full driving voltage. U.S. Patent Application Publication No. 2014/0092465 and 2014/0092466 describe an electrophoretic fluid, and a method for driving an electrophoretic display. The fluid comprises first, second and third type of pigment particles, all of which are dispersed in a solvent or solvent mixture. The first and second types of pigment particles carry opposite charge polarities, and the third type of pigment particles has a charge level being less than about 50% of the charge level of the first or second type. The three types of pigment particles have different levels of threshold voltage, or different levels of mobility, or both. None of these patent applications disclose full color display in the sense in which that term is used below.

U.S. Patent Application Publication No. 2007/0031031 describes an image processing device for processing image data in order to display an image on a display medium in which each pixel is capable of displaying white, black and one other color. U.S. Patent Applications Publication Nos. 2008/0151355; 2010/0188732; and 2011/0279885 describe a color display in which mobile particles move through a porous structure. U.S. Patent Applications Publication Nos. 2008/0303779 and 2010/0020384 describe a display medium comprising first, second and third particles of differing colors. The first and second particles can form aggregates, and the smaller third particles can move through apertures left between the aggregated first and second particles. U.S. Patent Application Publication No. 2011/0134506 describes a display device including an electrophoretic display element including plural types of particles enclosed between a pair of substrates, at least one of the substrates being translucent and each of the respective plural types of particles being charged with the same polarity, differing in optical properties, and differing in either in migration speed and/or electric field threshold value for moving, a translucent display-side electrode provided at the substrate side where the translucent substrate is disposed, a first back-side electrode provided at the side of the other substrate, facing the display-side electrode, and a second back-side electrode provided at the side of the other substrate, facing the display-side electrode; and a voltage control section that controls the voltages applied to the display-side electrode, the first back-side electrode, and the second back-side electrode, such that the types of particles having the fastest migration speed from the plural types of particles, or the types of particles having the lowest threshold value from the plural types of particles, are moved, in sequence by each of the different types of particles, to the first back-side electrode or to the second back-side electrode, and then the particles that moved to the first back-side electrode are moved to the display-side electrode. U.S. Patent Applications Publication Nos. 2011/0175939; 2011/0298835; 2012/0327504; and 2012/0139966 describe color displays which rely upon aggregation of multiple particles and threshold voltages. U.S. Patent Application Publication No. 2013/0222884 describes an electrophoretic particle, which contains a colored particle containing a charged group-containing polymer and a coloring agent, and a branched silicone-based polymer being attached to the colored particle and containing, as copolymerization components, a reactive monomer and at least one monomer selected from a specific group of monomers. U.S. Patent Application Publication No. 2013/0222885 describes a dispersion liquid for an electrophoretic display containing a dispersion medium, a colored electrophoretic particle group dispersed in the dispersion medium and migrates in an electric field, a non-electrophoretic particle group which does not migrate and has a color different from that of the electrophoretic particle group, and a compound having a neutral polar group and a hydrophobic group, which is contained in the dispersion medium in a ratio of about 0.01 to about 1 mass % based on the entire dispersion liquid. U.S. Patent Application Publication No. 2013/0222886 describes a dispersion liquid for a display including floating particles containing: core particles including a colorant and a hydrophilic resin; and a shell covering a surface of each of the core particles and containing a hydrophobic resin with a difference in a solubility parameter of 7.95 $(J/cm^3)^{1/2}$ or more. U.S. Patent Applications Publication Nos. 2013/0222887 and 2013/0222888 describe an electrophoretic particle having specified chemical compositions. Finally, U.S. Patent Application Publication No. 2014/0104675 describes a particle dispersion including first and second colored particles that move in response to an electric field, and a dispersion medium, the second colored particles having a larger diameter than the first colored particles and the same charging characteristic as a charging characteristic of the first color particles, and in which the ratio (Cs/Cl) of the charge amount Cs of the first colored particles to the charge amount Cl of the second colored particles per unit area of the display is less than or equal to 5. Some of the aforementioned displays do provide full color but at the cost of requiring addressing methods that are long and cumbersome.

U.S. Patent Applications Publication Nos. 2012/0314273 and 2014/0002889 describe an electrophoresis device including a plurality of first and second electrophoretic particles included in an insulating liquid, the first and second particles having different charging characteristics that are different from each other; the device further comprising a porous layer included in the insulating liquid and formed of a fibrous structure. These patent applications are not full color displays in the sense in which that term is used below.

See also U.S. Patent Application Publication No. 2011/0134506 and the aforementioned application Ser. No. 14/277,107; the latter describes a full color display using three different types of particles in a colored fluid, but the presence of the colored fluid limits the quality of the white state which can be achieved by the display.

In summary, the current state of the art is that full color displays typically involve compromises such as slow switching speeds (as long as several seconds), high addressing voltages or compromises on color quality.

The present invention seeks to provide a full color display using only a single electrophoretic layer but capable of white, black, the three subtractive primary colors (cyan, magenta and yellow) and the three additive primary colors (red, green and blue) at every pixel of the display, and a method of driving such an electrophoretic display.

SUMMARY OF INVENTION

Accordingly, this invention provides an electrophoretic medium comprising:
(a) a fluid;
(b) a plurality of first and a plurality of second particles dispersed in the fluid, the first and second particles bearing charges of opposite polarity, the first particle being a light-scattering particle and the second particle having one of the subtractive primary colors; and
(c) a plurality of third and a plurality of fourth particles dispersed in the fluid, the third and fourth particles bearing charges of opposite polarity, the third and fourth particles each having a subtractive primary color different from each other and from the second particles, wherein the electric field required to separate an aggregate formed by the third and the fourth particles is greater than that required to separate an aggregate formed from any other two types of particles.

This invention also provides an electrophoretic medium as described above in which the electric field required to separate aggregates formed between the first and second particles is less than that required to separate aggregates formed between the third and the fourth particles, the first and fourth particles, and the second and third particles.

In another embodiment, this invention provides an electrophoretic medium comprising:
(a) a fluid;
(b) a plurality of first and a plurality of second particles dispersed in the fluid, the first and second particles bearing charges of opposite polarity and each having a polymer coating such that the volume of the polymer in the essentially unsolvated state (i.e., in the dried powder) is at least 20% of the total volume of the plurality of particles (i.e., including the core pigment and the polymer coating); the first particle being a light-scattering particle and the second particle having one of the subtractive primary colors;
(c) a plurality of third particles dispersed in the fluid, the third particles bearing charges of the same polarity as the first particles, having either no polymer coating or a polymer coating such that the volume of the polymer in the essentially unsolvated state (i.e., in the dried powder) is not more than 15% of the total volume of the plurality of particles (i.e., including the core pigment and the polymer coating); and having a subtractive primary color different from that of the second particles; and
(d) a plurality of fourth particles bearing charges of the same polarity as the second particles, having either no polymer coating or a polymer coating such that the volume of the polymer in the essentially unsolvated state (i.e., in the dried powder) is not more than 15% of the total volume of the plurality of particles (i.e., including the core pigment and the polymer coating); and having a subtractive primary color different from those of the second and third particles.

Furthermore, this invention provides such an electrophoretic medium in which at least two of the second, third and fourth particles are substantially non-scattering.

Yet further, this invention provides such an electrophoretic medium in which the first particle is white and the second, third and fourth particles are substantially non-scattering.

This invention also provides an electrophoretic medium comprising four types of particle as described above dispersed in a fluid, wherein:

(a) the white particles of the first or second particles and the fourth particles each have a polymer coating comprising at least about 60 per cent by weight of an acrylate or methacrylate ester monomer wherein the ester group comprises a hydrocarbon chain comprising at least about six carbon atoms; and
(b) the colored particles of the first or second particles have a physisorbed polymer coating comprising a polydimethylsiloxane-containing monomer.

In a preferred embodiment the first and third particles are negatively charged and the second and fourth particles are positively charged.

In one preferred form of the electrophoretic medium of the present invention, the first, second, third and fourth particles are respectively white, cyan, yellow and magenta in color. The white and yellow particles are negatively charged and the magenta and cyan particles are positively charged.

In another aspect, this invention provides an electrophoretic medium comprising:
(a) a fluid;
(b) a plurality of first and a plurality of fourth particles dispersed in the fluid the first and fourth particles bearing charges of opposite polarity and each having a polymer coating comprising at least about 60 per cent by weight of an acrylate or methacrylate ester monomer wherein the ester group comprises a hydrocarbon chain comprising at least about six carbon atoms, one of the first and fourth particles being a light-scattering particle and the other of the first and fourth particles being a substantially non-light-scattering particle having one of the subtractive primary colors;
(c) a plurality of second particles dispersed in the fluid, the second particles bearing charges of the same polarity as the fourth particles, having a polymer coating comprising at least about 60 per cent by weight of a polydimethylsiloxane-containing monomer, and having a subtractive primary color different from the substantially non-light-scattering one of the first and fourth particles; and
(d) a plurality of third particles bearing charges of the same polarity as the first particles, being substantially non-light scattering and having a subtractive primary color different from the substantially non-light-scattering one of the first and fourth particles and different from that of the second particles.

In a further aspect, this invention provides a method of driving an electrophoretic display of the invention, the display comprising a layer of the electrophoretic medium disposed between first and second electrodes, with the first electrode forming the viewing surface of the display, the display having voltage control means capable of applying voltage differences of $+V_H$, $+V_L$, 0, $-V_L$ and $-V_H$ between the first and second electrodes respectively, where:

$$+V_H > +V_L > 0 > -V_L > -V_H$$

the method comprising, in either order:
(a) displaying at the viewing surface alternately the color of the fourth particles, and the color of a mixture of the fourth and second particles and the by applying between the electrodes a series of first pulses of either $+V_H$ or $-V_H$ and of a polarity which drives the fourth particles towards the first electrode, said series of first pulses alternating with second pulses of $+V_L$ or $-V_L$, and of opposite polarity to, but greater duration than, the first pulses; and
(b) displaying at the viewing surface alternately the color of the third particles and the color of a mixture of the third and second particles by applying between the electrodes a series of third pulses of either $+V_H$ or $-V_H$ and of a polarity which drives the third particles towards the first electrode, said series of third pulses alternating with fourth pulses of $+V_L$ or $-V_L$, and of opposite polarity to, but greater duration than, the third pulses.

This method may further comprise:

(c) displaying at the viewing surface a substantially black color by applying between the electrodes a series of fifth pulses of either $+V_L$ or $-V_L$ and of a polarity which drives the first particles towards the second electrode, said series of fifth pulses alternating with periods of substantially zero voltage difference between the electrodes;

(d) displaying at the viewing surface the color of the first particles by applying between the electrodes a series of sixth pulses of either $+V_L$ or $-V_L$ and of a polarity which drives the first particles towards the first electrode, said series of sixth pulses alternating with periods of substantially zero voltage difference between the electrodes;

Whether or not the method includes steps (c) and (d), the method may further comprise:

(e) displaying at the viewing surface alternately the color of the second particles or the color of a mixture of the third and fourth particles by applying between the electrodes a series of seventh pulses of either $+V_L$ or $-V_L$ and of a polarity which drives the second particles towards the second electrode, said series of seventh pulses alternating with eighth pulses of either $+V_L$ or $-V_L$ and of opposite polarity to but greater length than the seventh pulses.

The present invention also provides an alternate method of driving an electrophoretic display of the present invention, the display comprising a layer of the electrophoretic medium second electrodes, with the first electrode forming the viewing surface of the display, the display having voltage control means capable of applying voltage differences of $+VH$, 0, and $-VH$ between the first and second electrodes respectively, where:

$$+V_H > 0 > -V_H$$

the method comprising, in either order:

(a) displaying at the viewing surface alternately the color of the fourth particles, and the color of a mixture of the fourth and second particles and the by applying between the electrodes a series of third pulses of either $+V_H$ or $-V_H$ and of a polarity which drives the fourth particles towards the second electrode, said series of first pulses alternating with second pulses of $+V_H$ or $-V_H$, and of opposite polarity to, but greater duration than, the first pulses; and (b) displaying at the viewing surface alternately the color of the third particles and the color of a mixture of the third and second particles by applying between the electrodes a series of third pulses of either $+VH$ or $-VH$ and of a polarity which drives the third particles towards the second electrode, said series of third pulses alternating with fourth pulses of $+VH$ or $-VH$, and of opposite polarity to, but greater duration than, the third pulses.

This alternate method may optionally incorporate any one or more of the steps (c), (d) and (e) set forth above.

The electrophoretic media of the present invention may contain any of the additives used in prior art electrophoretic media as described for example in the E Ink and MIT patents and applications mentioned above. Thus, for example, the electrophoretic medium of the present invention will typically comprise at least one charge control agent to control the charge on the various particles, and the fluid may have dissolved or dispersed therein a polymer having a number average molecular weight in excess of about 20,000 and being essentially non-absorbing on the particles to improves the bistability of the display, as described in the aforementioned U.S. Pat. No. 7,170,670.

As already mentioned, in one preferred embodiment the present invention requires the use of a light-scattering particle, typically white, and three substantially non-light-scattering particles. There is of course no such thing as a completely light-scattering particle or a completely non-light-scattering particle, and the minimum degree of light scattering of the light-scattering particle, and the maximum tolerable degree of light scattering tolerable in the substantially non-light-scattering particles, used in the electrophoretic of the present invention may vary somewhat depending upon factors such as the exact pigments used, their colors and the ability of the user or application to tolerate some deviation from ideal desired colors. The scattering and absorption characteristics of a pigment may be assessed by measurement of the diffuse reflectance of a sample of the pigment dispersed in an appropriate matrix or liquid against white and dark backgrounds. Results from such measurements can be interpreted according to a number of models that are well-known in the art, for example, the one-dimensional Kubelka-Munk treatment. In the present invention, it is preferred that the white pigment exhibit a diffuse reflectance at 550 nm, measured over a black background, of at least 5% when the pigment is approximately isotropically distributed at 15% by volume in a layer of thickness 1 μm comprising the pigment and a liquid of refractive index less than 1.55. The yellow, magenta and cyan pigments preferably exhibit diffuse reflectances at 650, 650 and 450 nm, respectively, measured over a black background, of less than 2.5% under the same conditions. (The wavelengths chosen above for measurement of the yellow, magenta and cyan pigments correspond to spectral regions of minimal absorption by these pigments.) Colored pigments meeting these criteria are hereinafter referred to as "non-scattering" or "substantially non-light-scattering".

Table 1 below shows the diffuse reflectance of preferred yellow, magenta, cyan and white pigments useful in electrophoretic media of the present invention (Y1, M1, C1 and W1, described in more detail below), together with the ratio of their absorption and scattering coefficients according to the Kubelka-Munk analysis of these materials as dispersed in a poly(isobutylene) matrix.

TABLE 1

| Color | Volume Fraction | Diffuse reflectance of 1 μm layer on 0% black | | | Ratio absorption/scatter | | |
|---|---|---|---|---|---|---|---|
| | | 450 nm | 550 nm | 650 nm | K/S 450 nm | K/S 550 nm | K/S 650 nm |
| Yellow (Y1) | 0.097 | 4.5% | 0.9% | 0.5% | 9.67 | 0.38 | 0.63 |
| Yellow (Y1) | 0.147 | 4.4% | 0.9% | 0.4% | 9.84 | 0.25 | 0.02 |
| Magenta (M1) | 0.115 | 2.8% | 3.8% | 0.7% | 10.01 | 10.85 | 1.27 |
| Magenta (M1) | 0.158 | 3.2% | 4.1% | 1.0% | 10.00 | 10.75 | 1.64 |

TABLE 1-continued

| Color | Volume Fraction | Diffuse reflectance of 1 μm layer on 0% black | | | Ratio absorption/scatter | | |
|---|---|---|---|---|---|---|---|
| | | 450 nm | 550 nm | 650 nm | K/S 450 nm | K/S 550 nm | K/S 650 nm |
| Magenta (M1) | 0.190 | 3.4% | 4.1% | 1.3% | 10.09 | 10.80 | 1.03 |
| Cyan (C1) | 0.112 | 1.3% | 3.7% | 4.3% | 7.27 | 11.17 | 10.22 |
| Cyan (C1) | 0.157 | 1.5% | 3.8% | 4.3% | 7.41 | 11.30 | 10.37 |
| Cyan (C1) | 0.202 | 1.7% | 3.9% | 4.3% | 7.21 | 11.56 | 10.47 |
| White (W1) | 0.147 | 8.1% | 6.2% | 4.8% | 0.0015 | 0.0020 | 0.0026 |
| White (W1) | 0.279 | 24.9% | 20.6% | 17.0% | 0.0003 | 0.0003 | 0.0004 |
| White (W1) | 0.339 | 26.3% | 21.7% | 18.1% | 0.0001 | 0.0002 | 0.0002 |

The electrophoretic medium of the present invention may be in any of the forms discussed above. Thus, the electrophoretic medium may be unencapsulated, encapsulated in discrete capsules surrounded by capsule walls, or in the form of a polymer-dispersed or microcell medium.

This invention extends to a front plane laminate, double release sheet, inverted front plane laminate or electrophoretic display comprising an electrophoretic medium of the present invention. The displays of the present invention may be used in any application in which prior art electro-optic displays have been used. Thus, for example, the present displays may be used in electronic book readers, portable computers, tablet computers, cellular telephones, smart cards, signs, watches, shelf labels and flash drives.

BRIEF DESCRIPTION OF DRAWINGS

FIG. 1 of the accompanying drawings is a schematic cross-section showing the positions of the various particles in an electrophoretic medium of the present invention when displaying black, white, the three subtractive primary and the three additive primary colors.

FIGS. 7A and 7B show waveforms used to drive the electrophoretic medium shown in FIG. 1 to its red and cyan states respectively.

DETAILED DESCRIPTION

Figure 2:
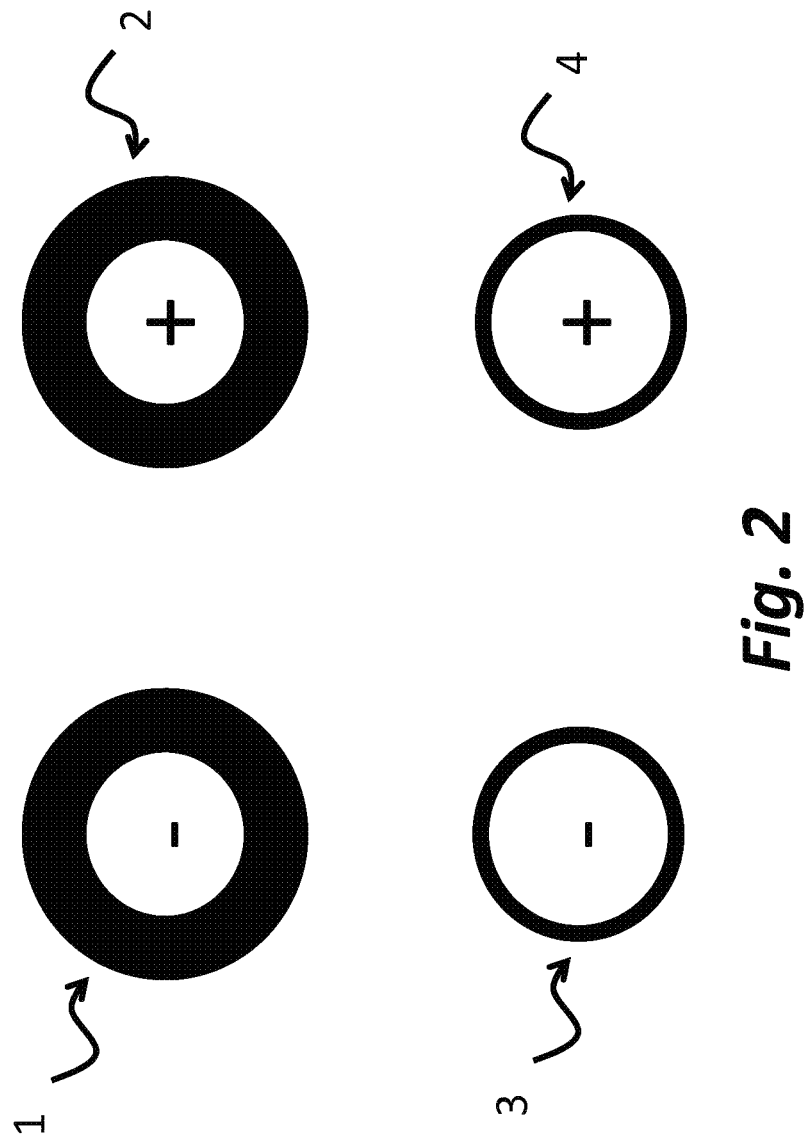
FIG. 2 shows in schematic form the four types of pigment particle used in the present invention.

As indicated above, the present invention provides an electrophoretic medium which comprises one light-scattering particle (typically white) and three other particles providing the three subtractive primary colors. (Note that in copending Application Ser. No. 62/048,591, filed Sep. 10, 2014 and copending Application Ser. No. 62/169,221, filed Jun. 1, 2015, the first, second, third and fourth pigment types described above and hereinafter were referred to, respectively, as the first, third, fourth and second pigment types.)

The three particles providing the three subtractive primary colors may be substantially non-light-scattering ("SNLS"). The use of SNLS particles allows mixing of colors and provides for more color outcomes than can be achieved with the same number of scattering particles. The aforementioned US 2012/0327504 uses particles having subtractive primary colors, but requires two different voltage thresholds for independent addressing of the non-white particles (i.e., the display is addressed with three positive and three negative voltages). These thresholds must be sufficiently separated for avoidance of cross-talk, and this separation necessitates the use of high addressing voltages for some colors. In addition, addressing the colored particle with the highest threshold also moves all the other colored particles, and these other particles must subsequently be switched to their desired positions at lower voltages. Such a step-wise color-addressing scheme produces flashing of unwanted colors and a long transition time. The present invention does not require the use of a such a stepwise waveform and addressing to all colors can, as described below, be achieved with only two positive and two negative voltages (i.e., only five different voltages, two positive, two negative and zero are required in a display, although as described below in certain embodiments it may be preferred to use more different voltages to address the display).

As already mentioned, FIG. 1 of the accompanying drawings is a schematic cross-section showing the positions of the various particles in an electrophoretic medium of the present invention when displaying black, white, the three subtractive primary and the three additive primary colors. In FIG. 1, it is assumed that the viewing surface of the display is at the top (as illustrated), i.e., a user views the display from this direction, and light is incident from this direction. As already noted, in preferred embodiments only one of the four particles used in the electrophoretic medium of the present invention substantially scatters light, and in FIG. 1 this particle is assumed to be the white pigment. Basically, this light-scattering white particle forms a white reflector against which any particles above the white particles (as illustrated in FIG. 1) are viewed. Light entering the viewing surface of the display passes through these particles, is reflected from the white particles, passes back through these particles and emerges from the display. Thus, the particles above the white particles may absorb various colors and the color appearing to the user is that resulting from the combination of particles above the white particles. Any particles disposed below (behind from the user's point of view) the white particles are masked by the white particles and do not affect the color displayed. Because the second, third and fourth particles are substantially non-light-scattering, their order or arrangement relative to each other is unimportant, but for reasons already stated, their order or arrangement with respect to the white (light-scattering) particles is critical.

More specifically, when the cyan, magenta and yellow particles lie below the white particles (Situation [A] in FIG. 1), there are no particles above the white particles and the pixel simply displays a white color. When a single particle is above the white particles, the color of that single particle is displayed, yellow, magenta and cyan in Situations [B], [D] and [F] respectively in FIG. 1. When two particles lie above the white particles, the color displayed is a combination of those of these two particles; in FIG. 1, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 1), all the incoming light is absorbed by the three subtractive primary colored particles and the pixel displays a black color.

It is possible that one subtractive primary color could be rendered by a particle that scatters light, so that the display would comprise two types of light-scattering particle, one of which would be white and another colored. In this case, however, the position of the light-scattering colored particle with respect to the other colored particles overlying the white particle would be important. For example, in rendering the color black (when all three colored particles lie over the white particles) the scattering colored particle cannot lie over the non-scattering colored particles (otherwise they will be partially or completely hidden behind the scattering particle and the color rendered will be that of the scattering colored particle, not black).

It would not be easy to render the color black if more than one type of colored particle scattered light.

FIG. 1 shows an idealized situation in which the colors are uncontaminated (i.e., the light-scattering white particles completely mask any particles lying behind the white particles). In practice, the masking by the white particles may be imperfect so that there may be some small absorption of light by a particle that ideally would be completely masked. Such contamination typically reduces both the lightness and the chroma of the color being rendered. In the electrophoretic medium of the present invention, such color contamination should be minimized to the point that the colors formed are commensurate with an industry standard for color rendition. A particularly favored standard is SNAP (the standard for newspaper advertising production), which specifies $L^*$, $a^*$ and $b^*$ values for each of the eight primary colors referred to above. (Hereinafter, "primary colors" will be used to refer to the eight colors, black, white, the three subtractive primaries and the three additive primaries as shown in FIG. 1.)

Methods for electrophoretically arranging a plurality of different colored particles in "layers" as shown in FIG. 1 have been described in the prior art. The simplest of such methods involves "racing" pigments having different electrophoretic mobilities; see for example U.S. Pat. No. 8,040,594. Such a race is more complex than might at first be appreciated, since the motion of charged pigments itself changes the electric fields experienced locally within the electrophoretic fluid. For example, as positively-charged particles move towards the cathode and negatively-charged particles towards the anode, their charges screen the electric field experienced by charged particles midway between the two electrodes. It is thought that, while pigment racing is involved in the electrophoretic of the present invention, it is not the sole phenomenon responsible for the arrangements of particles illustrated in FIG. 1.

A second phenomenon that may be employed to control the motion of a plurality of particles is hetero-aggregation between different pigment types; see, for example, the aforementioned US 2014/0092465. Such aggregation may be charge-mediated (Coulombic) or may arise as a result of, for example, hydrogen bonding or Van der Waals interactions. The strength of the interaction may be influenced by choice of surface treatment of the pigment particles. For example, Coulombic interactions may be weakened when the closest distance of approach of oppositely-charged particles is maximized by a steric barrier (typically a polymer grafted or adsorbed to the surface of one or both particles). In the present invention, as mentioned above, such polymeric barriers are used on the first, and second types of particles and may or may not be used on the third and fourth types of particles.

A third phenomenon that may be exploited to control the motion of a plurality of particles is voltage- or current-dependent mobility, as described in detail in the aforementioned application Ser. No. 14/277,107.

FIG. 2 shows schematic cross-sectional representations of the four pigment types (1-4) used in preferred embodiments of the invention. The polymer shell adsorbed to the core pigment is indicated by the dark shading, while the core pigment itself is shown as unshaded. A wide variety of forms may be used for the core pigment: spherical, acicular or otherwise anisometric, aggregates of smaller particles (i.e., "grape clusters"), composite particles comprising small pigment particles or dyes dispersed in a binder, and so on as is well known in the art. The polymer shell may be a covalently-bonded polymer made by grafting processes or chemisorption as is well known in the art, or may be physisorbed onto the particle surface. For example, the polymer may be a block copolymer comprising insoluble and soluble segments. Some methods for affixing the polymer shell to the core pigments are described in the Examples below.

First and second particle types in one embodiment of the invention preferably have a more substantial polymer shell than third and fourth particle types. The light-scattering white particle is of the first or second type (either negatively or positively charged). In the discussion that follows it is assumed that the white particle bears a negative charge (i.e., is of Type 1), but it will be clear to those skilled in the art that the general principles described will apply to a set of particles in which the white particles are positively charged.

In the present invention the electric field required to separate an aggregate formed from mixtures of particles of types 3 and 4 in the suspending solvent containing a charge control agent is greater than that required to separate aggregates formed from any other combination of two types of particle. The electric field required to separate aggregates formed between the first and second types of particle is, on the other hand, less than that required to separate aggregates formed between the first and fourth particles or the second and third particles (and of course less than that required to separate the third and fourth particles).

In FIG. 2 the core pigments comprising the particles are shown as having approximately the same size, and the zeta potential of each particle, although not shown, is assumed to be approximately the same. What varies is the thickness of the polymer shell surrounding each core pigment. As shown in FIG. 2, this polymer shell is thicker for particles of types 1 and 2 than for particles of types 3 and 4—and this is in fact a preferred situation for certain embodiments of the invention.

In order to understand how the thickness of the polymer shell affects the electric field required to separate aggregates of oppositely-charged particles, it may be helpful to consider the force balance between particle pairs. In practice, aggregates may be composed of a great number of particles and the situation will be far more complex than is the case for simple pairwise interactions. Nevertheless, the particle pair analysis does provide some guidance for understanding of the present invention.

The force acting on one of the particles of a pair in an electric field is given by:

$$\vec{F}_{Total} = \vec{F}_{App} + F_C + \vec{F}_{VW} + \vec{F}_D \qquad (1)$$

Where $F_{App}$ is the force exerted on the particle by the applied electric field, $F_C$ is the Coulombic force exerted on the particle by the second particle of opposite charge, $F_{VW}$ is the attractive Van der Waals force exerted on one particle by the second particle, and $F_D$ is the attractive force exerted by depletion flocculation on the particle pair as a result of (optional) inclusion of a stabilizing polymer into the suspending solvent.

The force $F_{App}$ exerted on a particle by the applied electric field is given by:

$$\vec{F}_{App} = q\vec{E} = 4\pi\varepsilon_r\varepsilon_0(a+s)\zeta\vec{E} \qquad (2)$$

Where q is the charge of the particle, which is related to the zeta potential ($\zeta$) as shown in equation (2) (approximately, in the Huckel limit), where a is the core pigment radius, s is the thickness of the solvent-swollen polymer shell, and the other symbols have their conventional meanings as known in the art.

The magnitude of the force exerted on one particle by another as a result of Coulombic interactions is given approximately by:

$$F_C = \frac{4\pi\varepsilon_r\varepsilon_0(a_1+s_1)(a_2+s_2)\varsigma_1\varsigma_2}{(a_1+s_1+a_2+s_2)^2} \qquad (3)$$

for particles 1 and 2.

Note that the $F_{App}$ forces applied to each particle act to separate the particles, while the other three forces are attractive between the particles. If the $F_{App}$ force acting on one particle is higher than that acting on the other (because the charge on one particle is higher than that on the other) according to Newton's third law, the force acting to separate the pair is given by the weaker of the two $F_{App}$ forces.

It can be seen from (2) and (3) that the magnitude of the difference between the attracting and separating Coulombic terms is given by:

$$F_{App} - F_C = 4\pi\varepsilon_r\varepsilon_0((a+s)\zeta|\vec{E}| - \zeta^2) \qquad (4)$$

if the particles are of equal radius and zeta potential, so making (a+s) smaller or $\zeta$ larger will make the particles more difficult to separate. Thus, in one embodiment of the invention it is preferred that particles of types 1 and 2 be large, and have a relatively low zeta potential, while particles 3 and 4 be small, and have a relatively large zeta potential.

However, the Van der Waals forces between the particles may also change substantially if the thickness of the polymer shell increases. The polymer shell on the particles is swollen by the solvent and moves the surfaces of the core pigments that interact through Van der Waals forces further apart. For spherical core pigments with radii ($a_1$, $a_2$) much larger than the distance between them ($s_1+s_2$), $$F_{VW} = \frac{Aa_1a_2}{6(a_1+a_2)(s_1+s_2)^2} \qquad (5)$$

where A is the Hamaker constant. As the distance between the core pigments increases the expression becomes more complex, but the effect remains the same: increasing $s_1$ or $s_2$ has a significant effect on reducing the attractive Van der Waals interaction between the particles.

With this background it becomes possible to understand the rationale behind the particle types illustrated in FIG. 2. Particles of types 1 and 2 have substantial polymeric shells that are swollen by the solvent, moving the core pigments further apart and reducing the Van der Waals interactions between them more than is possible for particles of types 3 and 4, which have smaller or no polymer shells. Even if the particles have approximately the same size and magnitude of zeta potential, according to the invention it will be possible to arrange the strengths of the interactions between pairwise aggregates to accord with the requirements set out above.

Table 2 below shows various properties of particles used in the present invention. Methods for preparation of these particles are described in the Examples below. White particles W1 and W2 are particles of type 1 in FIG. 2. Cyan particles C1 are of type 2; yellow particles Y1, Y2, Y3 and Y4 are of type 3 and magenta particles M1 are of type 4. Magenta particles M2 are of type 2.

TABLE 2

| Pigment | Zeta potential, Solsperse 19000 (mV), Isopar-G | Polymer weight fraction measured by TGA, % | Volume fraction polymer (dried pigment), % | Estimated (dry) polymer shell thickness (nm) | Particle Diameter - Median (nm) | Particle Diameter - Range (nm) | Specific surface area (BET) (m$^2$/g) | Adsorbed Solsperse 19000 (mg/g) | Adsorbed Solsperse 19000 (mg/m$^2$) |
|---|---|---|---|---|---|---|---|---|---|
| W1 | −30 | 7.9 | 26.2 | 27 | 560 | 200-1000 | 10 | 5 | 0.50 |
| W2 | −60 | 8.5 | 27.8 | 26 | 500 | 150-1500 | 12 | 5 | 0.42 |
| Y1 | −47 | None | None | None | 190 | 50-500 | 44 | 200 | 4.55 |
| Y2 | −53 | None | None | None | 150 | 50-1000 | n/a | n/a | n/a |
| Y3 | −35 | None | None | None | 140 | 50-1000 | 63 | 220 | 3.49 |
| Y4 | −39 | 31 | 43.6 | 46 | 530 | 50-5000 | n/a | n/a | n/a |
| M1 | 45 | 7.6 | 12.4 | 9 | 420 | 50-5000 | 80 | 140 | 1.75 |
| M2 | 56 | 26.7 | 36.2 | 70 | 1010 | 200-10000 | n/a | n/a | n/a |
| C1 | 65 | 24.0 | 34.3 | 36 | 550 | 400-700 | 22 | 15 | 0.68 |

It can be seen that the magnitudes of the zeta potentials of the particles are similar to each other (at least within a factor of about 3): all lie in the range of about 25-70 mV (absolute value). The particle diameters quoted are measured in solution, in which the polymer shells (if present) are swollen by the solvent. Particle sizes typically range from about 150 nm to 1000 nm.

The extent of the polymer shell is conveniently assessed by thermal gravimetric analysis (TGA), a technique in which the temperature of a dried sample of the particles is raised and the mass loss due to pyrolysis is measured as a function of temperature. Conditions can be found in which the polymer coating is lost but the core pigment remains (these conditions depend upon the precise core pigment particle used). Using TGA, the proportion of the mass of the particle that is polymer can be measured, and this can be converted to a volume fraction using the known densities of the core pigments and the polymers attached to them.

As can be seen in Table 2, particles of types 1 and 2 (W1, W2, M2, C1) have volume fractions of polymer of at least about 25%, corresponding to dried polymer shell thicknesses, for typical particle sizes, of at least 25 nm. In the suspending solvent, the polymer shell will extend further than this as it takes up the solvent.

Particles of types 3 and 4 (Y1, Y2, Y3, M1) either have no polymer shell at all, or a polymer shell that has a volume fraction not exceeding about 15%, corresponding to dried polymer shell thicknesses, for typical particle sizes, of 0-10 nm.

In this analysis it is assumed that the polymer shell evenly encapsulates the entire surface of the core pigment. However, this is by no means assured. (See, for example, the aforementioned U.S. Pat. No. 6,822,782, FIG. 6 and the related description at columns 16-17.) It may be that the method of attachment of the polymer favors one face of a crystalline core pigment over another, and there may be partial areas of the core pigment with polymer coverage and other areas with none or very little. Also, especially when grafting techniques are used to attach the polymer to the pigment surface, growth of the polymer may be patchy, leaving large areas of the core pigment uncovered even if the mass of grafted polymer is large.

One method that may be used to assess the coverage of the polymer is to measure the adsorption isotherm of a relatively polar molecule onto the pigment surface. A method for carrying out this determination is described in the Examples below. A convenient polar molecule for use in this determination is a charge control agent (CCA), which is an amphiphilic molecule comprising a polar head group and a non-polar tail group. Such molecules are known to form reverse micelles in non-polar solvents such as the suspending solvents used in the present invention. In the presence of pigment particles, the polar head groups are known to adsorb onto surfaces (that are typically polar) that are not protected by non-polar polymeric chains. The degree of adsorption of the CCA onto the pigment surface is thus a measure of the area of the pigment surface that is not covered by the non-polar polymer and therefore inaccessible.

The last column in Table 2 shows the adsorption of a typical CCA (Solsperse 19000, available from Lubrizol Corporation) per unit area of the particles. The degree of adsorption of this material onto particles of types 1 and 2 is in the range 0.4-0.7 mg/m$^2$, while for particles of types 3 and 4 it is in the range of 1.7-4.6 mg/m$^2$. Preferred ranges are 0-1 mg/m$^2$ for particles of types 1 and 2, and >1.5 mg/m$^2$ for particles of types 3 and 4.

Figure 3:
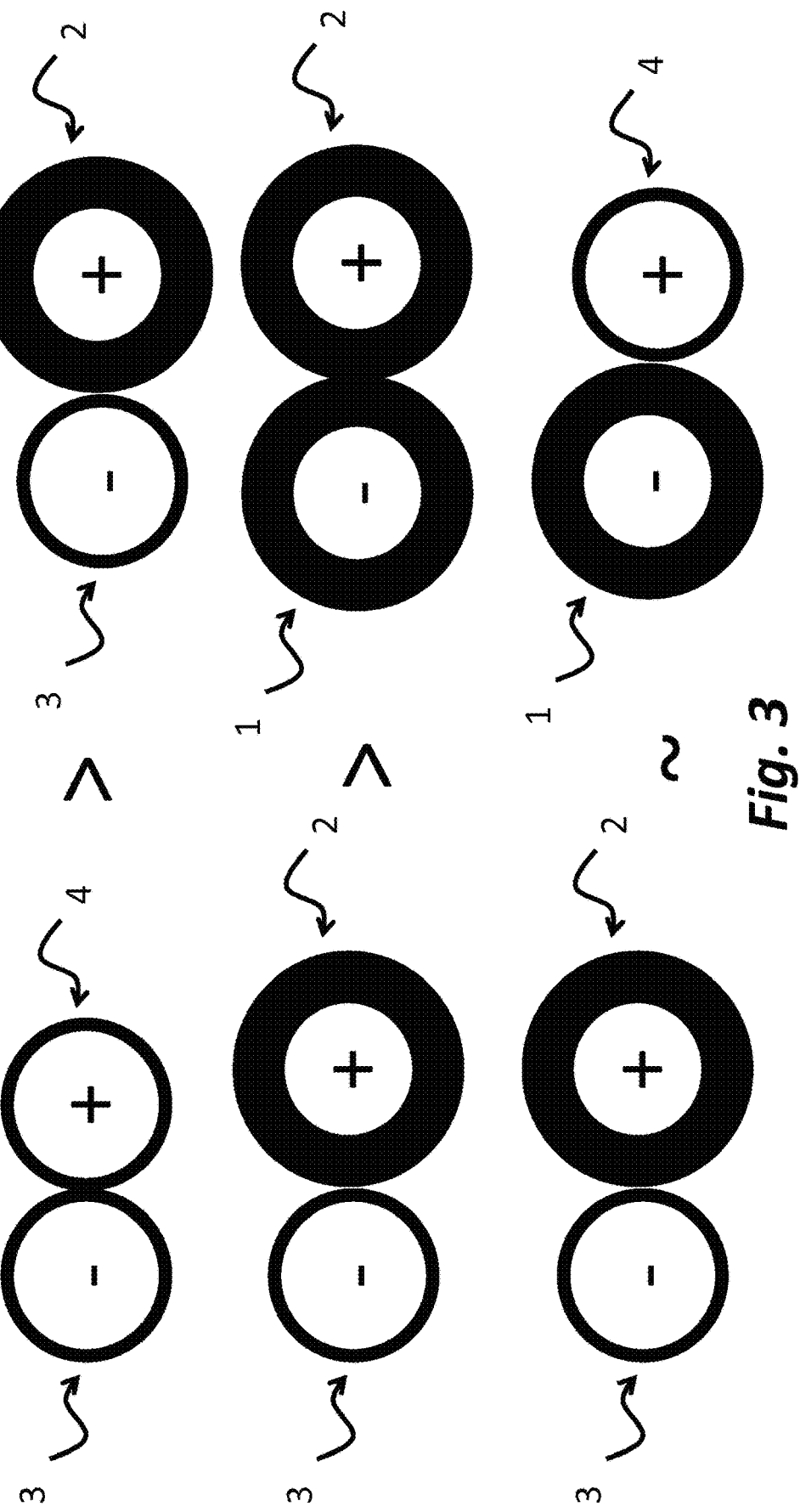
FIG. 3 shows in schematic form the relative strengths of interactions between pairs of particles of the present invention.

FIG. 3 shows in schematic form the strengths of the electric fields required to separate pairwise aggregates of the particle types of the invention. The interaction between particles of types 3 and 4 is stronger than that between particles of types 2 and 3. The interaction between particles of types 2 and 3 is about equal to that between particles of types 1 and 4 and stronger than that between particles of types 1 and 2. All interactions between pairs of particles of the same sign of charge as weak as or weaker than the interaction between particles of types 1 and 2.

Figure 4:
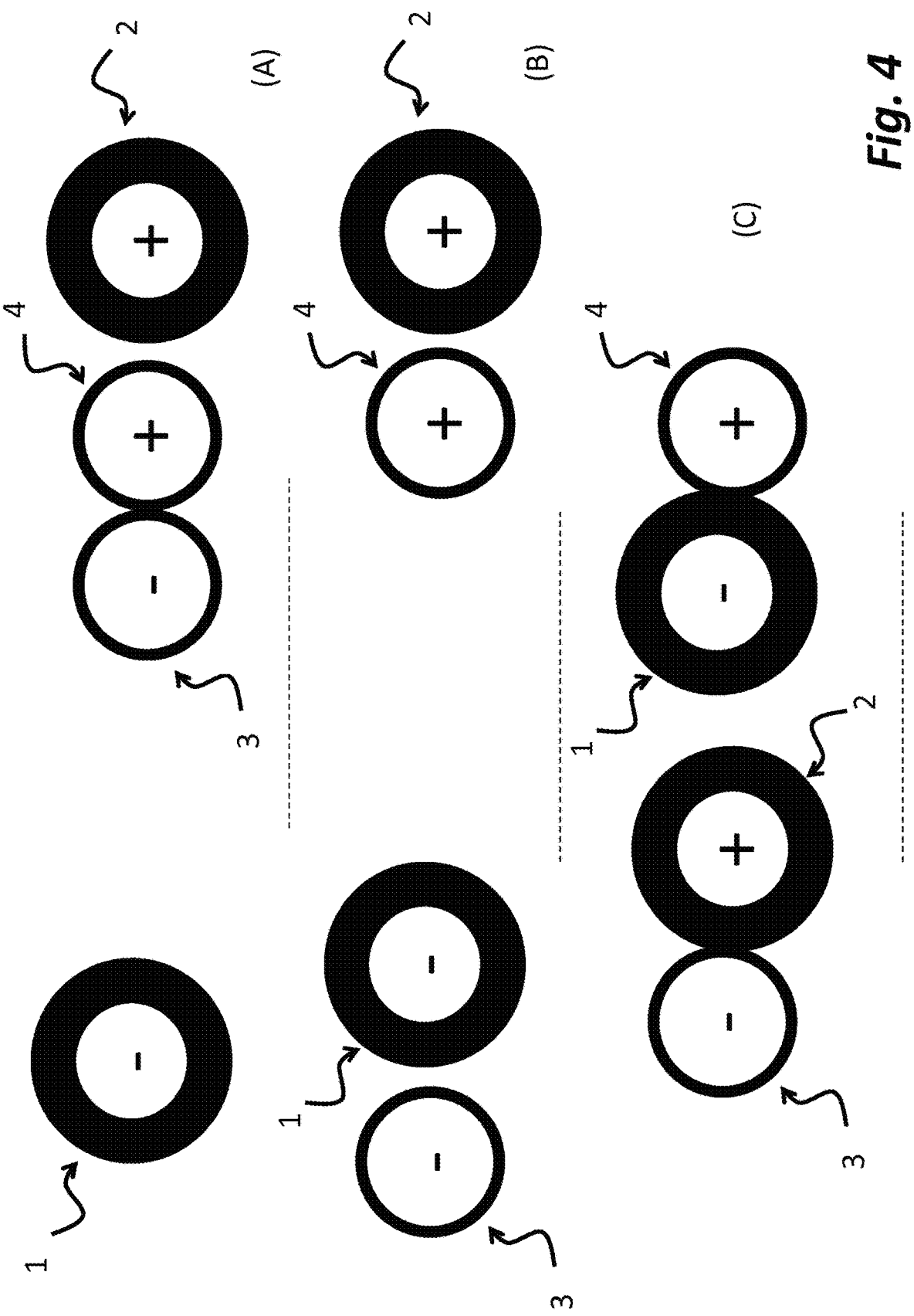
FIG. 4 shows in schematic form behavior of particles of the present invention when subjected to electric fields of varying strength and duration.

FIG. 4 shows how these interactions may be exploited to make all the primary colors (subtractive, additive, black and white), as was discussed generally with reference to FIG. 1.

When addressed with a low electric field (FIG. 4(A)), particles 3 and 4 are aggregated and not separated. Particles 1 and 2 are free to move in the field. If particle 1 is the white particle, the color seen viewing from the left is white, and from the right is black. Reversing the polarity of the field switches between black and white states. The transient colors between black and white states, however, are colored. The aggregate of particles 3 and 4 will move very slowly in the field relative to particles 1 and 2. Conditions may be found where particle 2 has moved past particle 1 (to the left) while the aggregate of particles 3 and 4 has not moved appreciably. In this case particle 2 will be seen viewing from the left while the aggregate of particles 3 and 4 will be seen viewing from the right. As is shown in the Examples below, in certain embodiments of the invention the aggregate of particles 3 and 4 is weakly positively charged, and is therefore positioned in the vicinity of particle 2 at the beginning of such a transition.

When addressed with a high electric field (FIG. 4(B)), particles 3 and 4 are separated. Which of particles 1 and 3 (each of which has a negative charge) is visible when viewed from the left will depend upon the waveform (see below). As illustrated, particle 3 is visible from the left and the combination of particles 2 and 4 is visible from the right.

Starting from the state shown in FIG. 4(B), a low voltage of opposite polarity will move positively charged particles to the left and negatively charged particles to the right. However, the positively charged particle 4 will encounter the negatively charged particle 1, and the negatively charged particle 3 will encounter the positively charged particle 2. The result is that the combination of particles 2 and 3 will be seen viewing from the left and particle 4 viewing from the right.

As described above, preferably particle 1 is white, particle 2 is cyan, particle 3 is yellow and particle 4 is magenta.

The core pigment used in the white particle is typically a metal oxide of high refractive index as is well known in the art of electrophoretic displays. Examples of white pigments are described in the Examples below.

The core pigments used to make particles of types 2-4, as described above, provide the three subtractive primary colors: cyan, magenta and yellow.

Suitable yellow core pigments include C.I. Pigment Yellows 1, 3, 12, 13, 14, 16, 17, 73, 74, 81, 83, 97, 111, 120, 126, 137, 139, 150, 151, 155, 174, 175, 176, 180, 181, 191, 194, 213 and 214. Preferred yellow core pigments include C.I. Pigment Yellows 139, 155 and 180.

Suitable magenta core pigments include C.I. Pigment Reds 12, 14, 48:2, 48:3, 48:4, 57:1, 112, 122, 146, 147, 176, 184, 185, 209, 257 and 262, and C.I. Pigment Violets 19 and 32. One preferred magenta core pigment is C.I. Pigment Red 122.

Suitable cyan core pigments include C.I. Pigment Blues 15:1, 15:2, 15:3, 15:4 and 79, and C.I. Solvent Blue 70.

A display device may be constructed using an electrophoretic fluid of the invention in several ways that are known in the prior art. The electrophoretic fluid may be encapsulated in microcapsules or incorporated into microcell structures that are thereafter sealed with a polymeric layer. The microcapsule or microcell layers may be coated or embossed onto a plastic substrate or film bearing a transparent coating of an electrically conductive material. This assembly may be laminated to a backplane bearing pixel electrodes using an electrically conductive adhesive.

A first embodiment of waveforms used to achieve each of the particle arrangements shown in FIG. 1 will now be described with reference to FIGS. 5-7. Hereinafter this method of driving will be referred to as the "first drive scheme" of the invention. In this discussion it is assumed that the first particles are white and negatively charged, the second particles cyan and positively charged, the third particles yellow and negatively charged, and the fourth particles magenta and positively charged. Those skilled in the art will understand how the color transitions will change if these assignments of particle colors are changed, as they can be provided that one of the first and second particles is white. Similarly, the polarities of the charges on all the particles can be inverted and the electrophoretic medium will still function in the same manner provided that the polarity of the waveforms (see next paragraph) used to drive the medium is similarly inverted.

In the discussion that follows, the waveform (voltage against time curve) applied to the pixel electrode of the backplane of a display of the invention is described and plotted, while the front electrode is assumed to be grounded (i.e., at zero potential). The electric field experienced by the electrophoretic medium is of course determined by the difference in potential between the backplane and the front electrode and the distance separating them. The display is typically viewed through its front electrode, so that it is the particles adjacent the front electrode which control the color displayed by the pixel, and if it is sometimes easier to understand the optical transitions involved if the potential of the front electrode relative to the backplane is considered; this can be done simply by inverting the waveforms discussed below.

These waveforms require that each pixel of the display can be driven at five different addressing voltages, designated $+V_{high}$, $+V_{low}$, 0, $-V_{low}$ and $-V_{high}$, illustrated as 30V, 15V, 0, −15V and −30V in FIGS. 5-7. In practice it may be preferred to use a larger number of addressing voltages. If only three voltages are available (i.e., $+V_{high}$, 0, and $-V_{high}$) it may be possible to achieve the same result as addressing at a lower voltage (say, $V_{high}/n$ where n is a positive integer>1) by addressing with pulses of voltage $V_{high}$ but with a duty cycle of 1/n.

Waveforms used in the present invention may comprise three phases: a DC-balancing phase, in which a DC imbalance due to previous waveforms applied to the pixel is corrected, or in which the DC imbalance to be incurred in the subsequent color rendering transition is corrected (as is known in the art), a "reset" phase, in which the pixel is returned to a starting configuration that is at least approximately the same regardless of the previous optical state of the pixel, and a "color rendering" phase as described below. The DC-balancing and reset phases are optional and may be omitted, depending upon the demands of the particular application. The "reset" phase, if employed, may be the same as the magenta color rendering waveform described below, or may involve driving the maximum possible positive and negative voltages in succession, or may be some other pulse pattern, provided that it returns the display to a state from which the subsequent colors may reproducibly be obtained.

Figure 5A:
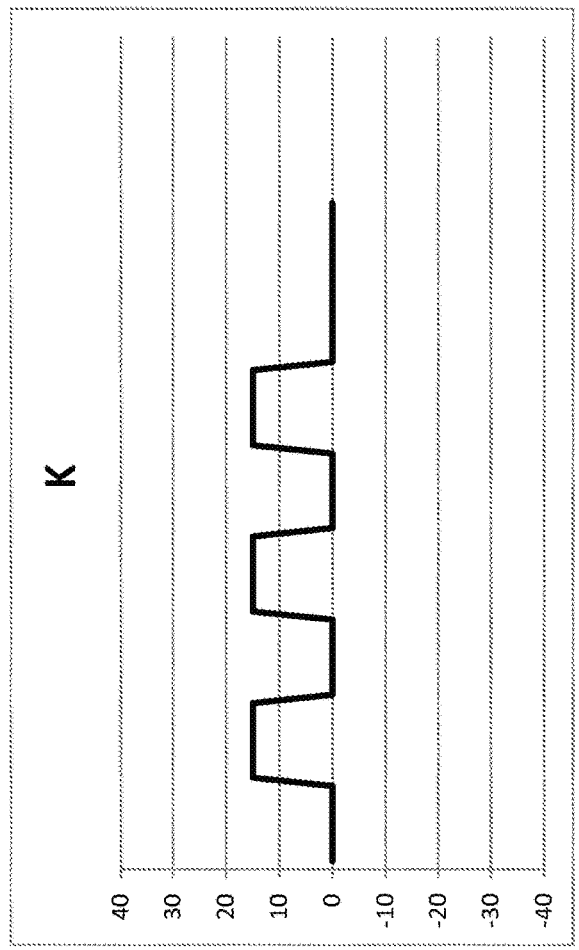
FIGS. 5A and 5B show waveforms used to drive the electrophoretic medium shown in FIG. 1 to its black and white states respectively.
Figure 5B:
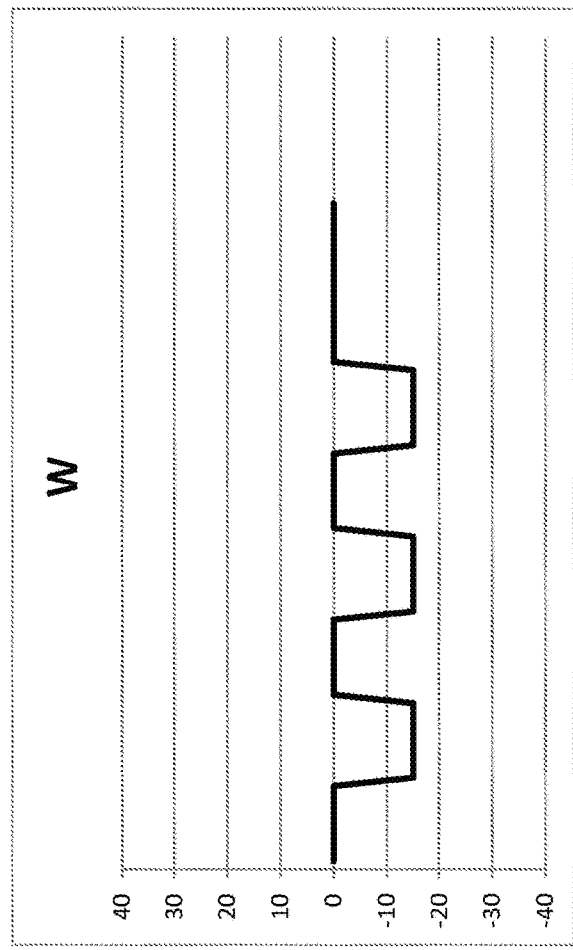

FIGS. 5A and 5B show, in idealized form, typical color rendering phases of waveforms used to produce the black and white states in displays of the present invention. The graphs in FIGS. 5A and 5B show the voltage applied to the backplane (pixel) electrodes of the display while the transparent, common electrode on the top plane is grounded. The x-axis represents time, measured in arbitrary units, while the y-axis is the applied voltage in Volts. Driving the display to black (FIG. 5A) or white (FIG. 5B) states is effected by a sequence of positive or negative impulses, respectively, preferably at voltage VI. because, as noted above, at the fields (or currents) corresponding to VI. the magenta and yellow pigments are aggregated together. Thus, the white and cyan pigments move while the magenta and yellow pigments remain stationary (or move with a much lower velocity) and the display switches between a white state and a state corresponding to absorption by cyan, magenta and yellow pigments (often referred to in the art as a "composite black"). The length of the pulses to drive to black and white may vary from about 10-1000 milliseconds, and the pulses may be separated by rests (at zero applied volts) of lengths in the range of 10-1000 milliseconds. Although FIG. 5 shows pulses of positive and negative voltages, respectively, to produce black and white, these pulses being separated by "rests" where zero voltage is supplied, it is sometimes preferred that these "rest" periods comprise pulses of the opposite polarity to the drive pulses, but having lower impulse (i.e., having a shorter duration or a lower applied voltage than the principal drive pulses, or both).

Figure 6A:
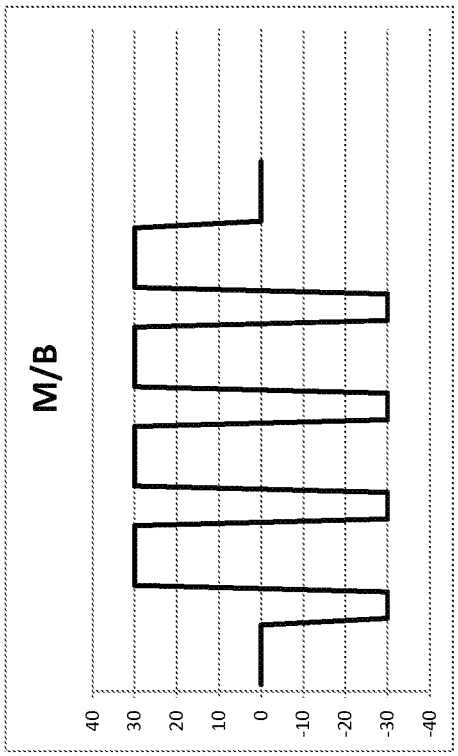
FIGS. 6A and 6B show waveforms used to drive the electrophoretic medium shown in FIG. 1 to its magenta and blue states.
Figure 6B:
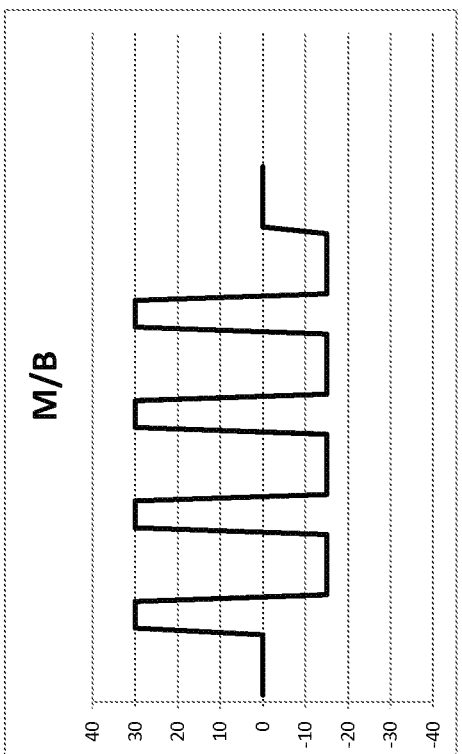
Figure 6C:
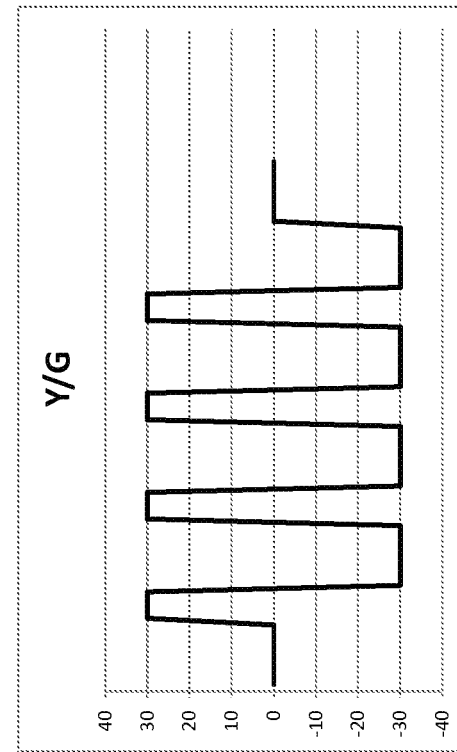
FIGS. 6C and 6D show waveforms used to drive the electrophoretic medium shown in FIG. 1 to its yellow and green states.
Figure 6D:
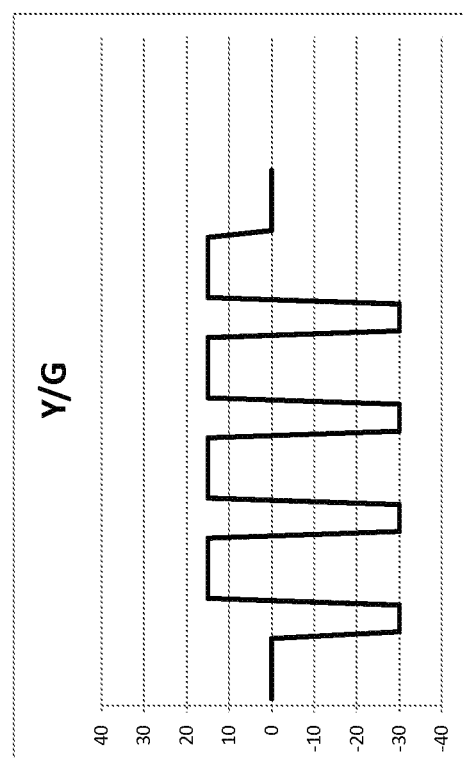

FIGS. 6A-6D show typical color rendering phases of waveforms used to produce the colors magenta and blue (FIGS. 6A and 6B) and yellow and green (FIGS. 6C and 6D). In FIG. 6A, the waveform oscillates between positive and negative impulses, but the length of the positive impulse ($t_p$) is shorter than that of the negative impulse ($t_n$), while the voltage applied in the positive impulse ($V_p$) is greater than that of the negative impulse ($V_n$). When:

$$V_p t_p = V_n t_n$$

the waveform as a whole is "DC-balanced". The period of one cycle of positive and negative impulses may range from about 30-1000 milliseconds.

At the end of the positive impulse, the display is in the blue state, while at the end of the negative impulse the display is in the magenta state. This is consistent with the change in optical density corresponding to motion of the cyan pigment being larger than the change corresponding to motion of the magenta or yellow pigments (relative to the white pigment). According to the hypotheses presented above, this would be expected if the interaction between the magenta pigment and the white pigment were stronger than that between the cyan pigment and the white pigment. The relative mobility of the yellow and white pigments (which are both negatively charged) is much lower that the relative mobility of the cyan and white pigments (which are oppositely charged). Thus, in a preferred waveform to produce magenta or blue, a sequence of impulses comprising at least one cycle of $V_p t_p$ followed by $V_n t_n$ is preferred, where $V_p > V_n$ and $t_p < t_n$. When the color blue is required, the sequence ends on $V_p$ whereas when the color magenta is required the sequence ends on $V_n$.

FIG. 6B shows an alternative waveform for the production of magenta and blue states using only three voltage levels. In this alternative waveform, at least one cycle of $V_p t_p$ followed by $V_n t_n$ is preferred, where $V_p = V_n = V_{high}$ and $t_n < t_p$. This sequence cannot be DC-balanced. When the color blue is required, the sequence ends on $V_p$ whereas when the color magenta is required the sequence ends on $V_n$.

The waveforms shown in FIGS. 6C and 6D are the inverses of those shown in FIGS. 6A and 6B respectively, and produce the corresponding complementary colors yellow and green. In one preferred waveform to produce yellow or green, as shown in FIG. 6C, a sequence of impulses comprising at least one cycle of $V_p t_p$ followed by $V_n t_n$ is used, where $V_p < V_n$ and $t_p > t_n$. When the color green is required, the sequence ends on $V_p$ whereas when the color yellow is required the sequence ends on $V_n$.

Another preferred waveform to produce yellow or green using only three voltage levels is shown in FIG. 6D. In this case, at least one cycle of $V_p t_p$ followed by $V_n t_n$ is used, where $V_p = V_n = V_{high}$ and $t_n > t_p$. This sequence cannot be DC-balanced. When the color green is required, the sequence ends on $V_p$ whereas when the color yellow is required the sequence ends on $V_n$.

FIGS. 7A and 7B show color rendering phases of waveforms used to render the colors red and cyan on a display of the present invention. These waveforms also oscillate between positive and negative impulses, but they differ from the waveforms of FIGS. 6A-6D in that the period of one cycle of positive and negative impulses is typically longer and the addressing voltages used may be (but are not necessarily) lower. The red waveform of FIG. 7A consists of a pulse ($+V_{low}$) that produces black (similar to the waveform shown in FIG. 5A) followed by a shorter pulse ($-V_{low}$) of opposite polarity, which removes the cyan particles and changes black to red, the complementary color to cyan. The cyan waveform is the inverse of the red one, having a section that produces white ($-V_{low}$) followed by a short pulse ($V_{low}$) that moves the cyan particles adjacent the viewing surface. Just as in the waveforms shown in FIGS. 6A-6D, the cyan moves faster relative to white than either the magenta or yellow pigments. In contrast to the FIG. 6 waveforms, however, the yellow pigment in the FIG. 7 waveforms remains on the same side of the white particles as the magenta particles.

The waveforms described above with reference to FIGS. 5-7 use a five level drive scheme, i.e., a drive scheme in which at any given time a pixel electrode may be at any one of two different positive voltages, two different negative voltages, or zero volts relative to a common front electrode. In the specific waveforms shown in FIGS. 5-7, the five levels are 0, ±15V and ±30V. It has, however, in at least some cases been found to be advantageous to use a seven level drive scheme, which uses seven different voltages: three positive, three negative, and zero. This seven level drive scheme may hereinafter be referred to as the "second drive scheme" of the present invention. The choice of the number of voltages used to address the display should take account of the limitations of the electronics used to drive the display. In general, a larger number of drive voltages will provide greater flexibility in addressing different colors, but complicates the arrangements necessary to provide this larger number of drive voltages to conventional device display drivers. The present inventors have found that use of seven different voltages provides a good compromise between complexity of the display architecture and color gamut.

The general principles used in production of the eight primary colors (white, black, cyan, magenta, yellow, red, green and blue) using this second drive scheme applied to a display of the present invention (such as that shown in FIG. 1) will now be described. As in FIGS. 5-7, it will be assumed that the first pigment is white, the second cyan, the third yellow and the fourth magenta. It will be clear to one of ordinary skill in the art that the colors exhibited by the display will change if the assignment of pigment colors is changed.

The greatest positive and negative voltages (designated ±Vmax in FIG. 8) applied to the pixel electrodes produce respectively the color formed by a mixture of the second and fourth particles (cyan and magenta, to produce a blue color—cf. FIG. 1E and FIG. 4B viewed from the right), or the third particles alone (yellow—cf. FIG. 1B and FIG. 4B viewed from the left—the white pigment scatters light and lies in between the colored pigments). These blue and yellow colors are not necessarily the best blue and yellow attainable by the display. The mid-level positive and negative voltages (designated ±Vmid in FIG. 8) applied to the pixel electrodes produce colors that are black and white, respectively (although not necessarily the best black and white colors attainable by the display—cf. FIG. 4A).

Figure 8:
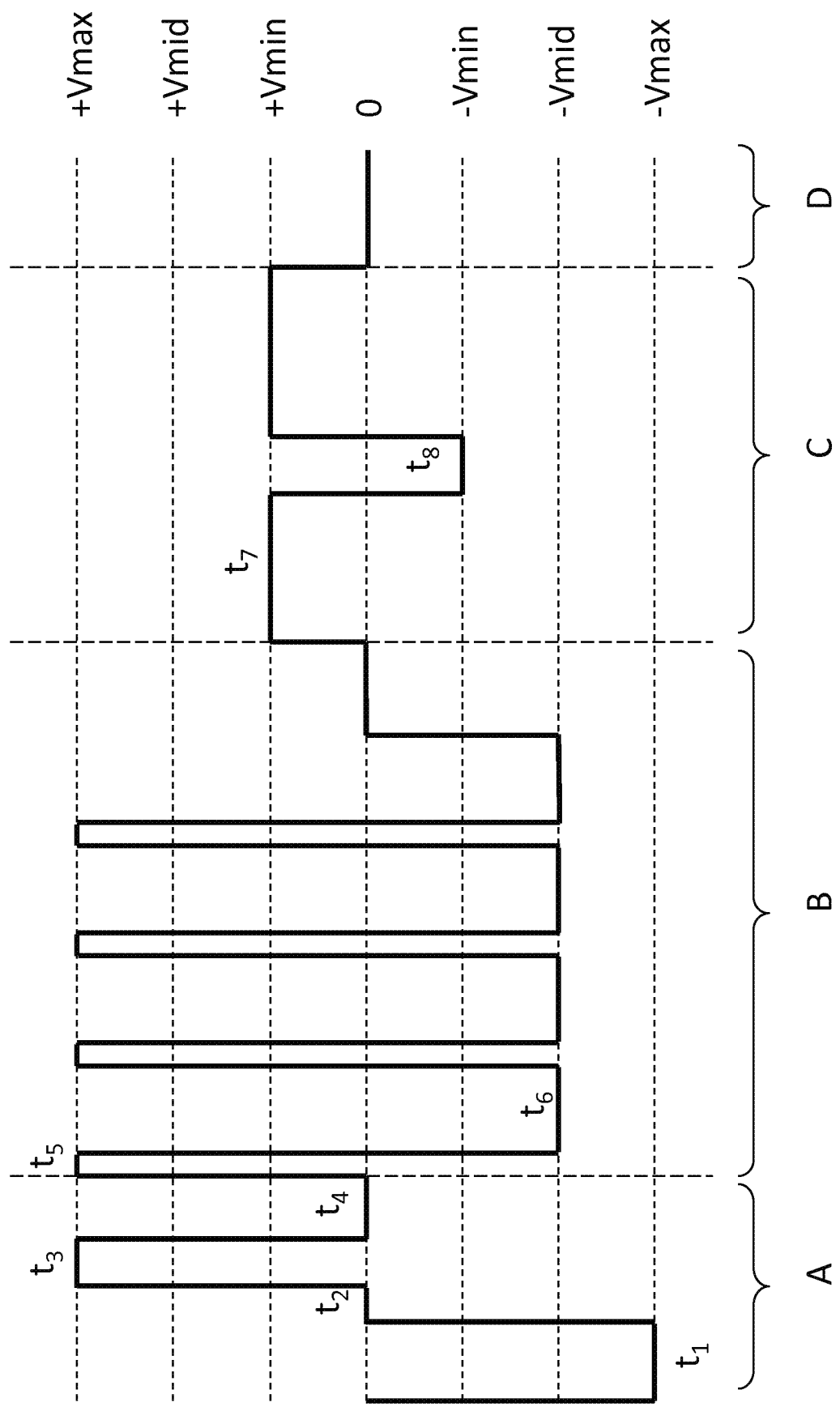
FIGS. 8-9 illustrate waveforms which may be used in place of those shown in FIGS. 5A-5B, 6A-6D and 7A-7B to drive the electrophoretic medium shown in FIG. 1 to all its color states.

From these blue, yellow, black or white optical states, the other four primary colors may be obtained by moving only the second particles (in this case the cyan particles) relative to the first particles (in this case the white particles), which is achieved using the lowest applied voltages (designated ±Vmin in FIG. 8). Thus, moving cyan out of blue (by applying −Vmin to the pixel electrodes) produces magenta (cf. FIGS. 1E and 1D for blue and magenta respectively); moving cyan into yellow (by applying +Vmin to the pixel electrodes) provides green (cf. FIGS. 1B and 1G for yellow and green respectively); moving cyan out of black (by applying −Vmin to the pixel electrodes) provides red (cf. FIGS. 1H and 1C for black and red respectively), and moving cyan into white (by applying +Vmin to the pixel electrodes) provides cyan (cf. FIGS. 1A and 1F for white and cyan respectively).

While these general principles are useful in the construction of waveforms to produce particular colors in displays of the present invention, in practice the ideal behavior described above may not be observed, and modifications to the basic scheme are desirably employed.

A generic waveform embodying modifications of the basic principles described above is illustrated in FIG. 8, in which the abscissa represents time (in arbitrary units) and the ordinate represents the voltage difference between a pixel electrode and the common front electrode. The magnitudes of the three positive voltages used in the drive scheme illustrated in FIG. 8 may lie between about +3V and +30V, and of the three negative voltages between about -3V and -30V. In one empirically preferred embodiment, the highest positive voltage, +Vmax, is +24V, the medium positive voltage, +Vmid, is 12V, and the lowest positive voltage, +Vmin, is 5V. In a similar manner, negative voltages -Vmax, -Vmid and -Vmin are; in a preferred embodiment -24V, -12V and -9V. It is not necessary that the magnitudes of the voltages |+V|=|-V| for any of the three voltage levels, although it may be preferable in some cases that this be so.

There are four distinct phases in the generic waveform illustrated in FIG. 8. In the first phase ("A" in FIG. 8), there are supplied pulses (wherein "pulse" signifies a monopole square wave, i.e., the application of a constant voltage for a predetermined time) at +Vmax and -Vmax that serve to erase the previous image rendered on the display (i.e., to "reset" the display). The lengths of these pulses ($t_1$ and $t_3$) and of the rests (i.e., periods of zero voltage between them ($t_2$ and $t_4$) may be chosen so that the entire waveform (i.e., the integral of voltage with respect to time over the whole waveform as illustrated in FIG. 8) is DC balanced (i.e., the integral is substantially zero). DC balance can be achieved by adjusting the lengths of the pulses and rests in phase A so that the net impulse supplied in this phase is equal in magnitude and opposite in sign to the net impulse supplied in the combination of phases B and C, during which phases, as described below, the display is switched to a particular desired color.

The waveform shown in FIG. 8 is purely for the purpose of illustration of the structure of a generic waveform, and is not intended to limit the scope of the invention in any way. Thus, in FIG. 8 a negative pulse is shown preceding a positive pulse in phase A, but this is not a requirement of the invention. It is also not a requirement that there be only a single negative and a single positive pulse in phase A.

As described above, the generic waveform is intrinsically DC balanced, and this may be preferred in certain embodiments of the invention. Alternatively, the pulses in phase A may provide DC balance to a series of color transitions rather than to a single transition, in a manner similar to that provided in certain black and white displays of the prior art; see for example U.S. Pat. No. 7,453,445 and the earlier applications referred to in column 1 of this patent.

In the second phase of the waveform (phase B in FIG. 8) there are supplied pulses that use the maximum and medium voltage amplitudes. In this phase the colors white, black, magenta, red and yellow are preferably rendered in the manner previously described with reference to FIGS. 5-7. More generally, in this phase of the waveform the colors corresponding to particles of type 1 (assuming that the white particles are negatively charged), the combination of particles of types 2, 3, and 4 (black), particles of type 4 (magenta), the combination of particles of types 3 and 4 (red) and particles of type 3 (yellow), are formed.

As described above (see FIG. 5B and related description), white may be rendered by a pulse or a plurality of pulses at -Vmid. In some cases, however, the white color produced in this way may be contaminated by the yellow pigment and appear pale yellow. In order to correct this color contamination, it may be necessary to introduce some pulses of a positive polarity. Thus, for example, white may be obtained by a single instance or a repetition of instances of a sequence of pulses comprising a pulse with length $T_1$ and amplitude +Vmax or +Vmid followed by a pulse with length $T_2$ and amplitude -Vmid, where $T_2 > T_1$. The final pulse should be a negative pulse. In FIG. 8 there are shown four repetitions of a sequence of +Vmax for time $t_5$ followed by -Vmid for time $t_6$. During this sequence of pulses, the appearance of the display oscillates between a magenta color (although typically not an ideal magenta color) and white (i.e., the color white will be preceded by a state of lower L* and higher a* than the final white state). This is similar to the pulse sequence shown in FIG. 6A, in which an oscillation between magenta and blue was observed. The difference here is that the net impulse of the pulse sequence is more negative than the pulse sequence shown in FIG. 6A, and thus the oscillation is biased towards the negatively charged white pigment.

As described above (see FIG. 5A and related description), black may be obtained by a rendered by a pulse or a plurality of pulses (separated by periods of zero voltage) at +Vmid.

As described above (see FIGS. 6A and 6B and related description), magenta may be obtained by a single instance or a repetition of instances of a sequence of pulses comprising a pulse with length $T_3$ and amplitude +Vmax or +Vmid, followed by a pulse with length $T_4$ and amplitude -Vmid, where $T_4 > T_3$. To produce magenta, the net impulse in this phase of the waveform should be more positive than the net impulse used to produce white. During the sequence of pulses used to produce magenta, the display will oscillate between states that are essentially blue and magenta. The color magenta will be preceded by a state of more negative a* and lower L* than the final magenta state.

As described above (see FIG. 7A and related description), red may be obtained by a single instance or a repetition of instances of a sequence of pulses comprising a pulse with length $T_5$ and amplitude +Vmax or +Vmid, followed by a pulse with length $T_6$ and amplitude -Vmax or -Vmid. To produce red, the net impulse should be more positive than the net impulse used to produce white or yellow. Preferably, to produce red, the positive and negative voltages used are substantially of the same magnitude (either both Vmax or both Vmid), the length of the positive pulse is longer than the length of the negative pulse, and the final pulse is a negative pulse. During the sequence of pulses used to produce red, the display will oscillate between states that are essentially black and red. The color red will be preceded by a state of lower L*, lower a*, and lower b* than the final red state.

Yellow (see FIGS. 6C and 6D and related description) may be obtained by a single instance or a repetition of instances of a sequence of pulses comprising a pulse with length $T_7$ and amplitude +Vmax or +Vmid, followed by a pulse with length $T_8$ and amplitude -Vmax. The final pulse should be a negative pulse. Alternatively, as described above, the color yellow may be obtained by a single pulse or a plurality of pulses at -Vmax.

In the third phase of the waveform (phase C in FIG. 8) there are supplied pulses that use the medium and minimum voltage amplitudes. In this phase of the waveform the colors blue and cyan are produced following a drive towards white in the second phase of the waveform, and the color green is produced following a drive towards yellow in the second phase of the waveform. Thus, when the waveform transients of a display of the present invention are observed, the colors blue and cyan will be preceded by a color in which b* is more positive than the b* value of the eventual cyan or blue color, and the color green will be preceded by a more yellow color in which L* is higher and a* and b* are more positive than L*, a* and b* of the eventual green color. More generally, when a display of the present invention is rendering the color corresponding to the colored one of the first and second particles, that state will be preceded by a state that is essentially white (i.e., having C* less than about 5). When a display of the present invention is rendering the color corresponding to the combination of the colored one of the first and second particles and the particle of the third and fourth particles that has the opposite charge to this particle, the display will first render essentially the color of the particle of the third and fourth particles that has the opposite charge to the colored one of the first and second particles.

Typically, cyan and green will be produced by a pulse sequence in which+Vmin must be used. This is because it is only at this minimum positive voltage that the cyan pigment can be moved independently of the magenta and yellow pigments relative to the white pigment. Such a motion of the cyan pigment is necessary to render cyan starting from white or green starting from yellow.

Finally, in the fourth phase of the waveform (phase D in FIG. 8) there is supplied a zero voltage.

Although the display of the invention has been described as producing the eight primary colors, in practice, it is preferred that as many colors as possible be produced at the pixel level. A full color gray scale image may then be rendered by dithering between these colors, using techniques well known to those skilled in imaging technology. For example, in addition to the eight primary colors produced as described above, the display may be configured to render an additional eight colors. In one embodiment, these additional colors are: light red, light green, light blue, dark cyan, dark magenta, dark yellow, and two levels of gray between black and white. The terms "light" and "dark" as used in this context refer to colors having substantially the same hue angle in a color space such as CIE L*a*b* as the reference color but a higher or lower L*, respectively.

In general, light colors are obtained in the same manner as dark colors, but using waveforms having slightly different net impulse in phases B and C. Thus, for example, light red, light green and light blue waveforms have a more negative net impulse in phases B and C than the corresponding red, green and blue waveforms, whereas dark cyan, dark magenta, and dark yellow have a more positive net impulse in phases B and C than the corresponding cyan, magenta and yellow waveforms. The change in net impulse may be achieved by altering the lengths of pulses, the number of pulses, or the magnitudes of pulses in phases B and C.

Gray colors are typically achieved by a sequence of pulses oscillating between low or mid voltages.

It will be clear to one of ordinary skill in the art that in a display of the invention driven using a thin-film transistor (TFT) array the available time increments on the abscissa of FIG. 8 will typically be quantized by the frame rate of the display. Likewise, it will be clear that the display is addressed by changing the potential of the pixel electrodes relative to the front electrode and that this may be accomplished by changing the potential of either the pixel electrodes or the front electrode, or both. In the present state of the art, typically a matrix of pixel electrodes is present on the backplane, whereas the front electrode is common to all pixels. Therefore, when the potential of the front electrode is changed, the addressing of all pixels is affected. The basic structure of the waveform described above with reference to FIG. 8 is the same whether or not varying voltages are applied to the front electrode.

The generic waveform illustrated in FIG. 8 requires that the driving electronics provide as many as seven different voltages to the data lines during the update of a selected row of the display. While multi-level source drivers capable of delivering seven different voltages are available, many commercially-available source drivers for electrophoretic displays permit only three different voltages to be delivered during a single frame (typically a positive voltage, zero, and a negative voltage). Herein the term "frame" refers to a single update of all the rows in the display. It is possible to modify the generic waveform of FIG. 8 to accommodate a three level source driver architecture provided that the three voltages supplied to the panel (typically +V, 0 and−V) can be changed from one frame to the next. (i.e., such that, for example, in frame n voltages (+Vmax, 0, −Vmin) could be supplied while in frame n+1 voltages (+Vmid, 0, −Vmax) could be supplied).

Figure 9:
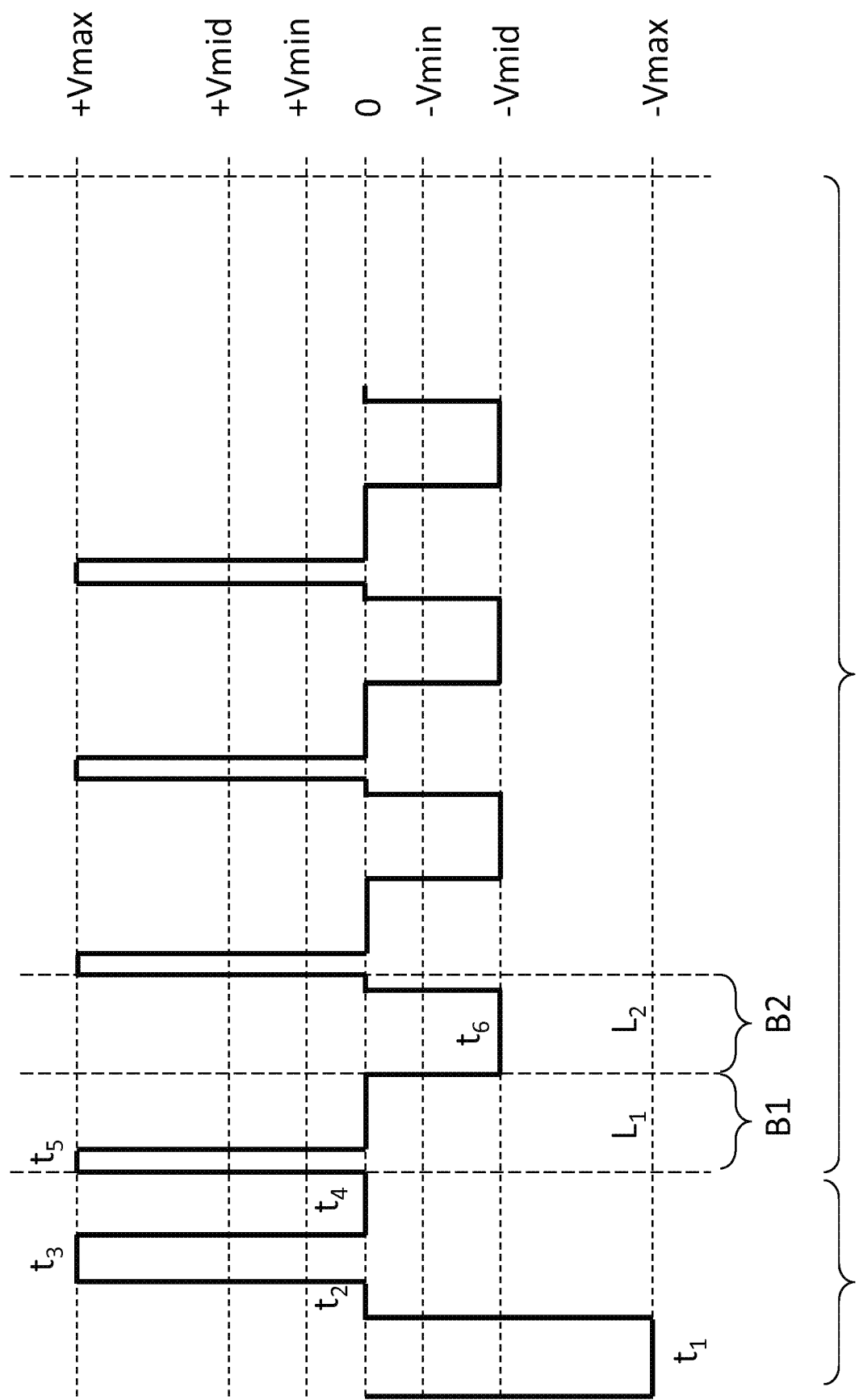

Since the changes to the voltages supplied to the source drivers affect every pixel, the waveform needs to be modified accordingly, so that the waveform used to produce each color must be aligned with the voltages supplied. FIG. 9 shows an appropriate modification to the generic waveform of FIG. 8. In phase A, no change is necessary, since only three voltages (+Vmax, 0, −Vmax) are needed. Phase B is replaced by subphases B1 and B2 are defined, of lengths $L_1$ and $L_2$, respectively, during each of which a particular set of three voltages are used. In FIG. 9, in phase B1 voltages+ Vmax, 0, −Vmax) are available, while in phase B2 voltages +Vmid, 0, −Vmid are available. As shown in FIG. 9, the waveform requires a pulse of+Vmax for time $t_5$ in subphase B1. Subphase B1 is longer than time $t_5$ (for example, to accommodate a waveform for another color in which a pulse longer than $t_5$ might be needed), so a zero voltage is supplied for a time $L_1$-$t_5$. The location of the pulse of length $t_5$ and the zero pulse or pulses of length $L_1$-$t_5$ within subphase B1 may be adjusted as required (i.e., subphase B1 does not necessarily begin with the pulse of length $t_5$ as illustrated). By subdividing the phases B and C in to subphases in which there is a choice of one of the three positive voltages, one of the three negative voltages and zero, it is possible to achieve the same optical result as would be obtained using a multilevel source driver, albeit at the expense of a longer waveform (to accommodate the necessary zero pulses).

When top plane switching is used in combination with a three-level source driver, the same general principles apply as described above with reference to FIG. 9. Top plane switching may be preferred when the source drivers cannot supply a voltage as high as the preferred Vmax. Methods for driving electrophoretic displays using top plane switching are well known in the art.

A typical waveform according to the second drive scheme of the invention is shown below in Table 3, where the numbers in parentheses correspond to the number of frames driven with the indicated backplane voltage (relative to a top plane assumed to be at zero potential).

TABLE 3

|   | Reset Phase | | High/Mid V Phase (N repetitions of frame sequence below) | | | | Low/Mid V phase | |
|---|---|---|---|---|---|---|---|---|
| K | −Vmax(60 + $\Delta_K$) | Vmax(60 − $\Delta_K$) | Vmid(5) | Zero(9) | | | Zero(50) | |
| B | −Vmax(60 + $\Delta_B$) | Vmax(60 − $\Delta_B$) | Vmax(2) | Zero(5) | −Vmid(7) | Vmid(40) | Zero(10) |
| R | −Vmax(60 + $\Delta_R$) | Vmax(60 − $\Delta_R$) | Vmax(7) | Zero(3) | −Vmax(4) | Zero(50) | |
| M | −Vmax(60 + $\Delta_M$) | Vmax(60 − $\Delta_M$) | Vmax(4) | Zero(3) | −Vmid(7) | Zero(50) | |
| G | −Vmax(60 + $\Delta_G$) | Vmax(60 − $\Delta_G$) | Vmid(7) | Zero(3) | −Vmax(4) | Vmin(40) | Zero(10) |
| C | −Vmax(60 + $\Delta_C$) | Vmax(60 − $\Delta_C$) | Vmax(2) | Zero(5) | −Vmid(7) | Vmin(40) | Zero(10) |
| Y | −Vmax(60 + $\Delta_Y$) | Vmax(60 − $\Delta_Y$) | Vmid(7) | Zero(3) | −Vmax(4) | Zero(50) | |
| W | −Vmax(60 + $\Delta_W$) | Vmax(60 − $\Delta_W$) | Vmax(2) | Zero(5) | −Vmid(7) | Zero(50) | |

In the reset phase, pulses of the maximum negative and positive voltages are provided to erase the previous state of the display. The number of frames at each voltage are offset by an amount (shows as A for color x) that compensates for the net impulse in the High/Mid voltage and Low/Mid voltage phases, where the color is rendered. To achieve DC balance, A is chosen to be half that net impulse. It is not necessary that the reset phase be implemented in precisely the manner illustrated in the Table; for example, when top plane switching is used it is necessary to allocate a particular number of frames to the negative and positive drives. In such a case, it is preferred to provide the maximum number of high voltage pulses consistent with achieving DC balance (i.e., to subtract $2\Delta_x$ from the negative or positive frames as appropriate).

In the High/Mid voltage phase, as described above, a sequence of N repetitions of a pulse sequence appropriate to each color is provided, where N can be 1-20. As shown, this sequence comprises 14 frames that are allocated positive or negative voltages of magnitude Vmax or Vmid, or zero. The pulse sequences shown are in accord with the discussion given above. It can be seen that in this phase of the waveform the pulse sequences to render the colors white, blue and cyan are the same (since blue and cyan are achieved in this case starting from a white state, as described above). Likewise, in this phase the pulse sequences to render yellow and green are the same (since green is achieved starting from a yellow state, as described above).

In the Low/Mid voltage phase the colors blue and cyan are obtained from white, and the color green from yellow.

Table 4 shows the results from driving a display made using a coating prepared as described in Example 11, Part A, below laminated to a thin-film transistor array backplane. The waveform used was similar to that illustrated in Table 3 where N=18, and the display was addressed at 65 frames per second with preferred voltages as described above.

TABLE 4

| Color | L* | a* | b* |
|---|---|---|---|
| K | 20 | 4 | −5 |
| B | 24 | 5 | −13 |
| R | 42 | 27 | 23 |
| M | 40 | 25 | 0 |
| G | 36 | −12 | 6 |
| C | 37 | −8 | −15 |
| Y | 65 | 3 | 40 |
| W | 70 | 2 | 5 |
| Gamut Volume ($\Delta E^3$) | 20630 | | |

EXAMPLES

Examples are now given, though by way of illustration only, to show details of preferred electrophoretic media of the present invention and processes for driving these preferred electrophoretic media. The particles used in these Examples are as follows.

White particle W1 is a silanol-functionalized light-scattering pigment (titanium dioxide) to which a polymeric material comprising lauryl methacrylate (LMA) monomers has been attached as described in U.S. Pat. No. 7,002,728.

White particle W2 is a polymer-coated titania produced substantially as described in Example 1 of U.S. Pat. No. 5,852,196, with a polymer coating comprising an approximately 99:1 ratio of lauryl methacrylate and 2,2,2-trifluoroethyl methacrylate.

Yellow particle Y1 is C.I. Pigment Yellow 180, used without coating and dispersed by attrition in the presence of Solsperse 19000, as described generally in the aforementioned application Ser. No. 14/277,107 and in Example 1, below.

Yellow particle Y2 is C.I. Pigment Yellow 155 used without coating and dispersed by attrition in the presence of Solsperse 19000, as described generally in the aforementioned application Ser. No. 14/277,107 and in Example 2, below.

Yellow particle Y3 is C.I. Pigment Yellow 139, used without coating and dispersed by attrition in the presence of Solsperse 19000, as described generally in the aforementioned application Ser. No. 14/277,107 and in Example 3, below.

Yellow particle Y4 is C.I. Pigment Yellow 139, which is coated by dispersion polymerization, incorporating trifluoroethyl methacrylate, methyl methacrylate and dimethylsiloxane-containing monomers in a manner described in Example 4 below.

Magenta particle M1 is a positively-charged magenta material (dimethylquinacridone, C.I. Pigment Red 122) coated using vinylbenzyl chloride and LMA as described in the aforementioned application Ser. No. 14/277,107 and in Example 5, below.

Magenta particle M2 is a C.I. Pigment Red 122 which is coated by dispersion polymerization, methyl methacrylate and dimethylsiloxane-containing monomers in a manner described in Example 6 below.

Cyan particle C1 is a copper phthalocyanine material (C.I. Pigment Blue 15:3) which is coated by dispersion polymerization, incorporating methyl methacrylate and dimethylsiloxane-containing monomers in a manner described in Example 7 below.

Example 1

Preparation of Yellow Pigment Y1

A yellow pigment, Novoperm Yellow P-HG (available from Clariant, Basel, Switzerland), (26 g) was combined with Isopar G (70 g) and a solution of Solsperse 19000 (available from Lubrizol Corporation, Wickliffe, Ohio, 70 g of a 20% w/w solution in Isopar G). The resulting mixture was dispersed by attriting with 250 mL of glass beads for 1 hour at 600 RPM, then filtering through a 200 µm mesh screen to afford a yellow pigment dispersion.

Example 2

Preparation of Yellow Pigment Y2

A yellow pigment, Inkjet Yellow 4GC (available from Clamant, Basel, Switzerland), (26 g) was combined with Isopar G (70 g) and a solution of Solsperse 19000 (available from Lubrizol Corporation, Wickliffe, Ohio, 70 g of a 20% w/w solution in Isopar G). The resulting mixture was dispersed by attriting with 250 mL of glass beads for 1 hour at 600 RPM, then filtering through a 200 µm mesh screen to afford a yellow pigment dispersion.

Example 3

Preparation of Yellow Pigment Y3

A yellow pigment, Novoperm Yellow P-M3R (available from Clariant, Basel, Switzerland), (28 g) was combined with Isopar G (70 g) and a solution of Solsperse 19000 (available from Lubrizol Corporation, Wickliffe, Ohio, 70 g of a 20% w/w solution in Isopar G). The resulting mixture was dispersed by attriting with 250 mL of glass beads for 1 hour at 600 RPM, then filtering through a 200 µm mesh screen to afford a yellow pigment dispersion.

Example 4

Preparation of Yellow Pigment Y4

To a 2 L plastic bottle were added 64.0 g Novoperm Yellow P M3R (Clariant Corporation 118380), 12.6 g 2,2, 2-trifluoroethyl methacrylate, 42.5 g methyl methacrylate, 100 g monomethacrylate terminated poly(dimethylsiloxane) (Gelest MCR-M22, molecular weight 10,000), 376 g Isopar E, 80 g 20 wt % Solsperse 17000 solution and Zirconox beads (1.7-2.4 mm). The bottle was rolled for 24 h then poured through 200 µm mesh into a 500 mL reactor. The reactor was assembled with a nitrogen immersion tube, overhead stirring impeller and an air condenser. The overhead air stirrer was set to 400 rpm and the reaction mixture was purged with nitrogen for 30 min at 65 ° C., after which the immersion tube was removed and the rotometer nitrogen level set. In a small vial, 0.358 g 2,2'-azobis(2-methylpropionitrile) (AIBN) was dissolved in ethyl acetate and added to a syringe. The vial was then rinsed with ethyl acetate and added to the same syringe. The resultant AIBN solution was injected into the reactor over 30 min and the reaction mixture was heated for 16-24 hours. The reaction mixture was dispensed into a 1 L centrifuge bottle and centrifuged. The supernatant was decanted, and the remaining pigment was washed with Isopar E and centrifuged. This washing process was repeated two additional times, and after the final supernatant was decanted, the remaining pigment was dried in a vacuum oven at room temperature overnight.

The dried pigment was dispersed to a 25 per cent by weight mixture with Isopar G using sonication and rolling, and the resulting dispersion was filtered through 200 µm mesh and the percentage of solid material in the dispersion measured.

Example 5

Preparation of Magenta Pigment M1

Ink Jet Magenta E 02 (available from Clariant Corporation, 15 g) was dispersed in toluene (135 g). The dispersion was transferred to a 500 mL round bottom flask and the headspace was degassed with nitrogen. The resultant reaction mixture was brought to 42 C and, upon temperature equilibration, 4-vinylbenzylchloride was added and the reaction mixture was allowed to stir at 42 C under nitrogen overnight. The resulting product was allowed to cool to room temperature and centrifuged to isolate the functionalized pigment. The centrifuge cake was washed three times with toluene to give the functionalized magenta pigment (14.76 g). This functionalized magenta pigment was treated with a poly(lauryl methacrylate) as described in the above-mentioned U.S. Pat. No. 7,002,728, and then combined with Isopar E to give a magenta pigment dispersion, which was filtered through a 200 µm mesh film and its percentage solids was determined to be 17.8%.

Example 6

Preparation of Magenta Pigment M2

To a 1 L plastic bottle were added 32.0 g Ink Jet Magenta E 02 (Clariant Corporation), 26.5 g methyl methacrylate, 53 g monomethacrylate terminated poly(dimethylsiloxane) (Gelest MCR-M22, molecular weight 10,000), 220 g Isopar E and Zirconox beads (1.7-2.4 mm). The bottle was rolled for 2 h, then 250 g of Isopar E was added to the pigment mixture. This was then poured through 200 µm mesh into a 1 L reactor. The reactor was assembled with a nitrogen immersion tube, overhead stirring impeller and an air condenser. The overhead air stirrer was set to 400 rpm and the reaction mixture was purged with nitrogen for 30 min at 65° C., after which the immersion tube was removed and the rotometer nitrogen level set. In a small vial, 0.6 g 2,2'-azobis (2-methylpropionitrile) (AIBN) was dissolved in ethyl acetate and added to a syringe. The vial was then rinsed with ethyl acetate and added to the same syringe. The resultant AIBN solution was injected into the reactor over 30 min and the reaction mixture was heated for 16-24 hours. The reaction mixture was dispensed into a 1 L centrifuge bottle and centrifuged. The supernatant was decanted, and the remaining pigment was washed with Isopar E and centrifuged. This washing process was repeated two additional times, and after the final supernatant was decanted, the remaining pigment was dried in a vacuum oven at room temperature overnight.

The dried pigment was dispersed to a 25 per cent by weight mixture with Isopar G using sonication and rolling, and the resulting dispersion was filtered through 200 µm mesh and the percentage of solid material in the dispersion measured.

Example 7

Preparation of Cyan Pigment C1

To a 1 L plastic bottle were added 32.0 g Hostaperm Blue B2G-EDS (Clariant Corporation 225226), 15 g methyl methacrylate, 30 g monomethacrylate terminated poly-(dimethylsiloxane) (Gelest MCR-M22, molecular weight 10,000), 220 g Isopar E and Zirconox beads (1.7-2.4 mm). The bottle was rolled for 24 h then poured through 200 µm mesh into a 500 mL reactor. The reactor was assembled with a nitrogen immersion tube, overhead stirring impeller and an air condenser. The overhead air stirrer was set to 400 rpm and the reaction mixture was purged with nitrogen for one hour at 65° C., after which the immersion tube was removed and the rotometer nitrogen level set. In a small vial, 0.189 g 2,2'-azobis(2-methylpropionitrile) (AIBN) was dissolved in ethyl acetate and added to a syringe. The vial was then rinsed with ethyl acetate and added to the same syringe. The resultant AIBN solution was injected into the reactor over 30 min and the reaction mixture was heated for 16-24 hours. The reaction mixture was dispensed into a 1 L centrifuge bottle and centrifuged. The supernatant was decanted, and the remaining pigment was washed with Isopar E and centrifuged. This washing process was repeated three additional times, and after the final supernatant was decanted, the remaining pigment was dried in a vacuum oven at room temperature overnight.

The dried pigment was dispersed to a 25 per cent by weight mixture with Isopar G using sonication and rolling, and the resulting dispersion was filtered through 200 μm mesh and the percentage of solid material in the dispersion measured.

Example 8

Measurement of Adsorption Isotherm of Solsperse 19000 Onto Particles of the Invention gram samples at 10% w/w concentration in solvent (for white particles) or 5% w/w concentration in Isopar G solvent (for colored particles) were prepared containing Solsperse 19000 at 10-20 concentrations varying from zero to about 0.5 g/g of pigment. The samples were allowed to equilibrate with mixing at least 24 hours at room temperature, then the particles were removed by centrifugation at 3500 rpm for 1 hour (white pigments) or 20000 rpm for 1 hour for colored samples. The conductivity of the supernatants was measured and the concentration of Solsperse 19000 remaining was determined relative to a calibration curve.

Figure 10:
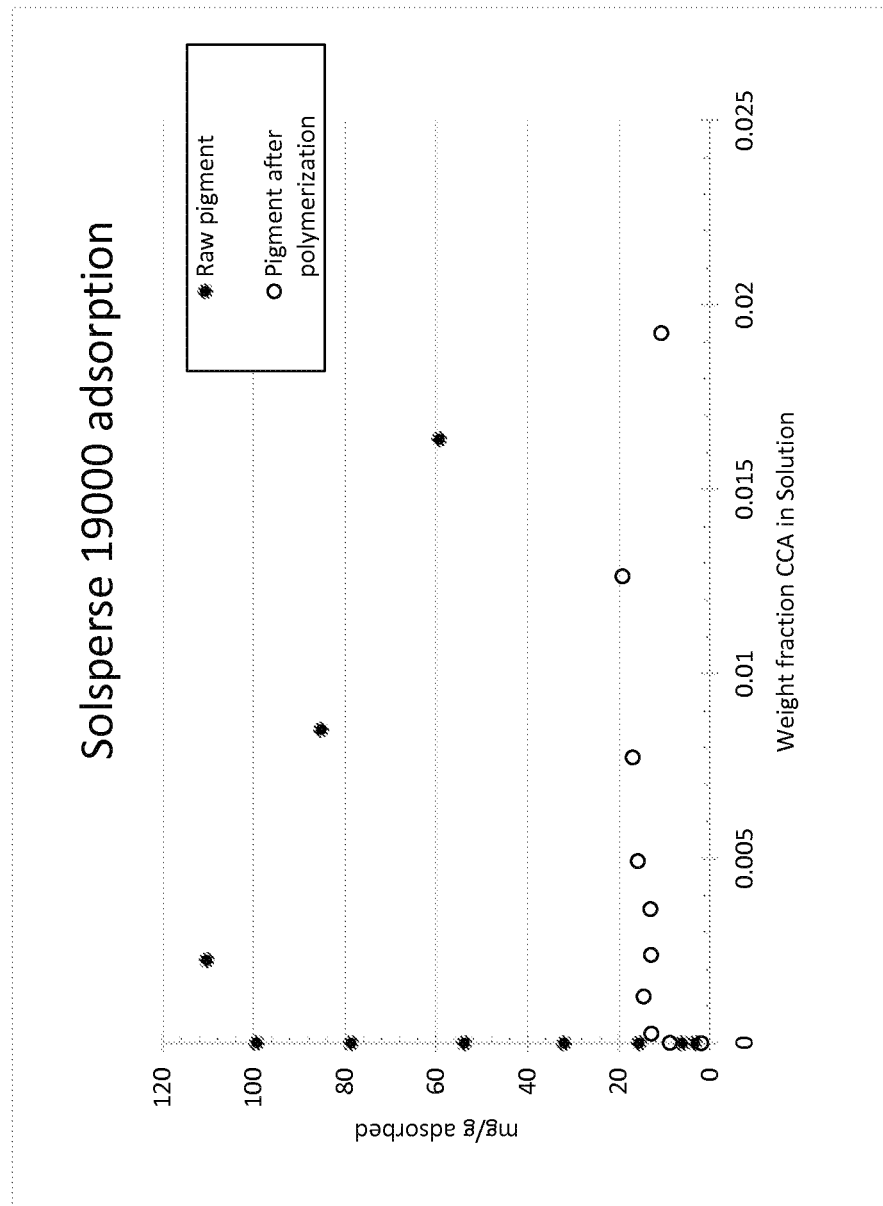
FIGS. 10 is a graph illustrating the adsorption of a charge control agent on to certain particles of the invention.

Results obtained with cyan particles C1 and the raw pigment (C.I. Pigment Blue 15:3, Hostaperm Blue B2G-EDS available from Clamant) are shown in FIG. 10. It can be seen that the polymer shell reduces the amount of Solsperse 19000 adsorbed onto the particles from about 100 mg/g to about 15 mg/g. The adsorption of Solsperse 19000 on the raw cyan pigment observed in FIG. 10 appears to be diminished as more surfactant is added. This is an artifact of the measurement. In an ideal measurement, the adsorbed amount would reach a plateau. In the experiment described, at very high surfactant levels some fine particles are created which could not be fully removed from the supernatant. As a result the conductivity of the supernatant is higher (owing to the present of charged cyan fines) than it would be if the pigment were entirely removed. No similar artifact is observed for the dispersion polymerized samples, suggesting that the pigment is entirely engulfed in polymer and that the primary particle size (and hence surface area) of the cyan core is not material to the experiment.

Example 9

Visualization of Particles of the Invention Moving in an Electric Field

Part A: Preparation of Electrophoretic Fluids

Fluid (i): 0.91 g of a 22% w/w dispersion of particle C1 prepared as described in Example 7 above in Isopar G containing 0.36% w/w of a 4:1 mass ratio of Solsperse 19000: Solsperse 17000 was combined with 1.33 g of a 15% w/w dispersion of particle Y3 prepared as described in Example 3 above in Isopar G containing 0.36% w/w of a 4:1 mass ratio of Solsperse 19000: Solsperse 17000 and 17.76 g of Isopar G containing 0.36% w/w of a 4:1 mass ratio of Solsperse 19000: Solsperse 17000. The dispersions of particles C1 and Y3 had previously been centrifuged at 20,000 rpm for 45 minutes and rediluted with Isopar G containing 0.36% w/w of a 4:1 mass ratio of Solsperse 19000: Solsperse 17000 three times to ensure that any soluble impurities had been removed. After the fluid had been prepared it was dispersed by sonication for 90 minutes before use.

Fluid (ii): 1.33 g of a 15% w/w dispersion of particle M1 prepared as described in Example 5 above in Isopar G containing 0.36% w/w of a 4:1 mass ratio of Solsperse 19000: Solsperse 17000 was combined with 1.33 g of a 15% w/w dispersion of particle Y3 prepared as described in Example 3 above in Isopar G containing 0.36% w/w of a 4:1 mass ratio of Solsperse 19000: Solsperse 17000 and 17.34 g of Isopar G containing 0.36% w/w of a 4:1 mass ratio of Solsperse 19000: Solsperse 17000. The dispersions of particles M1 and Y3 had previously been centrifuged at 20,000 rpm for 45 minutes and rediluted with Isopar G containing 0.36% w/w of a 4:1 mass ratio of Solsperse 19000: Solsperse 17000 three times to ensure that any soluble impurities had been removed. After the fluid had been prepared it was dispersed by sonication for 90 minutes before use.

Part B: Visualization of Particle Motion

Figure 11:
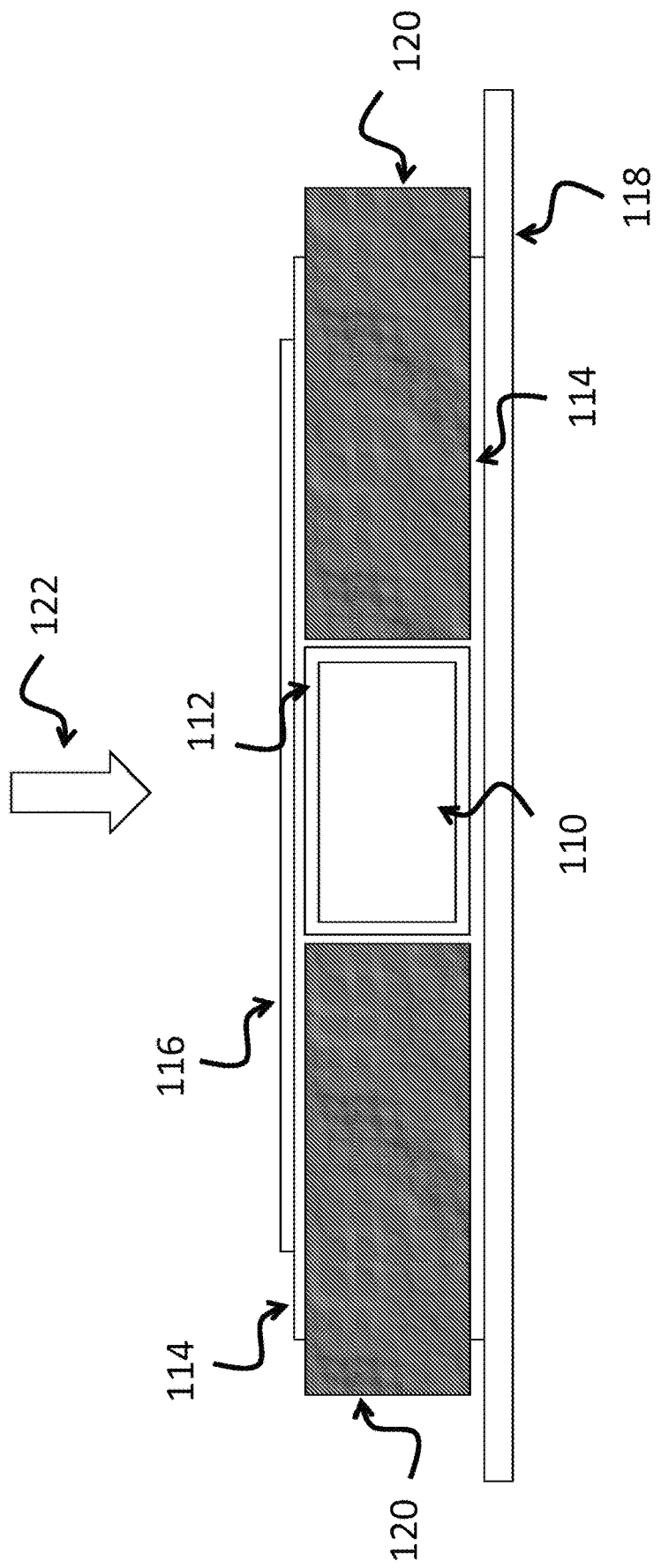
FIG. 11 is a schematic cross-section through an apparatus used in Example 9 below to view the motion of particles of the invention when subjected to an electric field.

Fluids (i)—(ii) were visualized using the apparatus illustrated in FIG. 11. The walls 112 of the borosilicate glass capillary with rectangular cross-section were 20 μm in thickness, and the central cavity 110 had width 200 μm and height 20 μm. The capillary was sealed between two metal electrodes 120 and two sheets of borosilicate glass 116 and 118, using a 5-minute curable epoxy adhesive 114. To minimize the thickness of epoxy between capillary and electrodes, the electrodes were held pushed towards each other while epoxy was curing.

The fluid was loaded via a syringe into the capillary, followed by a short wait for the flow to subside. Leaving the other end of the capillary open helps relieve the pressure once the syringe is released, and speeds up the cessation of flow.

Figure 12:
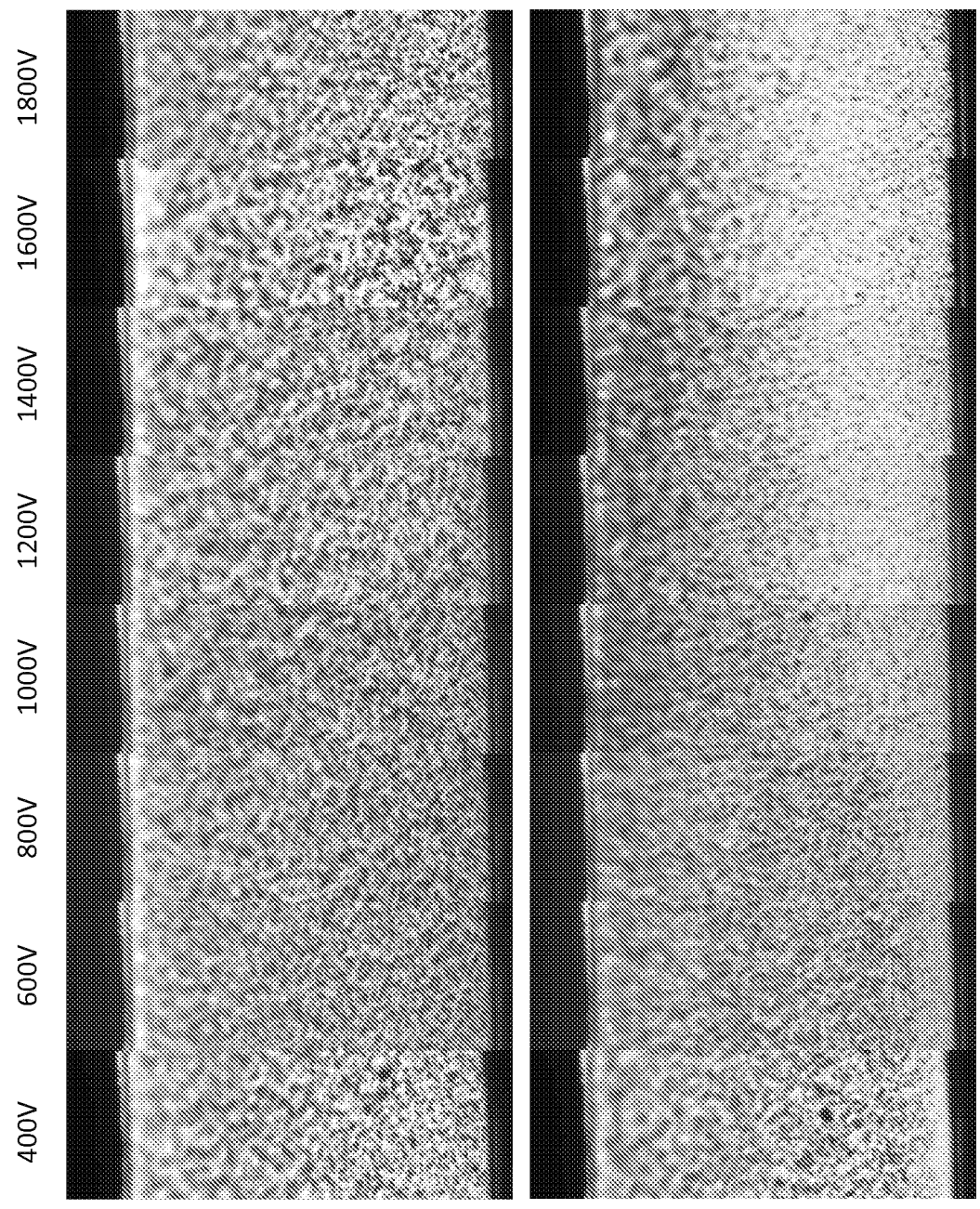
FIGS. 12 and 13 are images of the motion of mixtures of magenta and yellow particles of the invention, and cyan and yellow particles of the invention, respectively, when subjected to an electric field.
Figure 13:
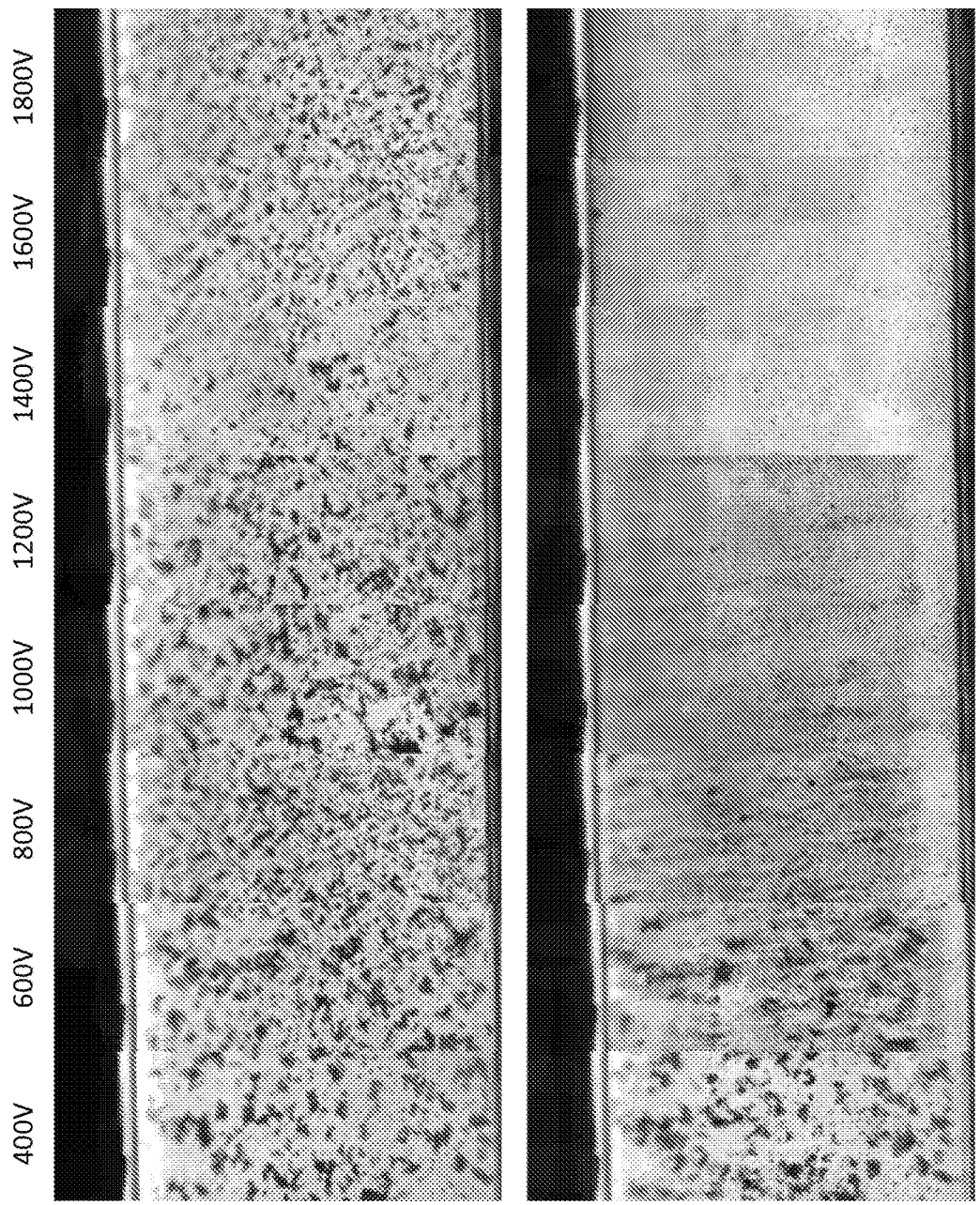

The electrophoretic fluid was then subjected to an applied voltage as shown in FIGS. 12 and 13, while images of motion were captured with a microscope 122 equipped with a camera sampling at 112 frames/second. Between different applied voltages, i.e. between different tests, the electrophoretic fluid in the capillary was replaced by fresh fluid from the syringe. Between different samples the same capillary tube was flushed with ~2 mil of a solution of a 4:1 ratio of Solsperse 19000:Solsperse 17000 at 0.1% w/w concentration in Isopar E until the solution coming out of the device was optically clear, then the next sample was loaded. In this way the geometry (and therefore the electric field experienced by the fluid) remained constant. In FIGS. 12 and 13 the cathode is the top electrode and the anode the bottom electrode.

FIG. 12 shows the result of applying an electric field to the mixture of magenta pigment M1 and yellow pigment Y3 (fluid (i)). At even the highest voltage the aggregate between these two pigments is not separated, remaining as reddish conglomerates that migrate towards the cathode.

FIG. 13 shows the result of applying an electric field to the mixture of cyan pigment C1 and yellow pigment Y3 (fluid (ii)). At applied voltages of 1000 V and higher the two pigments are separated, the cyan traveling towards the cathode and the yellow towards the anode.

It is clear from FIGS. 12 and 13 that pigments M1 and Y3 of the present invention form aggregates that remain intact when subjected to electric fields that separate pigments C1 and Y3 of the invention. Alternatively stated, the electric field strength required to separate aggregates is in the order P3-P4 >P3-P2 for particles of types 2, 3 and 4.

Example 10

Electrostatic Separation of Particles

Part A: Preparation of Electrophoretic Fluids

Fluid (i): The white particle dispersion (W1) prepared as described in Example 12, Part A below (0.11 g) was combined with the cyan particle dispersion (C1) prepared in Example 7 above (0.13 g), Solsperse 19000 (60 mg of a 2% w/w solution in Isopar G), Solsperse 17000 (10 mg of a 2% w/w solution in Isopar G) and Isopar G (3.49 g). This resultant mixture was mixed thoroughly overnight and sonicated for 90 minutes to produce an electrophoretic fluid (i.e., an electrophoretic composition comprising a pigment in a mobile phase). The mixture was then diluted by combining the electrophoretic fluid (1.0 g) with additional Isopar G (9.0 g). This resultant mixture was mixed thoroughly overnight and sonicated for 90 minutes.

Fluid (ii): The white pigment dispersion (W1) prepared as described in Example 12, Part A below (0.11 g) was combined with the magenta particle dispersion (M1) prepared as described in Example 5 above (0.13 g), Solsperse 19000 (200 mg of a 2% w/w solution in Isopar G), Solsperse 17000 (50 mg of a 2% w/w solution in Isopar G) and Isopar G (3.17 g). This resultant mixture was mixed thoroughly overnight and sonicated for 90 minutes to produce an electrophoretic fluid (i.e., an electrophoretic composition comprising a pigment in a mobile phase). This mixture was then diluted by combining the electrophoretic fluid (1.0 g) with additional Isopar G (9.0 g). This resultant mixture was mixed thoroughly overnight and sonicated for 90 minutes.

Fluid (iii): The yellow particle dispersion (Y3) described in Example 3 above (0.32 g) was combined with the magenta particle dispersion (M1) as described in Example 5 above (0.23 g), Solsperse 19000 (260 mg of a 2% w/w solution in Isopar G), Solsperse 17000 (70 mg of a 2% w/w solution in Isopar G) and Isopar G (2.77 g). This resultant mixture was mixed thoroughly overnight and sonicated for 90 minutes to produce an electrophoretic fluid (i.e., an electrophoretic composition comprising a pigment in a mobile phase). The mixture was then diluted by combining the electrophoretic fluid (1.0 g) with additional Isopar G (9.0 g). This resultant mixture was mixed thoroughly overnight and sonicated for 90 minutes.

Part B: Testing of Electrophoretic Fluids

ITO coated glass slides (approximately 25 cm×17.5 mm) were submerged into a reservoir containing electrophoretic fluid to a depth of approximately 20 mm. The gap between the glass plates was held constant at a distance of 10 mm, with the ITO coated sides facing each other. Electrical connections were then made to the ITO coated sides of both plates and a DC bias of 500 V applied for a total of 30 seconds.

Figure 14:
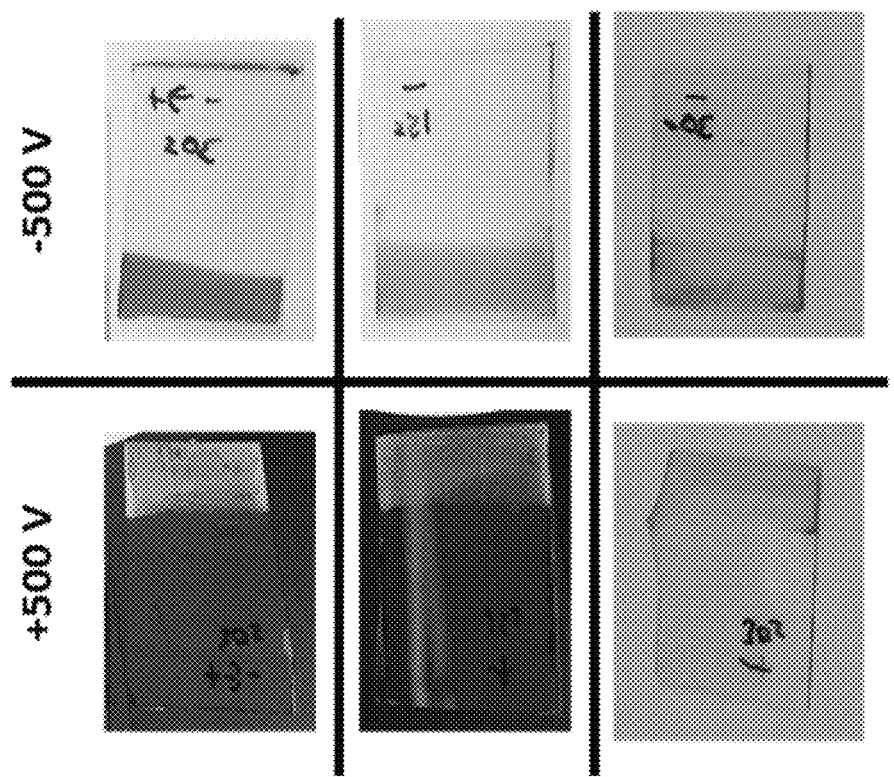
FIG. 14(a) is a photograph of ITO coated glass slides after being submerged in a formulation containing cyan and white pigments and DC biased for 30 seconds at 500 V.
FIG. 14(b) is a photograph of ITO coated glass slides after being submerged in a formulation containing magenta and white pigments and DC biased for 30 seconds at 500 V.
FIG. 14(c) is a photograph of ITO coated glass slides after being submerged in a formulation containing magenta and yellow pigments and DC biased for 30 seconds at 500 V.

The slides were then removed from the electrophoretic fluid and immediately rinsed with approximately 1 mL of Isopar E in order to remove any material not adhered to the electrode surface. The slides were then examined to determine which particles had adhered to each slide. As can be seen in FIG. 14 (a), the white and cyan particles were cleanly separated when fluid (i) was tested, the white particles depositing on the anode and the cyan particles on the cathode. On the other hand, as seen in FIG. 14 (b), when the magenta/white fluid (ii) was tested, both pigments were seen deposited together (this is particularly clear on the anode). Even more dramatic was the result with fluid (iii), magenta/yellow: in this case magenta and yellow pigments were not separated and each was visible on both the anode and the cathode. The conclusion of these experiments is that the electric field strength required to separate aggregates is in the order P1-P4>P1-P2 and P3-P4>P1-P2 for particles of types 2, 3 and 4.

Example 11

Reduced Pigment Set

Part A : Preparation of a Yellow Particle Dispersion (Y3)

A yellow pigment, Novoperm Yellow P-M3R (available from Clariant, Basel, Switzerland) (28 g), was combined with Isopar G (116 g) and a solution of Solsperse 19000 (available from Lubrizol Corporation, Wickliffe, Ohio, 24 g of a 20% w/w solution in Isopar G). The resulting mixture was dispersed by attriting with 250 mL of glass beads for 1 hour at 600 RPM, then filtering through a 200 μm mesh screen to afford a yellow particle dispersion.

Part B: Preparation of Electrophoretic Fluids

Fluid (i): The white particle dispersion (W1) prepared as described in Example 12, Part A below (4.94 g) was combined with the magenta particle dispersion (M1) prepared as described in Example 5 above (0.92 g), the yellow pigment dispersion as described above (0.90 g), Solsperse 19000 (0.23 g of a 20% w/w solution in Isopar G), Solsperse 17000 (0.09 g of a 20% w/w solution in Isopar G), Isopar G (2.42 g) and poly(isobutylene) of molecular weight 850,000 (0.49 g of a 15% w/w solution in Isopar G). The resultant mixture was mixed thoroughly overnight and sonicated for 90 minutes to produce an electrophoretic fluid.

Fluid (ii): The white particle dispersion (W1) prepared as described in Example 12, Part A below (4.94 g) was combined with the cyan particle dispersion (C1) prepared as described in Example 7 above (0.61 g of a 24.8% w/w dispersion), the yellow pigment dispersion as described above (0.90 g), Solsperse 19000 (0.15 g of a 20% w/w solution in Isopar G), Solsperse 17000 (0.07 g of a 20% w/w solution in Isopar G), Isopar G (2.83 g) and poly(isobutylene) of molecular weight 850,000 (0.49 g of a 15% w/w solution in Isopar G). The resultant mixture was mixed thoroughly overnight and sonicated for 90 minutes to produce an electrophoretic fluid.

Fluid (iii): The white particle dispersion (W1) prepared as described in Example 12, Part A below (4.94 g) was combined with the magenta particle dispersion (M1) prepared as described in Example 5 above (0.92 g), the cyan particle dispersion (C1) prepared as described in Example 7 above (0.61 g of a 24.8% w/w dispersion), Solsperse 19000 (0.26 g of a 20% w/w solution in Isopar G), Solsperse 17000 (0.06 g of a 20% w/w solution in Isopar G), Isopar G (2.71 g) and poly(isobutylene) of molecular weight 850,000 (0.49 g of a 15% w/w solution in Isopar G). The resultant mixture was mixed thoroughly overnight and sonicated for 90 minutes to produce an electrophoretic fluid.

Fluid (iv): The white particle dispersion (W1) prepared as described in Example 12, Part A below (34.59g of a 60% w/w dispersion) was combined with the magenta dispersion prepared as described in Example 5 above (6.45 g of a 16.5% w/w dispersion), the cyan dispersion prepared as described in Example 7 above (4.97 g of a 24.8% w/w dispersion), the yellow pigment dispersion prepared as described in Example 3 above (6.29 g of a 16.7% w/w dispersion), Solsperse 17000 (0.66 g of a 20% w/w solution in Isopar G), Isopar G (13.7 g) and poly(isobutylene) of molecular weight 850,000 (3.35 g of a 15% w/w solution in Isopar G). The resultant mixture was mixed thoroughly overnight and sonicated for 90 minutes to produce an electrophoretic fluid.

Part C: Preparation of a Display Device

An array of microcells embossed onto a poly(ethylene terephthalate) film with a coating of a transparent conductor (indium tin oxide, ITO) was filled with electrophoretic fluids prepared as described in Part B, above. The microcells were hexagonal in shape, with 20 micrometer depth and 130 micrometer width measured from edge to edge. Excess electrophoretic fluid was removed from the microcells by a doctor blade, and they were sealed with a composite polymeric coating as described in U.S. Provisional Patent Application No. 62/065575. This assembly was laminated to a glass backplane with ITO electrodes using a doped thermal adhesive substantially as described in U.S. Pat. No. 7,012,735 of 3 µm in thickness to produce a display device.

Part D: Electro-Optical Testing

The devices produced as described in Part C was driven using a waveform as shown in Table 5. The waveform comprised four phases: (1) a reset with a low frequency at a high addressing voltage; (2) writing to the white state using a method similar to that described above with reference to Table 3; (3) writing to the cyan state using a method similar to that described above with reference to FIG. 7(B); and (4) zero Volts. Each phase of the waveform used a square-wave form alternating between voltages V1 and V2 at the frequency shown, with a duty cycle (defined as the proportion of the time of one cycle at which the display was driven at voltage V1) as indicated.

TABLE 5

| | V1 (V) | V2 (V) | Duty cycle (%) | Frequency (Hz) | Duration (s) |
|---|---|---|---|---|---|
| Reset | −28 | 28 | 50 | 1 | 1 |
| White writing | 28 | −15 | 28.5 | 10 | 4 |
| Cyan writing | −8 | 6 | 1 | 0.5 | 12 |
| Zero | 0 | 0 | | | 1 |

FIGS. 15-18 show the optical densities at 450 nm (blue light absorption), 550 nm (green light absorption) and 650 nm (red light absorption) obtained during the "cyan writing" and "zero" phases of the waveform shown in Table 5. The raw optical densities were converted to "analytical densities", i.e., the optical density contributions of only the cyan pigment at 650 nm, only the magenta pigment at 550 nm, and only the yellow pigment at 450 nm, by removal of the absorptions of the other pigments at the indicated wavelengths. This was achieved as follows: a) the raw optical densities were corrected by a baseline subtraction due to optical losses in the device; b) the optical density at 650 nm was not further corrected, since only the cyan particles absorbed significantly at this wavelength; c) the optical density at 550 nm was corrected by subtraction of $0.5*OD(650)_{corr}$ since the cyan particles had appreciable absorption of green light; and d) the optical density at 450 nm was corrected by subtraction of $0.08*OD(650)_{corr}$ and $0.29*OD(550)_{corr}$ since both the cyan and magenta particles absorbed some blue light. It will be clear to those of skill in the art that a more accurate correction could be made by taking into account all the cross-absorption terms. After the described corrections had been made, the optical density at 450 nm was approximately proportional to the amount of yellow pigment on the viewing side of the white pigment; the optical density at 550 nm was approximately proportional to the amount of magenta pigment on the viewing side of the white pigment; and the optical density at 650 nm was approximately proportional to the amount of cyan pigment on the viewing side of the white pigment.

Figure 15:
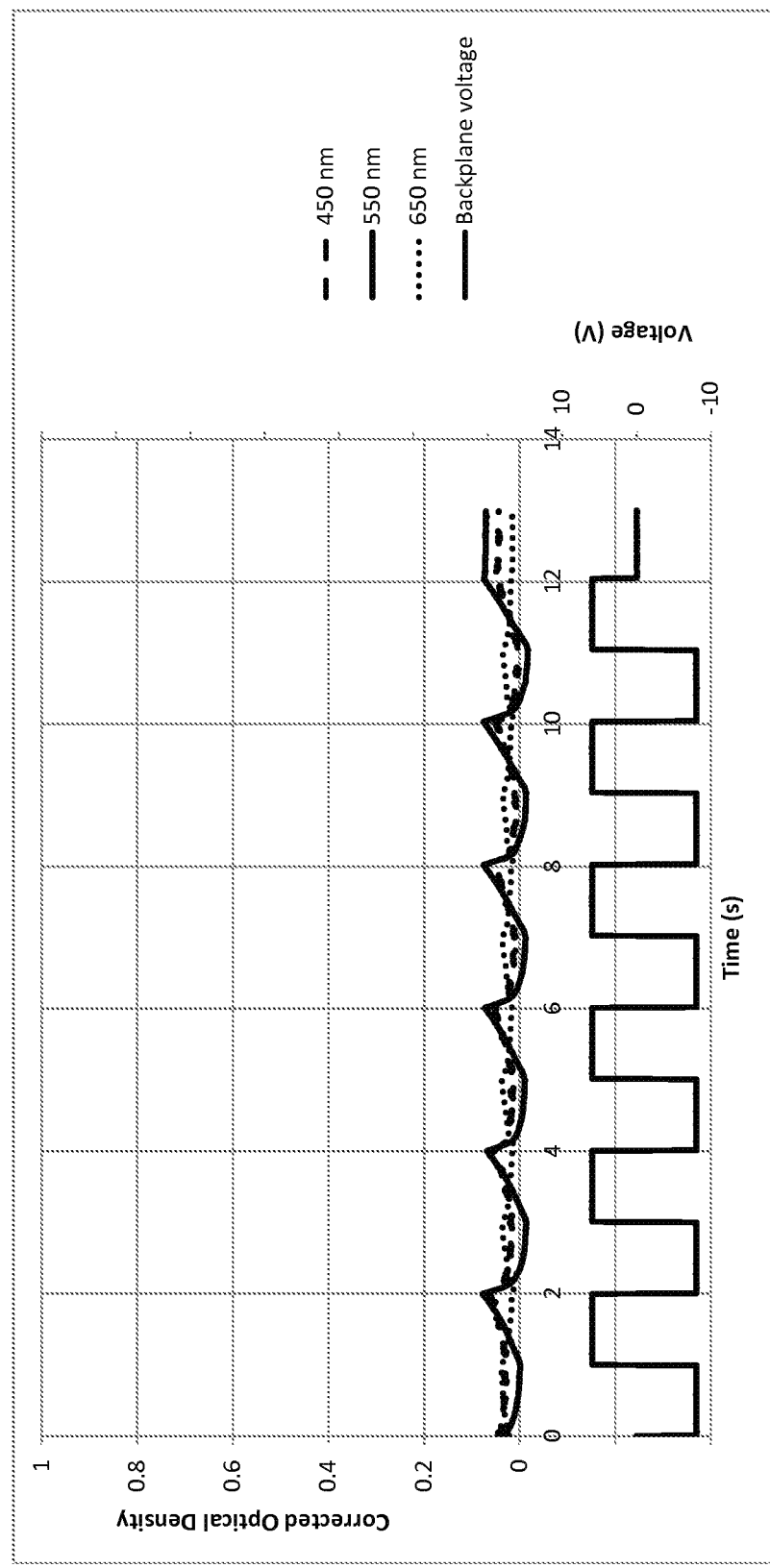
FIGS. 15-18 are graphs showing the optical densities measured at 450 nm, 550 nm, and 650 nm as an electrophoretic medium of the present invention and similar media lacking certain particles are switched.

FIG. 15 shows the optical density traces corresponding to a mixture of the white, yellow and magenta particles (fluid (i)). There is seen (at this low addressing voltage) virtually no modulation from the white state. This is consistent with the formation of an almost immobile aggregate formed by the yellow and magenta particles (i.e., the white pigment may move but at this low addressing voltage cannot displace the (red) aggregate of the yellow and magenta particles.

Figure 16:
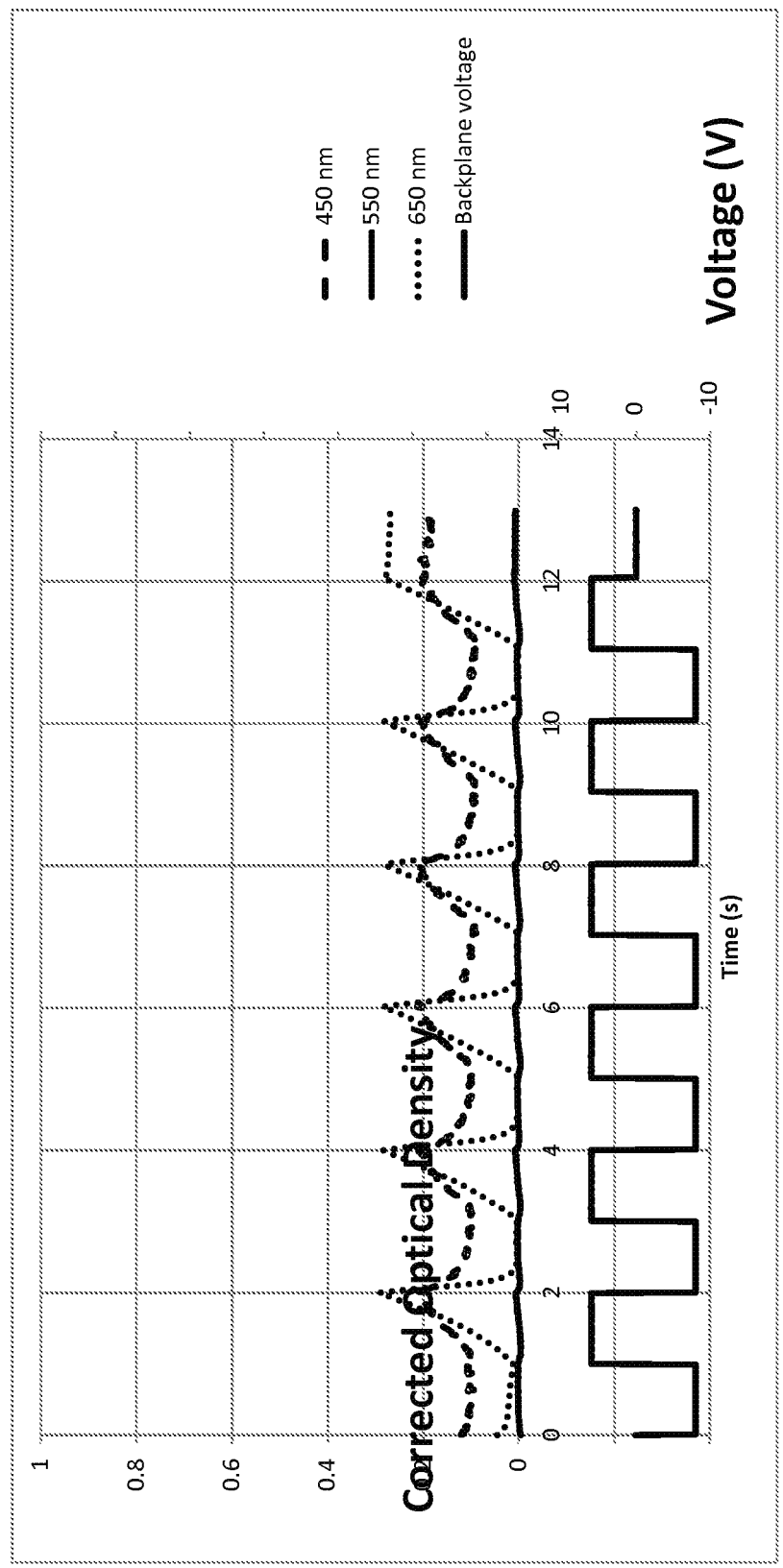

FIG. 16 shows the optical density traces corresponding to a mixture of the white, yellow and cyan particles (fluid (ii)). There is now seen (again at the low addressing voltage) considerably greater modulation of cyan (650 nm, dynamic range approximately 0.3 OD) and yellow (450 nm, dynamic range approximately 0.1 OD). This is consistent with the formation of a weaker aggregate between the yellow and cyan particles than was formed between the yellow and magenta particles. The dynamic range of cyan oscillation is much lower than when the yellow particle is not present (cf. FIG. 17, below).

Figure 17:
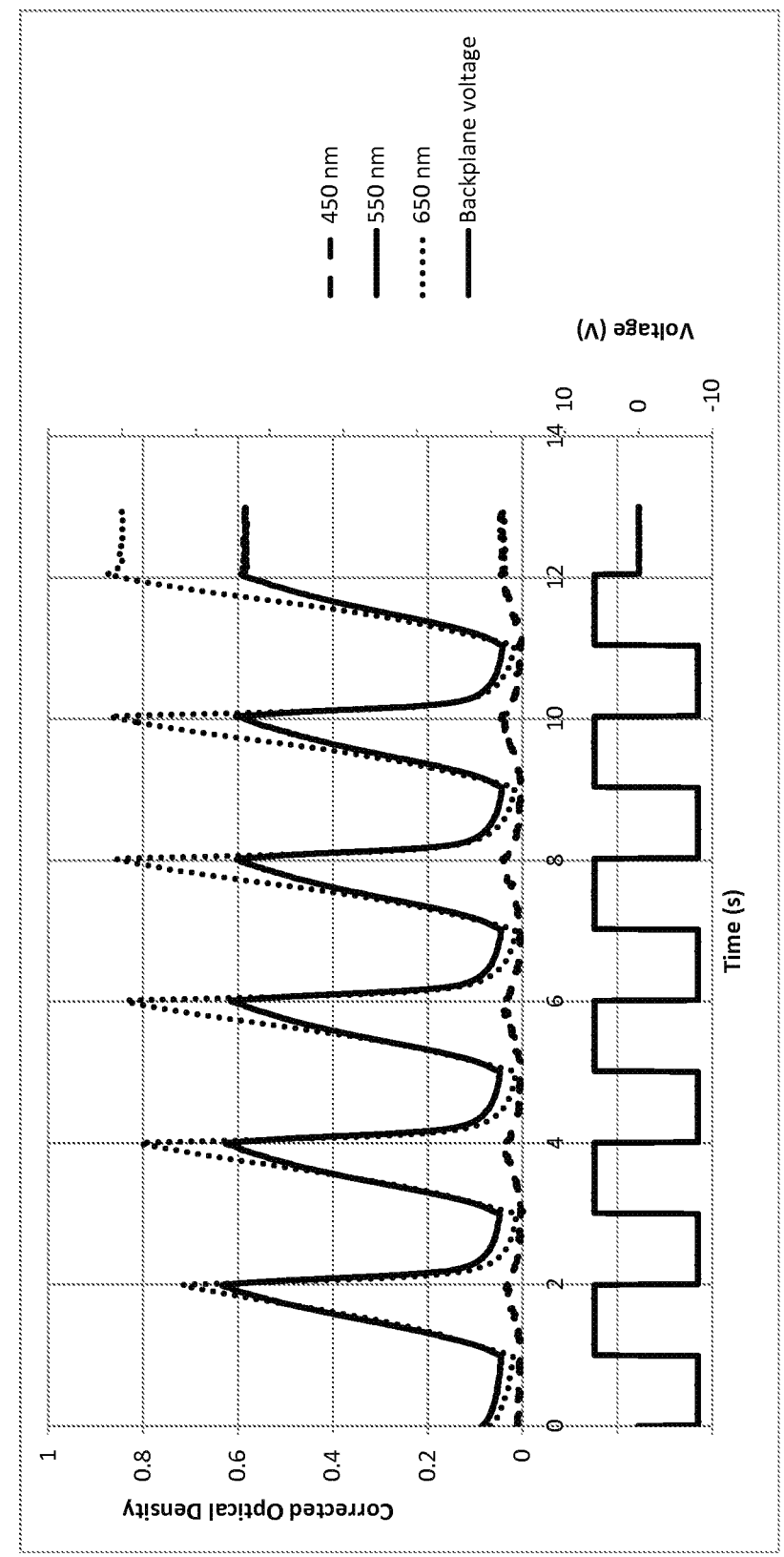

FIG. 17 shows the optical density traces corresponding to a mixture of the white, magenta and cyan particles (fluid (iii)). There is now seen (again at the low addressing voltage) considerable modulation of cyan (650 nm, dynamic range approximately 0.9 OD) and magenta (550 nm, dynamic range approximately 0.6 OD). The increased optical density range in cyan versus that shown in FIG. 16 is consistent with cyan and yellow forming an aggregate that requires a higher field to separate than cyan and white. Alternatively stated, the electric field strength required to separate aggregates appears to be in the order P2-P3>P2-P1 for particles of types 1, 2 and 3.

Figure 18:
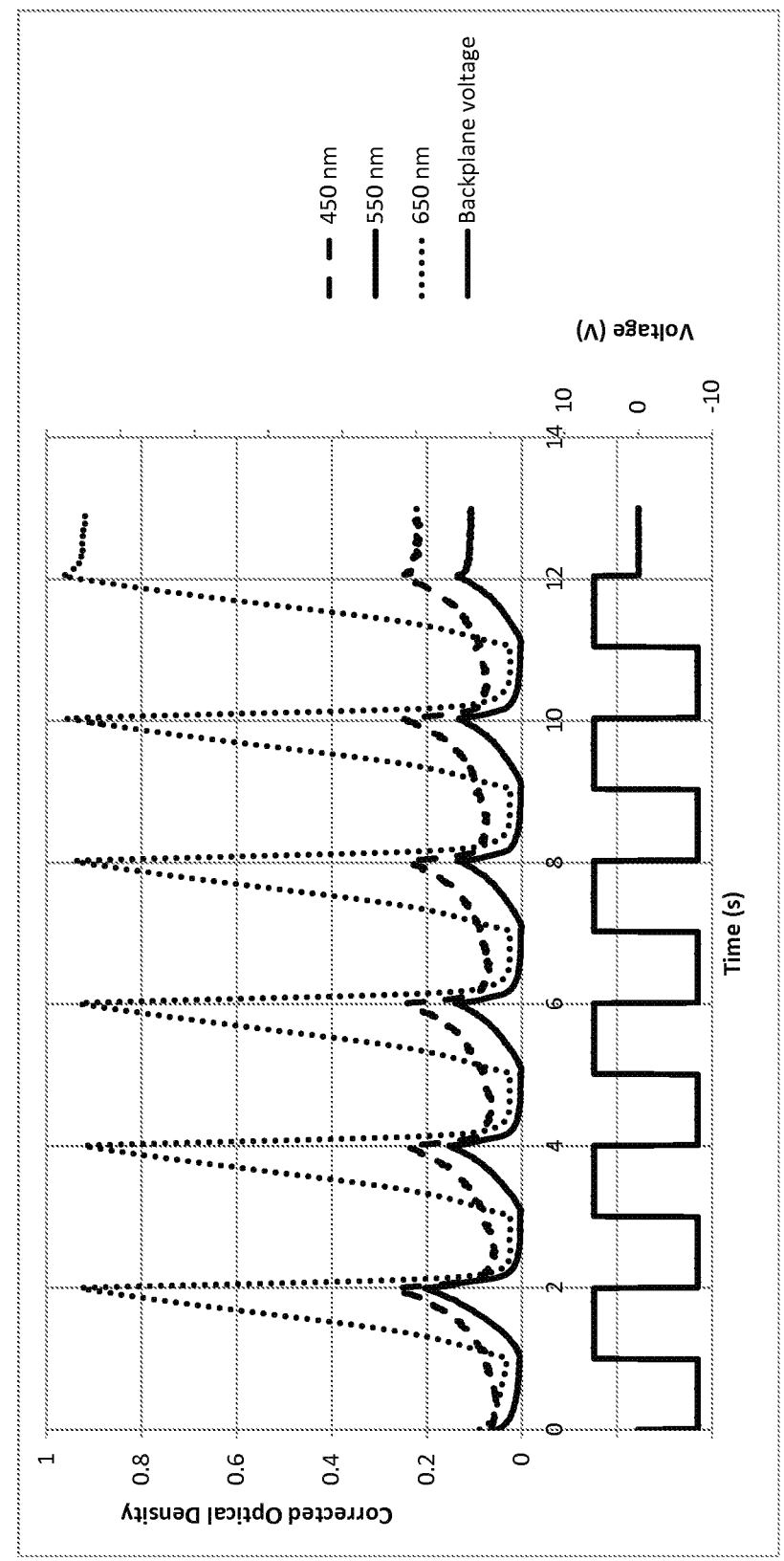

Finally, FIG. 18 shows the optical density traces corresponding to a mixture of the white, yellow, magenta and cyan particles (fluid (iv)). There is now considerable modulation only of cyan (650 nm, dynamic range approximately 0.9 OD) while magenta has been suppressed (550 nm, dynamic range approximately 0.2 OD). The reduced optical density range in magenta versus that shown in FIG. 17 is consistent with magenta and yellow forming an aggregate that requires a higher field to separate than cyan and yellow.

The same result was obtained in Examples 9 and 10, i.e., the electric field strength required to separate aggregates is in the order P3-P4>P3-P2 for particles of types 2, 3 and 4, and combining this with the result discussed above with reference to FIG. 17 we can rank the electric fields required to separate aggregates as P3-P4>P3-P2>P2-P1.

Example 12

Comparison of Electrophoretic Compositions

Part A : Preparation of a White Particle Dispersion

Titanium dioxide was silane-treated as described in U.S. Pat. No. 7,002,728, and the silane-treated white pigment was polymerized with poly(lauryl methacrylate) to afford the coated white pigment. The dry pigment (1100 g) was combined with Isopar G (733.33 g) to give the final white dispersion.

Part B: Preparation of Electrophoretic Fluids

Fluid (i): The white pigment dispersion prepared in Part A above (4.95 g) was combined with the magenta dispersion prepared as described in Example 5 above (0.92 g), the cyan dispersion prepared as described in Example 7 above (0.61 g of a 24.8% w/w dispersion), the yellow pigment dispersion prepared as described in Example 1 above (0.90 g), Solsperse 17000 (0.09 g of a 20% w/w solution in Isopar G), Isopar G (2.05 g) and poly(isobutylene) of molecular weight 850,000 (0.48 g of a 15% w/w solution in Isopar G). The resultant mixture was mixed thoroughly overnight and sonicated for 90 minutes to produce an electrophoretic fluid (i.e., an electrophoretic composition comprising a pigment in a mobile phase) having a conductivity of 330 pS/cm.

Fluid (ii): The white pigment dispersion prepared in Part A above (3.46 g) was combined with the magenta dispersion prepared in Example 5 above (0.69 g), the cyan dispersion prepared as described in Example 7 above (0.43 g of a 24.9% w/w dispersion), the yellow pigment dispersion prepared as described in Example 2 above (0.63 g), Solsperse 17000 (0.07 g of a 20% w/w solution in Isopar G), Isopar G (1.38 g) and poly(isobutylene) of molecular weight 850,000 (0.34 g of a 15% w/w solution in Isopar G). The resultant mixture was mixed thoroughly overnight and sonicated for 90 minutes to produce an electrophoretic fluid (i.e., an electrophoretic composition comprising a pigment in a mobile phase) having a conductivity of 200 pS/cm.

Fluid (iii): The white pigment dispersion prepared in Part A above (4.93 g) was combined with the magenta dispersion prepared in Example 5 above (0.85 g), the cyan dispersion prepared as described in Example 7 above (0.69 g of a 23.6% w/w dispersion), the yellow pigment dispersion prepared as described in Example 3 above (0.90 g), Solsperse 17000 (0.09 g of a 20% w/w solution in Isopar G), Isopar G (2.05 g) and poly(isobutylene) of molecular weight 850,000 (0.48 g of a 15% w/w solution in Isopar G). The resultant mixture was mixed thoroughly overnight and sonicated for 90 minutes to produce an electrophoretic fluid (i.e., an electrophoretic composition comprising a pigment in a mobile phase) having a conductivity of 75 pS/cm.

Fluid (iv): The white pigment dispersion prepared in Example 3, Part C above (4.95 g) was combined with the magenta dispersion prepared in Part B of the same Example (0.76 g), the cyan dispersion prepared as described in Examples 1 and 2 above (0.66 g of a 22.4% w/w dispersion), the yellow pigment dispersion prepared in Example 4 above (0.77 g), Solsperse 19000 (0.38 g of a 20% w/w solution in Isopar G, Solsperse 17000 (0.09 g of a 20% w/w solution in Isopar G), Isopar G (1.92 g) and poly(isobutylene) of molecular weight 850,000 (0.48 g of a 15% w/w solution in Isopar G). The resultant mixture was mixed thoroughly overnight and sonicated for 90 minutes to produce an electrophoretic fluid (i.e., an electrophoretic composition comprising a pigment in a mobile phase) having a conductivity of 134 pS/cm.

Fluid (v): A white pigment dispersion prepared as described in U.S. Pat. No. 7,002,728 (4.92 g of a 59.8% w/w dispersion) was combined with the magenta dispersion prepared in Example 5 above (0.77 g), the cyan dispersion prepared as described in Example 7 above (0.61 g of a 24.8% w/w dispersion), the yellow pigment dispersion prepared as described in Example 3 above (0.90 g), Solsperse 17000 (0.09 g of a 20% w/w solution in Isopar G), Isopar G (2.23 g) and poly(isobutylene) of molecular weight 850,000 (0.48 g of a 15% w/w solution in Isopar G). The resultant mixture was mixed thoroughly overnight and sonicated for 90 minutes to produce an electrophoretic fluid (i.e., an electrophoretic composition comprising a pigment in a mobile phase) having a conductivity of 54 pS/cm.

Fluid (vi): The white pigment dispersion prepared in Part A above (4.95 g) was combined with the magenta dispersion prepared as described in Example 6 above (1.43 g of a 24.6% w/w dispersion), the cyan dispersion prepared as described in Example 7 above (0.60 g of a 24.9% w/w dispersion), the yellow pigment dispersion prepared as described in Example 3 above (0.90 g), Solsperse 19000 (0.15 g of a 20% w/w solution in Isopar G), Solsperse 17000 (0.08 g of a 20% w/w solution in Isopar G), Isopar G (1.42 g) and poly(isobutylene) of molecular weight 850,000 (0.47 g of a 15% w/w solution in Isopar G). The resultant mixture was mixed thoroughly overnight and sonicated for 90 minutes to produce an electrophoretic fluid (i.e., an electrophoretic composition comprising a pigment in a mobile phase) having a conductivity of 100 pS/cm.

Part C: Electro-Optic Tests

A parallel-plate test cell was prepared consisting of two horizontal 50 x 55 mm glass plates each coated with a transparent, conductive coating of indium tin oxide (ITO) between which was introduced the electrophoretic medium to be tested. Silica spacer beads of nominally 20 µm diameter were incorporated to maintain a constant gap between the glass plates. The electrophoretic fluid prepared as described above (95 µL) was dispensed onto the ITO-coated face of the lower glass plate and then the upper glass plate was placed over the fluid so that the ITO coating was in contact with the fluid. Electrical connections were then made to the ITO-coated sides of both the top and bottom glass plates.

The cell was driven using a waveform summarized in Table 6. The basic waveform is divided into six sections, each 20.5 seconds long. During each section a square-wave AC fundamental with 30 Hz frequency is offset by a DC voltage as shown in the table (not every offset is shown, but the sequence should be obvious from the table entries). The duty cycle of the square wave AC (i.e., the proportion of the time of one cycle of positive and negative voltages during which the positive voltage is applied) is varied as shown in the table. The whole test consists of three repetitions of the basic waveform, each time with a different voltage offset sequence, shown as "High V offset", "Mid V offset" and "Low V offset". Thus, for example, the initial "High V offset" is−15V. The magnitude of the square wave AC is+/−30V for the "High V offset" sequence, +/−20V for the "Mid V offset" sequence, and "+/−10V for the "Low V offset" sequence.

TABLE 6

| Section | High V square wave AC magnitude (+/−V) | High V offset (V) | Mid V square wave AC magnitude (+/−V) | Mid V offset (V) | Low V square wave AC magnitude (+/−V) | Low V offset (V) | Square wave AC frequency (Hz) | Square wave AC duty cycle (%) | Duration (ms) |
|---|---|---|---|---|---|---|---|---|---|
| 1 | 30 | −15 | 20 | −10 | 10 | −5 | 30 | 30 | 500 |
|   | 30 | −14.25 | 20 | −9.5 | 10 | −4.75 | 30 | 30 | 500 |
|   | 30 | . . . | 20 | . . . | 10 | . . . | 30 | 30 | 500 |
|   | 30 | 14.25 | 20 | 9.5 | 10 | 4.75 | 30 | 30 | 500 |
|   | 30 | 15 | 20 | 10 | 10 | 5 | 30 | 30 | 500 |
| 2 | 30 | −15 | 20 | −10 | 10 | −5 | 30 | 50 | 500 |
|   | 30 | −14.25 | 20 | −9.5 | 10 | −4.75 | 30 | 50 | 500 |
|   | 30 | . . . | 20 | . . . | 10 | . . . | 30 | 50 | 500 |
|   | 30 | 14.25 | 20 | 9.5 | 10 | 4.75 | 30 | 50 | 500 |
|   | 30 | 15 | 20 | 10 | 10 | 5 | 30 | 50 | 500 |
| 3 | 30 | −15 | 20 | −10 | 10 | −5 | 30 | 70 | 500 |
|   | 30 | −14.25 | 20 | −9.5 | 10 | −4.75 | 30 | 70 | 500 |
|   | 30 | . . . | 20 | . . . | 10 | . . . | 30 | 70 | 500 |
|   | 30 | 14.25 | 20 | 9.5 | 10 | 4.75 | 30 | 70 | 500 |
|   | 30 | 15 | 20 | 10 | 10 | 5 | 30 | 70 | 500 |
| 4 | 30 | 15 | 20 | 10 | 10 | 5 | 30 | 30 | 500 |
|   | 30 | 14.25 | 20 | 9.5 | 10 | 4.75 | 30 | 30 | 500 |
|   | 30 | . . . | 20 | . . . | 10 | . . . | 30 | 30 | 500 |
|   | 30 | −14.25 | 20 | −9.5 | 10 | −4.75 | 30 | 30 | 500 |
|   | 30 | 15 | 20 | −10 | 10 | −5 | 30 | 30 | 500 |
| 5 | 30 | 15 | 20 | 10 | 10 | 5 | 30 | 50 | 500 |
|   | 30 | 14.25 | 20 | 9.5 | 10 | 4.75 | 30 | 50 | 500 |
|   | 30 | . . . | 20 | . . . | 10 | . . . | 30 | 50 | 500 |
|   | 30 | −14.25 | 20 | −9.5 | 10 | −4.75 | 30 | 50 | 500 |
|   | 30 | 15 | 20 | −10 | 10 | −5 | 30 | 50 | 500 |
| 6 | 30 | 15 | 20 | 10 | 10 | 5 | 30 | 70 | 500 |
|   | 30 | 14.25 | 20 | 9.5 | 10 | 4.75 | 30 | 70 | 500 |
|   | 30 | . . . | 20 | . . . | 10 | . . . | 30 | 70 | 500 |
|   | 30 | −14.25 | 20 | −9.5 | 10 | −4.75 | 30 | 70 | 500 |
|   | 30 | 15 | 20 | −10 | 10 | −5 | 30 | 70 | 500 |

Reflection spectra were acquired as the cell was electrically driven. These were used to calculate CIE L*, a* and b* values for the light reflected from the cell as the waveform was applied. For each spectral sample, a distance in L*a*b* space of the color of the cell from each of the eight SNAP primaries was calculated in units of ΔE*. For each electrophoretic fluid tested, the minimum distances of the colors displayed from the SNAP primaries were recorded; the lower this distance, the closer is the performance of the electrophoretic fluid to the SNAP target.

The results of this assessment for the six fluids tested are shown in Table 7. As shown in Table 2 above, particles Y1, Y2, Y3 and M1 have minimal or no polymer shell, whereas particles W 1, W2, M2 and C 1 have substantial polymer shell. Particle W1 has a lower zeta potential than particle W2.

TABLE 7

Closest approach to SNAP target (dE* units)

| Fluid | Particle constituents | R | G | B | Y | C | M | W | K | Average |
|---|---|---|---|---|---|---|---|---|---|---|
| i | Y1, M1, C1, W1 | 11 | 9 | 1 | 6 | 18 | 15 | 5 | 0 | 8 |
| ii | Y2, M1, C1, W1 | 11 | 8 | 7 | 8 | 15 | 8 | 7 | 0 | 8 |
| iii | Y3, M1, C1, W1 | 5 | 8 | 8 | 7 | 13 | 17 | 10 | 0 | 9 |
| iv | Y4, M1, C1, W1 | 19 | 28 | 5 | 9 | 29 | 13 | 13 | 0 | 15 |
| iii (repeat) | Y1, M1, C1, W1 | 5 | 8 | 8 | 7 | 13 | 17 | 10 | 0 | 9 |
| v | Y1, M1, C1, W2 | 9 | 15 | 11 | 2 | 16 | 22 | 7 | 3 | 11 |
| vi | Y1, M2, C1, W1 | 19 | 20 | 0 | 5 | 16 | 36 | 16 | 3 | 14 |

In Table 7, a better result is obtained when the closest approach to the SNAP target is a smaller number (i.e., the distance to the target is shorter—ideally it would be zero). It can be seen that the best formulations are those in which particles of types 3 and 4 (yellow and magenta) each have minimal polymer shell. In Fluid iv the yellow particles have a substantial polymer shell while in Fluid vi the magenta particles have a substantial polymer shell. In each of these fluids the average distance of closest approach to the target is greater (~14.5) than fluids of the invention, such as fluids i, ii, and iii (~8). Fluid v also performs worse than the control: in this fluid the white pigment (type 1 particle) has a higher zeta potential than in fluids i, ii, and iii, and thus would be expected to interact more strongly with the cyan pigment (type 2 particle), which is not preferred in the invention.

Example 13

Switching an Electrophoretic Device Using a First Drive Scheme as Described Above Part A: Preparation of a Display Device An array of microcells embossed onto a poly(ethylene terephthalate) film with a coating of a transparent conductor (indium tin oxide, ITO) was filled with the electrophoretic fluid (iii) prepared as described in Example 10, above. The microcells were hexagonal in shape, with 20 micrometer depth and 130 micrometer width measured from edge to edge. Excess electrophoretic fluid was removed from the microcells by a doctor blade, and they were sealed with a composite polymeric coating as described in U.S. Application Ser. No. 62/065,575, filed Oct. 17, 2014. This assembly was laminated to a glass backplane with ITO electrodes using a doped thermal adhesive substantially as described in U.S. Pat. No. 7,012,735 of 3 μm in thickness to produce a display device.

Part B: Electrical Driving of the Display Device to Eight Primary Colors

The device produced as described in Part A was driven using a waveform as shown in Table 8. There were two subphases of the reset section: driving 1) with a low frequency at a high addressing voltage and 2) with a relatively high frequency with the same voltages. Following this phase was the "color-writing" phase, which followed essentially the same lines as described above with reference to FIGS. 5-7. This phase of the waveform used a square-wave form alternating between voltages V1 and V2 at the frequency shown, with a duty cycle (defined as the proportion of the time of one cycle at which the display was driven at voltage V1) as indicated. The column headed "End" has entry "V1" when the final cycle of the square-wave AC terminated after writing with voltage "V1" (i.e., omitting the portion at which the display would have been addressed at voltage "V2"). In cases where there is no entry in the column headed "End" the final cycle of the square-wave AC was the same as the other cycles.

TABLE 8

|   |         | V1 (V) | V2 (V) | Duty cycle (%) | Frequency (Hz) | Duration (s) | End |
|---|---------|--------|--------|----------------|----------------|--------------|-----|
| K | Reset 1 | −30    | 30     | 50             | 1              | 2            |     |
|   | Reset 2 | −30    | 30     | 50             | 30             | 2            |     |
|   | Writing | 15     | 0      | 50             | 10             | 2            |     |
|   | Zero    | 0      | 0      |                |                | 2            |     |
| B | Reset 1 | −30    | 30     | 50             | 1              | 2            |     |
|   | Reset 2 | −30    | 30     | 50             | 30             | 2            |     |
|   | Writing | 30     | −15    | 28.5           | 5              | 3.86         | V1  |
|   | Zero    | 0      | 0      |                |                | 2            |     |
| R | Reset 1 | −30    | 30     | 50             | 1              | 2            |     |
|   | Reset 2 | −30    | 30     | 50             | 30             | 2            |     |
|   | Writing | 15     | −15    | 71.4           | 1              | 4            |     |
|   | Zero    | 0      | 0      |                |                | 2            |     |
| M | Reset 1 | −30    | 30     | 50             | 1              | 2            |     |
|   | Reset 2 | −30    | 30     | 50             | 30             | 2            |     |
|   | Writing | 30     | −15    | 33             | 5              | 4            |     |
|   | Zero    | 0      | 0      |                |                | 2            |     |
| G | Reset 1 | −30    | 30     | 50             | 1              | 2            |     |
|   | Reset 2 | −30    | 30     | 50             | 30             | 2            |     |
|   | Writing | −30    | 15     | 33             | 2              | 4            |     |
|   | Zero    | 0      | 0      |                |                | 2            |     |
| C | Reset 1 | −30    | 30     | 50             | 1              | 1            |     |
|   | Reset 2 | −30    | 30     | 50             | 30             | 1            |     |
|   | Writing | −15    | 15     | 62.5           | 1              | 5            |     |
|   | Zero    | 0      | 0      |                |                | 2            |     |
| Y | Reset 1 | −30    | 30     | 50             | 1              | 1            |     |
|   | Reset 2 | −30    | 30     | 50             | 30             | 1            |     |
|   | Writing | −30    | 15     | 33             | 2              | 3.67         | V1  |
|   | Zero    | 0      | 0      |                |                | 2            |     |
| W | Reset 1 | −30    | 30     | 50             | 1              | 1            |     |
|   | Reset 2 | −30    | 30     | 50             | 30             | 1            |     |
|   | Writing | −15    | 0      | 50             | 10             | 2            |     |
|   | Zero    | 0      | 0      |                |                | 2            |     |

Table 9 shows the colors that were obtained after the test display was driven as described above. It can be seen that all eight primary colors were obtainable; however, the quality of the color rendition was not as high as when the "second drive scheme" of the invention was employed (see Table 4 above).

TABLE 9

| Color | L* | a* | b* |
|---|---|---|---|
| K | 17 | 2 | −2 |
| B | 33 | 2 | −11 |
| R | 28 | 18 | 9 |
| M | 42 | 25 | 11 |
| G | 51 | −8 | 15 |
| C | 52 | −8 | −4 |
| Y | 62 | 2 | 35 |
| W | 70 | −1 | 6 |
| Gamut Volume ($\Delta E^3$) | 14836 | | |

Example 14

Comparison of Dispersion Polymerization and Silane Treatment/Polymerization for Functionalization of a Particle of Type 2 (Cyan Particle)

Part A: Exemplary Preparation of Cyan Particles Containing Poly(Dimethylsiloxane) in Polymer Shell To a 500 mL plastic bottle were added 32.0 g Hostaperm Blue B2G-EDS (Clamant Corporation 225226), 12.5 g methyl methacrylate, 25 g monomethacrylate terminated poly(dimethylsiloxane) (Gelest MCR-M22, molecular weight 10,000) and Isopar E. The bottle was shaken and the contents were poured into a 500 mL reactor and homogenized for 30 minutes at 25 C. The homogenizer was removed and the reactor was reassembled with a nitrogen immersion tube, overhead stirring impeller and an air condenser. The overhead air stirrer was set to 400 rpm and the reaction mixture was purged with nitrogen for one hour at 65° C., after which the immersion tube was removed and the rotometer nitrogen level set. In a small vial, 0.189 g of 2,2'-azobis(2-methylpropionitrile) (AIBN) was dissolved in ethyl acetate and added to a syringe. The vial was then rinsed with ethyl acetate and added to the same syringe. The resultant AIBN solution was injected into the reactor in a single addition and the reaction mixture heated for 16-24 hours. The reaction mixture was then dispensed into a 1 L centrifuge bottle and centrifuged. The supernatant was decanted, and the remaining pigment was washed with Isopar E and again centrifuged. This washing procedure was repeated twice, and after the final supernatant was decanted, the remaining pigment was dried in a vacuum oven at room temperature overnight.

The dried pigment was dispersed to a 30 per cent by weight mixture with Isopar G using sonication and rolling and the resulting dispersion was filtered through 200 μm mesh and the percentage of solid material in the dispersion measured.

Part B: Exemplary Preparation of Polymer-Coated Cyan Particles Using a Silane Coupling/Polymerization Process To a 500 mL plastic bottle were added 45.0 g Heliogen Blue D 7110 F (BASF Corporation), concentrated aqueous ammonia solution and water. The mixture was rolled to disperse the pigment and then attrited using glass beads. Separately, N-[3-(trimethoxysilyl)propyl]-N'-(4-vinylbenzyl)ethylenediamine bis-hydrochloride 7.875 g (available from United Chemical Technologies), glacial acetic acid and water were mixed in a glass vial and mixed by rolling (or spinning) for 1 hour to form a solution of hydrolyzed silane. The attrition of the cyan pigment was halted and the hydrolyzed silane solution was added into the attritor. The pH was adjusted to about 9.4 with concentrated aqueous ammonium hydroxide solution. Attrition was then continued for a further 1 hour, after which the glass beads were removed by filtration and the resultant silane-functionalized pigment was isolated from the filtrate by centrifugation, dried at 70° C. for 16 hours, and then ground with a mortar and pestle to a fine powder.

Lauryl methacrylate (1 g per gram of dried pigment from the previous step) and toluene were added to the ground pigment and the mixture was subjected to multiple cycles of sonication and rolling until fully dispersed. The resultant mixture was filtered through a 200 µm mesh into a round-bottomed flask equipped with a condenser and magnetic stirring, after which the flask was purged with nitrogen and the mixture heated to 65° C. A solution of AIBN, (0.428 g) in ethyl acetate was then added dropwise and the mixture was heated at 65° C. for 17 hours, then cooled and the pigment collected by centrifugation. The crude pigment was redispersed with sonication into toluene and again collected by centrifugation (4500 rpm, 30 min), then dried at 70° C. The dried pigment was dispersed to a 30 per cent by weight mixture with Isopar G using sonication and rolling, then filtered through 200 µm mesh and the percentage of solid material in the dispersion measured.

Table 10 shows the properties of a series of pigments prepared according to the general methods outlined above. In some cases a surfactant was added to aid in the dispersion of the core pigment particles prior to polymerization: this is indicated as the "dispersion aid" in the Table (PVP is poly(vinylpyrollidone); Solsperse 8000 is a surfactant available from Lubrizol Corporation, Wickliffe, Ohio; OLOA 371 is a surfactant available from Chevron Oronite, Bellaire, Tex.). There was also added to certain of the polymerizations a crosslinking agent: trimethylolpropane trimethacrylate (TMPTMA), as shown. Core pigments Pigment Blue 15:3 and Pigment Blue 15:4 are copper phthalocyanine materials (i.e., organometallic compounds). The core pigments shown as EX1456 and BL0424 are inorganic materials available from The Shepherd Color Company, Cincinnati, Ohio. The inorganic materials scatter light substantially have surfaces that would be expected to have functional groups (for example, oxygen atoms bound to a metal) that would react with the silane coupling agents used in preparation method B, above.

TABLE 10

| Particle | Core pigment | Functionalization Method | Dispersion aid | Polymerization additive | Zeta potential, Solsperse 17000 (mV), Isopar G | Polymer weight fraction measured by TGA, % |
|---|---|---|---|---|---|---|
| C2 | Pigment Blue 15:3 | A | | TMPTMA | 30 | 22.9 |
| C3 | Pigment Blue 15:3 | A | | | 33 | 21 |
| C4 | Pigment Blue 15:3 | A | | TMPTMA | 38 | 22.7 |
| C5 | Pigment Blue 15:3 | A | | TMPTMA | 38 | 24.9 |
| C6 | Pigment Blue 15:3 | A | | TMPTMA | 41 | 26.9 |
| C7 | Pigment Blue 15:3 | A | | | 53 | 36.4 |
| C8 | Pigment Blue 15:3 | A | Solsperse 8000 | | 5.1 | 25.6 |
| C9 | Pigment Blue 15:3 | A | OLOA 371 | | 10.1 | 27.2 |
| C10 | Pigment Blue 15:4 | B | | | 49 | 21.8 |
| C11 | Pigment Blue 15:4 | B | PVP | | 57 | 23.1 |
| C12 | Pigment Blue 15:4 | B | | | 61 | 20.4 |
| C13 | Pigment Blue 15:4 | B | | | 65 | 29 |
| C14 | EX1456 (inorganic) | B | | | 149 | 2.4 |
| C15 | BL0424 (inorganic) | B | | | 161 | 4.3 |

Part C: Preparation of Electrophoretic Fluid

Electrophoretic fluids were prepared with cyan particles C2-C15. The cyan pigments were added in to electrophoretic fluid compositions in amounts that were in inverse proportion to their extinction coefficients. An exemplary preparation is given below.

The yellow pigment dispersion prepared in Example 1 (0.64 g) was combined with the magenta dispersion prepared in Example 5 (0.85 g), the white dispersion prepared in Example 10, Part A above (4.93 g), and the cyan dispersion (0.47 g of a 31.7% w/w dispersion for a pigment of extinction coefficient 2.24 m2/g as measured at 650 nm), Solsperse 17000 (0.06 g of a 20% w/w solution in Isopar G), poly(isobutylene) of molecular weight 850,000 and additional Isopar G. The resultant mixture was mixed thoroughly overnight and sonicated for 90 minutes to produce an electrophoretic fluid (i.e., an electrophoretic composition comprising a pigment in a mobile phase) having a conductivity of approximately 30 pS/cm.

Part D: Electro-Optical Testing

Figure 19:
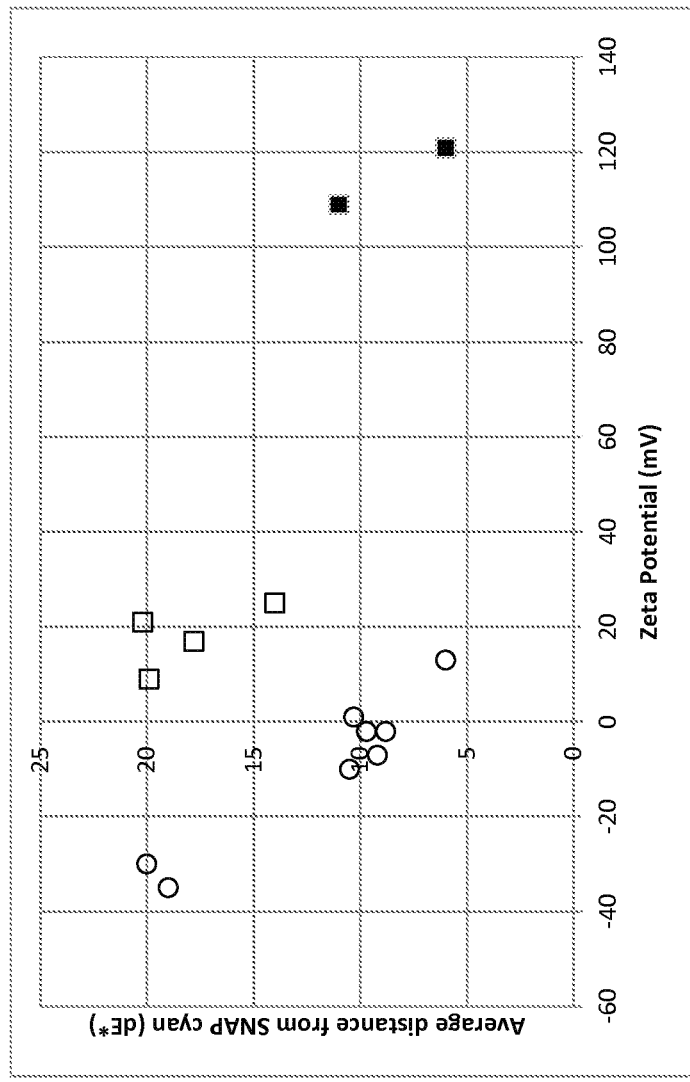
FIGS. 19-21 are graphs showing the average distance from the SNAP standard for all eight "primary colors" as a function of differences in zeta potential, as measured in experiments described in Example 14 below.
Figure 20:
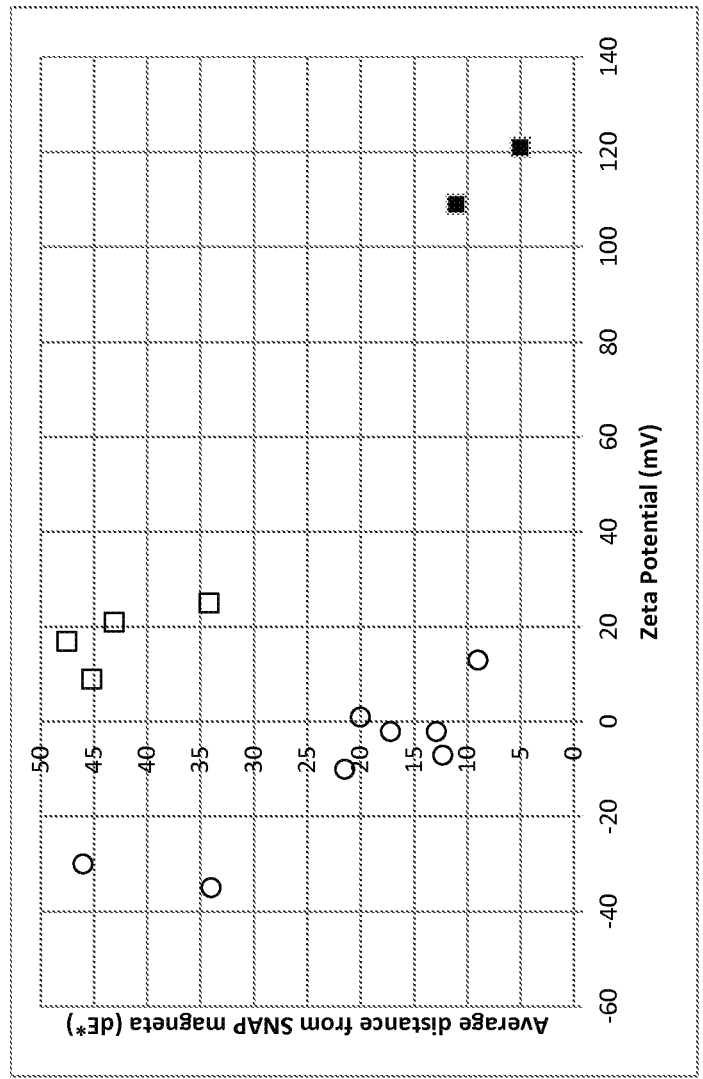
Figure 21:
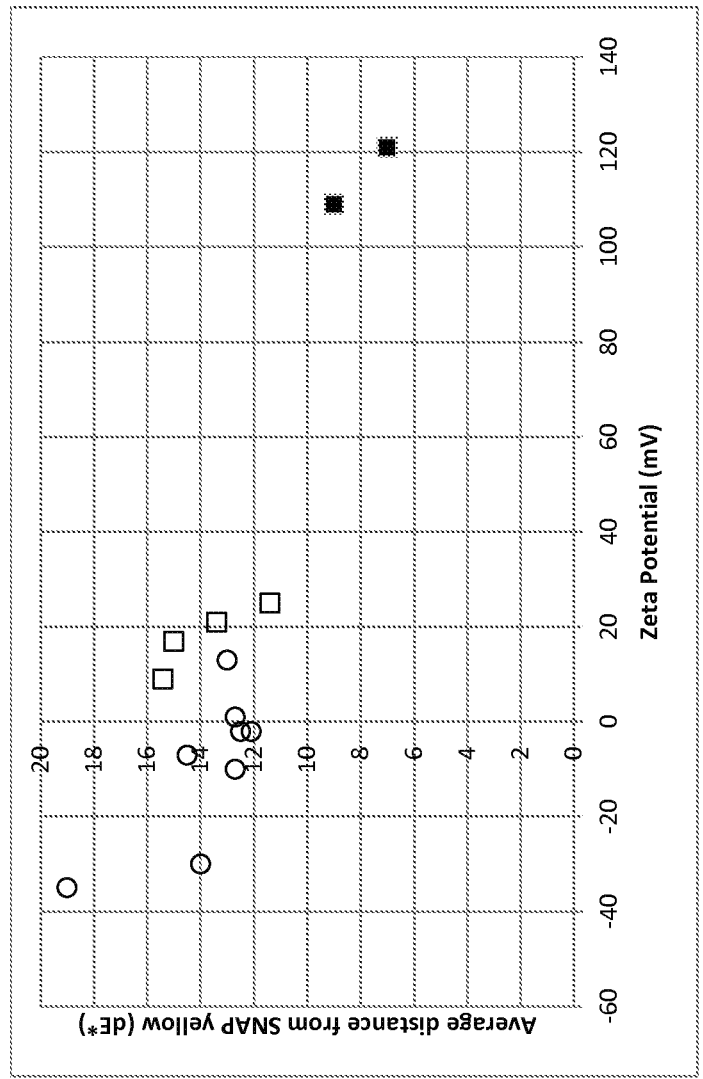

The electrophoretic fluids prepared in Part C above were tested as described above in Example 12, Part C. FIGS. 19-21 show the average distance from the SNAP standard of all eight primary colors for 14 different electrophoretic media each of which contained a different cyan particle but the same white, magenta, and yellow particles in the same mass ratio, together with a charge control agent (a mixture of Solsperse 19000 and Solsperse 17000 in a 4:1 ratio) and a polymeric stabilizer (poly(isobutylene)) in Isopar G. As noted above, the cyan particles were loaded in inverse proportion to their extinction coefficients. Three different types of cyan particle were used: a) materials functionalized by dispersion polymerization using methyl methacrylate and monomethacrylate terminated poly(dimethylsiloxane) monomers as described in Part A above (particles C2-C9, shown by open circles in FIGS. 19-21); b) organometallic materials functionalized as described in Part B above by silane treatment followed by polymerization with lauryl methacrylate (particles C10-C13, shown by open squares in FIGS. 19-21); and c) inorganic materials functionalized as described in Part B above by silane treatment followed by polymerization with lauryl methacrylate (particles C14-C15, shown by filled squares in FIGS. 19-21).

The abscissae of the graphs in FIGS. 19-21 are the difference in zeta potential between the cyan pigment and the magenta pigment as measured with Solsperse 17000 as charge control agent (the magenta pigment in all cases was particle M1 prepared as described in Example 5 above). These zeta potentials were measured in Isopar E or Isopar G. Note that in the graphs of FIGS. 19-21, smaller values of the distance from SNAP correspond to better color performance.

It can be seen from FIG. 19 that when the organometallic core cyan pigment is coated by dispersion polymerization (method A, open circles) the cyan color performance is generally better than when the cyan pigment is coated with silane treatment/poly(lauryl methacrylate) (method B, open squares). One rationalization of this result is that the dispersion polymerization process provides a more effective steric barrier for the organometallic core cyan pigment (a particle of type 2) than the silane treatment process. It is noteworthy that the two cyan particles prepared using method A with a dispersant (C8 and C9) exhibit lower zeta potentials and give poorer performance than the particles prepared without the use of a dispersant. The inorganic cyan particles (filled squares) have much higher zeta potential and give good color results, possibly because the silane treatment, as noted above, is more efficient when applied to an inorganic than to an organic surface. However, the inorganic core pigment scatters light substantially, and the black state obtained from these formulations (L* 34 and 36, respectively, for C14 and C15) was much poorer than the black state obtained from the better organometallic pigments (for example L* 28 and 27, respectively, for C3 and C4).

FIG. 20 shows the same trend for the color magenta. According to the hypothesis advanced above, the magenta color is formed when the magenta pigment moves more slowly through the white pigment (due to heteroaggregation, in this case between particles of types 1 and 4) than the cyan pigment (which, being a particle of type 2, has only a weak heteroaggregation with particles of type 1). It appears that the silane treatment does not provide as effective a steric polymer shell as the dispersion polymerization process for the organometallic core cyan pigment, such that the discrimination between magenta and cyan pigments is less evident.

FIG. 21 shows that the polymer treatment of the cyan pigment makes almost no difference to the rendering of the color yellow. This is not unexpected, since it is the strength of the interaction between the magenta and yellow pigments that is thought to mediate the formation of the yellow color, as discussed above.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electrophoretic medium comprising:
   (a) a fluid;
   (b) a plurality of first and a plurality of second particles dispersed in the fluid, the first and second particles bearing charges of opposite polarity, the first particle being white in color and light-scattering and the second particle comprising a cyan pigment and being non-light scattering; and
   (c) a plurality of third and a plurality of fourth particles dispersed in the fluid, the third and fourth particles bearing charges of opposite polarity, the third particle comprising a yellow pigment and being non-light scattering, and the fourth particle comprising a magenta pigment and being non-light scattering,
   wherein the electric field required to separate an aggregate formed by the third and the fourth types of particles is greater than that required to separate an aggregate formed from any other two types of particles, and
   wherein the yellow, magenta, and cyan pigments exhibit diffuse reflectances at 650, 650, and 450 nm, respectively, measured over a black background, of less than 2.5% when the pigment is approximately isotropically distributed at 15% by volume in a layer of thickness 1 μm comprising the pigment and a liquid of refractive index less than 1.55.

2. An electrophoretic medium according to claim 1 wherein the electric field required to separate an aggregate formed by the first and second particles is less than that required to separate an aggregate formed by the third and the fourth particles, the first and fourth particles, or the second and third particles.

3. An electrophoretic medium according to claim 1 wherein the first and third particles are negatively charged and the second and fourth particles are positively charged.

4. An electrophoretic medium according to claim 1 the first and second particles carry polymer coatings such that the volume fraction of polymer in the particles is at least 25 per cent, while the third and fourth particles either have no polymer shell or a polymer shell such that the volume fraction of polymer in the particles does not exceed 15 per cent.

5. An electrophoretic medium according to claim 1 wherein the fluid is a liquid.

6. An electrophoretic medium according to claim 5 wherein the liquid is a non-polar liquid having a dielectric constant less than 5.

7. An electrophoretic medium according to claim 1 wherein the fluid has have dissolved or dispersed therein a polymer having a number average molecular weight in excess of 20,000 and being essentially non-absorbing on the particles.

8. A front plane laminate, double release sheet, inverted front plane laminate or electrophoretic display comprising an electrophoretic medium according to claim 1.

9. An electronic book reader, portable computer, tablet computer, cellular telephone, smart card, sign, watch, shelf label or flash drive comprising an electrophoretic display according to claim 8.

10. An electrophoretic medium comprising:
   (a) a fluid;
   (b) a plurality of first and a plurality of fourth particles dispersed in the fluid the first and fourth particles bearing charges of opposite polarity and each having a polymer coating comprising at least 60 per cent by weight of an acrylate or methacrylate ester monomer comprising a hydrocarbon chain comprising at least six carbon atoms, one of the first and fourth particles being a light-scattering particle and the other of the first and fourth particles being a substantially non-light-scattering particle having a subtractive primary color;
   (c) a plurality of second particles dispersed in the fluid, the second particles bearing charges of the same polarity as the fourth particles, having a polymer coating comprising a polydimethylsiloxane-containing monomer, and having a subtractive primary color different from the substantially non-light-scattering one of the first and fourth particles; and (d) a plurality of third particles bearing charges of the same polarity as the first particles, being substantially non-light scattering and having a subtractive primary color different from the substantially non-light-scattering one of the first and fourth particles and different from that of the second particles.

11. An electrophoretic medium comprising:

(a) a fluid;

(b) a plurality of first and a plurality of second particles dispersed in the fluid the first and second particles bearing charges of opposite polarity, the first particle being a light-scattering particle and the second particle having one of the subtractive primary colors;

(c) a plurality of third and a plurality of fourth particles dispersed in the fluid, the third and fourth particles bearing charges of opposite polarity, the third and fourth particles each having a subtractive primary color different from each other and from the second particles, wherein the electric field required to separate an aggregate formed by the third and the fourth types of particles is greater than that required to separate an aggregate formed from any other two types of particles, and wherein the first and fourth particles each have a polymer coating comprising at least 60 per cent by weight of an acrylate or methacrylate ester monomer wherein the ester group comprises a hydrocarbon chain comprising at least six carbon atoms, and the second particles have a polymer coating comprising a polydimethylsiloxane-containing monomer.

* * * * *